(12) United States Patent
Ueno et al.

(10) Patent No.: US 9,206,490 B2
(45) Date of Patent: Dec. 8, 2015

(54) BEARING PART, ROLLING BEARING, AND METHODS OF MANUFACTURING THEM

(71) Applicants: Takashi Ueno, Iwata (JP); Chikara Ohki, Kuwana (JP); Daisuke Sato, Kuwana (JP); Kyouhei Kageyama, Utsunomiya (JP); Shougo Shimizu, Iwata (JP)

(72) Inventors: Takashi Ueno, Iwata (JP); Chikara Ohki, Kuwana (JP); Daisuke Sato, Kuwana (JP); Kyouhei Kageyama, Utsunomiya (JP); Shougo Shimizu, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/363,750

(22) PCT Filed: Dec. 7, 2012

(86) PCT No.: PCT/JP2012/081788
§ 371 (c)(1),
(2) Date: Jun. 6, 2014

(87) PCT Pub. No.: WO2013/085033
PCT Pub. Date: Jun. 13, 2013

(65) Prior Publication Data
US 2014/0348454 A1   Nov. 27, 2014

(30) Foreign Application Priority Data

Dec. 8, 2011 (JP) ................... 2011-269037
Dec. 8, 2011 (JP) ................... 2011-269102
Jul. 25, 2012 (JP) ................... 2012-164738
Jul. 25, 2012 (JP) ................... 2012-164856
Aug. 10, 2012 (JP) ................... 2012-178416
Nov. 30, 2012 (JP) ................... 2012-262749

(51) Int. Cl.
*F16C 33/62* (2006.01)
*F16C 33/76* (2006.01)
(Continued)

(52) U.S. Cl.
CPC .. *C21D 9/36* (2013.01); *C21D 1/06* (2013.01); *C21D 1/18* (2013.01); *C21D 9/40* (2013.01);
(Continued)

(58) Field of Classification Search
CPC .......... F16C 33/32; F16C 33/62; F16C 33/64; F16C 33/7816; F16C 33/7823; F16C 33/7826; F16C 33/7853; F16C 33/7856; F16C 2204/66; F16C 2204/70; F16C 2204/74; F16C 2223/14; F16C 2223/16; C23C 8/32
USPC .................. 384/492, 528, 530, 569; 148/219; 29/898.061, 898.066, 898.069
See application file for complete search history.

(56) References Cited

U.S. PATENT DOCUMENTS 6,082,906 A   7/2000   Satou et al.
6,770,152 B1 * 8/2004   Okita et al. ................... 148/334

(Continued)

FOREIGN PATENT DOCUMENTS

JP   7-190072 A   7/1995
JP   11-125259 A   5/1999

(Continued)

OTHER PUBLICATIONS

International Search Report PCT/JP2012/081788 dated Mar. 5, 2013.

(Continued)

*Primary Examiner* — Phillip A Johnson
(74) *Attorney, Agent, or Firm* — McDermott Will & Emery LLP

(57) ABSTRACT

An outer ring, an inner ring, and a ball, each of which is a bearing part, are made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of an impurity. A contact surface thereof with another part has a nitrogen concentration of not less than 0.25 mass %. A remaining austenite amount in the contact surface is not less than 6 volume % and not more than 12 volume %.

33 Claims, 36 Drawing Sheets

(51) Int. Cl.
- *F16C 33/38* (2006.01)
- *C21D 9/36* (2006.01)
- *C21D 9/40* (2006.01)
- *C21D 1/06* (2006.01)
- *C22C 38/00* (2006.01)
- *C22C 38/18* (2006.01)
- *F16C 33/32* (2006.01)
- *F16C 33/64* (2006.01)
- *C22C 38/02* (2006.01)
- *C22C 38/04* (2006.01)
- *C21D 1/18* (2006.01)
- *F16C 33/78* (2006.01)
- *F16C 33/42* (2006.01)
- *F16C 33/80* (2006.01)
- *F16C 43/04* (2006.01)
- *F16C 19/06* (2006.01)
- *F16C 19/30* (2006.01)
- *F16C 43/06* (2006.01)

(52) U.S. Cl.
CPC ............. *C22C 38/00* (2013.01); *C22C 38/02* (2013.01); *C22C 38/04* (2013.01); *C22C 38/18* (2013.01); *F16C 33/32* (2013.01); *F16C 33/3875* (2013.01); *F16C 33/3887* (2013.01); *F16C 33/427* (2013.01); *F16C 33/62* (2013.01); *F16C 33/64* (2013.01); *F16C 33/7893* (2013.01); *F16C 33/805* (2013.01); *F16C 43/04* (2013.01); *F16C 19/06* (2013.01); *F16C 19/30* (2013.01); *F16C 33/7843* (2013.01); *F16C 43/065* (2013.01); *F16C 2202/04* (2013.01); *F16C 2204/66* (2013.01); *F16C 2223/16* (2013.01); *F16C 2226/74* (2013.01); *F16C 2361/65* (2013.01)

(56) References Cited

U.S. PATENT DOCUMENTS

2006/0266440 A1* 11/2006 Tanaka et al. ............... 148/333
2012/0014635 A1* 1/2012 Ohki et al. ................... 384/492

FOREIGN PATENT DOCUMENTS

| | | |
|---|---|---|
| JP | 2000-145795 A | 5/2000 |
| JP | 2000-161363 A | 6/2000 |
| JP | 2002-89569 A | 3/2002 |
| JP | 2003-21148 A | 1/2003 |
| JP | 2003-226918 A | 8/2003 |
| JP | 2003-287040 A | 10/2003 |
| JP | 2003-301846 A | 10/2003 |
| JP | 2004-225743 A | 8/2004 |
| JP | 2004-360732 A | 12/2004 |
| JP | 2006-9887 A | 1/2006 |
| JP | 2006-44349 A | 2/2006 |
| JP | 2007-170680 A | 7/2007 |
| JP | 2008-106869 A | 5/2008 |
| JP | 2008-267402 A | 11/2008 |
| JP | 2009-150415 A | 7/2009 |
| JP | 2009-150507 A | 7/2009 |
| JP | 2009-150508 A | 7/2009 |
| JP | 2009-180327 A | 8/2009 |
| JP | 2010-138933 A | 6/2010 |
| JP | 2011-094784 A | 5/2011 |

OTHER PUBLICATIONS

Information Offer Form Japanese Patent Application No. 2012-178416 dated Mar. 21, 2015 with partial English translation.

Information Offer Form Japanese Patent Application No. 2011-269037 dated Mar. 21, 2015 with partial English translation.

Information Offer Form Japanese Patent Application No. 2011-269102 dated Mar. 21, 2015 with partial English translation.

Information Offer Form Japanese Patent Application No. 2012-178416 dated Apr. 21, 2015 with partial English translation.

Information Offer Form Japanese Patent Application No. 2011-269037 dated Apr. 21, 2015 with partial English translation.

Information Offer Form Japanese Patent Application No. 2011-269102 dated Apr. 21, 2015 with partial English translation.

* cited by examiner

BEARING PART, ROLLING BEARING, AND METHODS OF MANUFACTURING THEM

CROSS REFERENCE TO RELATED APPLICATIONS

This application is the U.S. National Phase of PCT/JP2012/081788 filed Dec. 7, 2012, which claims priority to Japanese Patent Application No. 2011-269037 filed Dec. 8, 2011, Japanese Patent Application No. 2011-269102 filed Dec. 8, 2011, Japanese Patent Application No. 2012-164738 filed Jul. 25, 2012, Japanese Patent Application No. 2012-164856 filed Jul. 25, 2012, Japanese Patent Application No. 2012-178416 filed Aug. 10, 2012, and Japanese Patent Application No. 2012-262749 filed Nov. 30, 2012. The subject matter of each of these cases is incorporated herein by reference in their entirities.

TECHNICAL FIELD

The present invention relates to a bearing part, a rolling bearing, and methods of manufacturing them, more particularly, a bearing part, a rolling bearing, and methods of manufacturing them, by each of which a high level of indentation resistance and a high level of rolling fatigue life can be attained.

BACKGROUND ART

In recent years, machines have been required to attain long lives and be maintenance free. As a result, rolling bearings used for such machines are also required to attain a long rolling fatigue life. In order to attain a long rolling fatigue life, it is considered to change a material of a bearing part (a ring member and a rolling element), which is a part of such a rolling bearing. Specifically, steel, which is a representative material of the bearing part, is provided with an alloy component effective to attain a long life, thereby attaining a long rolling fatigue life.

However, if a special material is employed for the material of the bearing part, it may be difficult to acquire the material depending on locations of manufacturing bases in view of a current circumstance that the manufacturing bases are spreading across the globe. In view of such a circumstance, it is not necessarily preferable to employ a special material so as to attain a long rolling fatigue life.

As an alternative measure for attaining a long rolling fatigue life, there has been proposed to attain long lives of a bearing part and a rolling bearing by means of heat treatment (for example, see Japanese Patent Laying-Open No. 7-190072 (Patent Document 1), Japanese Patent Laying-Open No. 2003-226918 (Patent Document 2), and Japanese Patent Laying-Open No. 2000-161363 (Patent Document 3)).

CITATION LIST

Patent Document

PTD 1: Japanese Patent Laying-Open No. 7-190072
PTD 2: Japanese Patent Laying-Open No. 2003-226918
PTD 3: Japanese Patent Laying-Open No. 2000-161363

SUMMARY OF INVENTION

Technical Problem

Meanwhile, a rolling bearing required to support a large load is required to attain not only a long rolling fatigue life but also an indentation resistance (degree as to how unlikely an indentation is formed when a rolling element is pressed against a ring member). Examples of such a rolling bearing include a tapered roller bearing, a deep groove ball bearing, an angular contact ball bearing, a tandem type angular contact ball bearing, and the like, which are used for differential or transmission of a vehicle. However, even in cases where the long rolling fatigue life is attained through the conventional heat treatment inclusive of Patent Documents 1 to 3 described above, the indentation resistance is insufficient, disadvantageously.

The present invention has been made to solve the foregoing problem and has an object to provide a bearing part, a rolling bearing, and methods of manufacturing them, by each of which a high level of indentation resistance and a high level of rolling fatigue life can be attained while the material thereof can be secured readily.

Solution to Problem

A bearing part according to the present invention is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of an impurity, the bearing part has a contact surface, which is a surface that makes contact with another part and has a nitrogen concentration of not less than 0.25 mass %, and a remaining austenite amount in the contact surface is not less than 6 volume % and not more than 12 volume %.

The present inventors have examined a measure to attain a high level of indentation resistance and a high level of rolling fatigue life when a material equivalent to JIS SUJ2 (JIS SUJ2, ASTM 52100, DIN 100Cr6, GB GCr5 or GCr15, and OCT IIIX15), which is readily available across the globe, is used as a material thereof. As a result, the present inventors have obtained the following knowledge and arrived at the present invention.

By employing the above-described component composition, a standard steel readily available across the globe can be used as a material thereof. A long rolling fatigue life can be attained when the steel having the component composition is used, the nitrogen concentration is increased to 0.25 mass % or more in the contact surface, and the quench-hardening is provided. Here, when a remaining austenite amount is not particularly adjusted, the remaining austenite amount in the contact surface will be about 20 volume % to 40 volume % due to a relation with the nitrogen amount. However, when the remaining austenite amount is thus large, indentation resistance will be decreased, disadvantageously. To address this, the remaining austenite amount is reduced to not more than 12 volume %, thereby achieving improved indentation resistance. On the other hand, if the remaining austenite amount is reduced to less than 6 volume %, the rolling fatigue life, particularly, rolling fatigue life in an environment (foreign matter introduction environment) in which a rigid foreign matter is introduced into the bearing will be decreased. Hence, the remaining austenite amount in the contact surface is preferably set at not less than 6 volume %.

In view of these, the bearing part in the present invention employs, as its material, the material equivalent to JIS SUJ2 readily available across the globe, wherein the nitrogen concentration in the contact surface is not less than 0.25 mass % and the remaining austenite amount therein is not less than 6 volume % and not more than 12 volume %. As a result, according to the bearing part of the present invention, there can be provided a bearing part capable of attaining a high level of indentation resistance and a high level of rolling fatigue life while the material thereof can be secured readily. In order to further improve the indentation resistance, the remaining austenite amount in the contact surface may be set at not more than 10%. Meanwhile, if the nitrogen concentration in the contact surface becomes more than 0.5 mass %, cost is increased in introducing nitrogen into the steel and it becomes difficult to adjust the remaining austenite amount to fall within a desired range. Hence, the nitrogen concentration in the contact surface is preferably set at not more than 0.5 mass % and may be set at not more than 0.4 mass %.

In the bearing part, the contact surface may have a hardness of not less than 60.0 HRC. Accordingly, the rolling fatigue life and the indentation resistance can be improved further.

In the bearing part, the contact surface may have a hardness of not more than 64.0 HRC. If the hardness of the contact surface having the nitrogen concentration increased to 0.25 mass % or more is maintained to be more than 64.0 HRC, it becomes difficult to adjust the remaining austenite at 12 volume % or less. By setting the hardness of the contact surface at not more than 64.0 HRC, the remaining austenite amount can be readily adjusted to fall within a range of not more than 12 volume %.

A rolling bearing according to the present invention includes: a ring member; and a plurality of rolling elements disposed in contact with the ring member. At least one of the ring member and each of the rolling elements is the above-described bearing part of the present invention.

The rolling bearing of the present invention includes the above-described bearing part of the present invention as at least one of a ring member and a rolling element. As a result, according to the rolling bearing of the present invention, there can be provided a bearing capable of attaining a high level of indentation resistance and a high level of rolling fatigue life while the material thereof can be secured readily.

In the rolling bearing, the ring member may include a first bearing ring having a first rolling contact surface and a second bearing ring having a second rolling contact surface and disposed such that the second rolling contact surface faces the first rolling contact surface. The rolling bearing may further include a seal member disposed to close a bearing space, which is a space interposed between the first bearing ring and the second bearing ring. The seal member may have one end fixed to one of the first bearing ring and the second bearing ring, and may have the other end that serves as a seal lip portion making contact with the other of the first bearing ring and the second bearing ring. The seal lip portion may be made of such a high-wear material that by rotating the second bearing ring relative to the first bearing ring in a circumferential direction, the seal lip portion is worn out to bring into a state in which the other of the first bearing ring and the second bearing ring does not make contact with the seal lip portion or a state in which the other of the first bearing ring and the second bearing ring slightly makes contact with the seal lip portion to such an extent that a contact pressure between the other of the first bearing ring and the second bearing ring and the seal lip portion is able to be regarded as substantially zero.

In order to achieve a long rolling fatigue life, in particular, a long rolling fatigue life in the foreign matter introduction environment, it is effective to dispose a contact type seal member so as to suppress introduction of the foreign matter. However, if a general contact type seal member is employed, rotation torque of the rolling bearing will be increased, disadvantageously. To address this, in the configuration, the seal lip portion in contact with the bearing ring is made of such a high-wear material that is readily worn out due to the rotation of the bearing ring so as to bring it out of the contact with the bearing ring or bring it into a state in which the contact is slight to such an extent that the contact pressure with the bearing ring can be regarded as substantially zero. As a result, rotation torque is suppressed from being increased while suppressing introduction of a foreign matter. Examples of the material of the seal lip portion include a rubber, a resin, and the like.

In the rolling bearing, at least the ring member may be the bearing part of the present invention. The indentation resistance is mattered particularly in the ring member. Hence, when the ring member is constructed of the above-described bearing part of the present invention, the indentation resistance of the rolling bearing is improved more securely.

In the rolling bearing, the rolling element may be a ball. By employing the ball for the rolling element, the rotation torque of the rolling bearing is suppressed. Meanwhile, when the ball is used for the rolling element, the static rated load of the bearing is significantly decreased as compared with the roller bearing. Accordingly, the indentation resistance is particularly mattered. To address this, the rolling bearing of the present invention includes the bearing part excellent in indentation resistance. Hence, by employing the ball for the rolling element in the rolling bearing of the present invention, there can be provided a rolling bearing attaining a high level of indentation resistance and a high level of rolling fatigue life and attaining reduced rotation torque.

The rolling bearing may further include a cage that retains the plurality of rolling elements at a predetermined pitch on an annular raceway. The cage may be constructed by combining two annular cage plates each having hemispherical projecting portions provided at a predetermined interval in a circumferential direction, the hemispherical projecting portions facing each other may form a pocket retaining the rolling element, the pocket may have a ball facing surface, which is a surface that faces the rolling element and is provided with a ball non-contact portion provided by a recess extending in the circumferential direction of the pocket, and assuming that a length of the ball non-contact portion in the circumferential direction of the pocket is represented by A, a diameter of the rolling element is represented by B, and a gap formed between the rolling element and the ball facing surface is represented by C, a value of $A/(B+C)$ may be set at 0.70 to 0.90.

By thus providing the ball facing surface of the pocket with the ball non-contact portion provided by the recess in the cage, the ball facing surface is provided with the ball contact portion serving as a guide way and the ball non-contact portion not serving as the guide way. It should be noted that the gap described above is intended to indicate a gap between the ball and the pocket guide way when the ball is brought to one side in the pocket.

Here, when the recess is provided in the pocket, for example, at the central portion in the pocket axial direction so as to extend in the pocket circumferential direction, a sliding area where the pocket inner wall and the ball are in contact with each other can be reduced by increasing the length of the recess in the pocket circumferential direction, which leads to reduction of the shearing resistance. However, if the "length in the pocket circumferential direction" is made too long, the ball is brought into contact with the pocket at a boundary between the guide way (the ball contact portion) and the recess rather than the guide way. If the contact is thus made at the boundary, the oil film formed is significantly reduced to presumably result in damage on the surface. Hence, it is preferable that the "length in the pocket circumferential direction" is as large in size as possible to such an extent that the ball, inclusive of the movement of the ball in the pocket, can be retained in the pocket guide way (ball contact portion).

In the configuration, when the length of the ball non-contact portion in the pocket circumferential direction is represented by A, the diameter of the rolling element is represented by B, and the gap formed between the rolling element and the ball facing surface of the pocket is represented by C, the value of A/(B+C) is set at 0.70 to 0.90. Accordingly, the maximum low torque effect can be attained while satisfying the function as the bearing.

In the rolling bearing, assuming that a length of the ball non-contact portion in a pocket axial direction is represented by D and a total length of the pocket in the pocket axial direction is represented by E, a value of D/E may be set at 0.25 to 0.40.

When the length of the ball non-contact portion in the pocket axial direction is increased, the sliding area in contact becomes small, which leads to reduction of the shearing resistance. Meanwhile, the cage may be made of a metal and may be shaped by press working. In this case, there is a concern as to manufacturing, i.e., a difficulty in manufacturing arises if the length of the ball non-contact portion is made too large in the pocket axial direction. Hence, the length of the ball non-contact portion in the pocket axial direction is preferably as large in size as possible to such an extent that the shape of the pocket is not deformed by the press working. By setting the value of D/E at 0.25 to 0.40, both reduction in shearing resistance and readiness in manufacturing can be attained.

In the rolling bearing, assuming that a depth of the recess providing the ball non-contact portion is represented by F and a thickness of the hemispherical projecting portion of the annular cage plate is represented by G, a value of F/G may be set at 0.30 to 0.40.

By forming the recess, a gap larger than the level of surface roughness is provided between the rolling element and the pocket, thereby achieving a shearing resistance of "0". However, in consideration of precision in press working for the cage, it becomes difficult to secure sufficient precision in size if the depth of the recess is too small. On the other hand, if the depth of the recess is too large, the pocket may be deformed during the press working. By setting the value of F/G at 0.30 to 0.40, the shearing resistance can be reduced while the precision in size of the recess can be secured and the pocket can be avoided from being deformed.

In the rolling bearing, assuming that a total length of the pocket in a pocket axial direction is represented by E and an amount of displacement of a center of the ball non-contact portion relative to a center of the rolling element in the pocket axial direction is represented by H, a value of H/(E/2) is set at 0 to 0.2.

When the central location of the recess in the pocket axial direction is displaced relative to the center of the rolling element in the pocket axial direction, balance becomes bad to result in deformation during the press working. This can be suppressed by setting the value of H/(E/2) at 0 to 0.2.

In the rolling bearing, the recess that provides the ball non-contact portion may have a curved opening edge in a pocket axial direction.

If the rolling element is brought into contact with the boundary between the recess and the pocket guide way (the ball contact portion), the ability of forming the oil film is significantly decreased. Hence, as described above, the recess preferably has such a size that the rolling element does not make contact with the boundary. However, even when settings are made in design such that such contact does not take place, variation or the like in the manufacturing may cause the contact between the boundary and the rolling element. By providing the curved opening edge of the recess in the pocket axial direction, i.e., by providing the opening edge with a shape with curvature, damage can be avoided from being immediately caused even if such contact takes place.

The rolling bearing may further include a cage that retains the plurality of rolling elements at a predetermined pitch on an annular raceway. The cage may be constructed by combining two annular cage plates each having hemispherical projecting portions provided at a predetermined interval in a circumferential direction. The hemispherical projecting portions facing each other may form a pocket retaining the rolling element, the pocket may have a ball facing surface, which is a surface that faces the rolling element and is provided with a ball non-contact portion, and a contact area of the pocket with the rolling element may be reduced by 15% to 30% as compared with a contact area thereof with the rolling element in a case where the ball non-contact portion is not provided.

In the above-described configuration, the ball non-contact portion provided in the ball facing surface provides reduced resistance when a lubricant passes through the inside of the pocket. Further, the ball non-contact portion thus provided allows for reduced amount of oil film formed between the rolling element and the pocket. Here, if the ball non-contact portion is too small, an amount of reduction in amount of oil film to be sheared is small, failing to achieve torque reduction. On the other hand, if the ball non-contact portion is too large, the amount of oil film formed between the rolling element and the pocket becomes too small, compromising smooth rolling of the rolling element. If the contact area with the rolling element, which is reduced by providing the ball non-contact portion, is larger than 30%, strength of the cage is decreased. If the contact area with the rolling element, which is reduced by providing the ball non-contact portion, is smaller than 15%, the torque cannot be sufficiently reduced. Hence, by providing the ball non-contact portion, the contact area with the ball is preferably reduced by 15% to 30%.

In the rolling bearing, the ring member may include an inner ring, and an outer ring disposed to surround an outer circumference side of the inner ring, and the inner ring may have a groove curvature of not less than 1.02 and not more than 1.06 relative to the rolling element.

In the rolling bearing, the ring member may include an inner ring, and an outer ring disposed to surround an outer circumference side of the inner ring, and the outer ring may have a groove curvature of not less than 1.02 and not more than 1.08 relative to the rolling element.

By increasing the groove curvature of at least one of the inner ring and the outer ring relative to the rolling element to 1.02 or more, the sliding component can be reduced to achieve low torque more securely. Specifically, by increasing the groove curvatures of the inner ring and the outer ring to 1.02, differential sliding can be approximately the half of that in the general structure, under conditions of a radial load Fr=500 N, an axial load Fa=0 N, and a rotational speed of 4000 rpm in the ball bearing of JIS 6207.

Meanwhile, when the groove curvatures of the inner ring and the outer ring are increased, a contact pressure between each of the inner ring and outer ring and the rolling element becomes large to presumably result in a short life of the bearing. Hence, it is preferable to set the groove curvature of each of the inner ring and the outer ring at a predetermined value or less. Specifically, the groove curvature of the inner ring relative to the ball is preferably 1.06 or less, and the groove curvature of the outer ring relative to the ball is preferably 1.08 or less. Here, the upper limit of the groove curvature of the outer ring is larger than that of the inner ring due to the following reason. That is, in a general design, a contact pressure between the outer ring and the rolling element is smaller than a contact pressure between the inner ring and the rolling element, so that there is room in increasing the groove curvature of the outer ring as compared with the groove curvature of the inner ring. It should be noted that the term "groove curvature" in the present application refers to a ratio of the curvature radius of the rolling contact surface in a cross section perpendicular to the circumferential direction of the bearing ring to the radius of the ball.

The rolling bearing may further include a cage that retains the plurality of rolling elements at a predetermined pitch on an annular raceway. The cage may be formed by forming hemispherical pockets in facing surfaces of two annular bodies, which face each other in an axial direction, at a plurality of locations in a circumferential direction so as to contain the rolling elements, and bringing the facing surfaces into abutment with each other so as to join the two annular bodies together. A flange portion extending in a radial direction may be provided in at least one of an inner diameter side and an outer diameter side of an axial end portion of each of the annular bodies, a groove portion may be formed at a portion of the ring member corresponding to the flange portion, and a labyrinth may be formed by the flange portion and the groove portion.

In the cage, the flange portion extending in the radial direction is provided at at least one of the inner diameter side and outer diameter side of the axial end portion of the annular body, the groove portion is provided in the ring member at the portion corresponding to the flange portion, and the labyrinth is formed by the flange portion and the groove portion. This labyrinth can suppress the lubricating oil from flowing into the bearing. Accordingly, an excessive amount of lubricating oil can be suppressed from flowing into the bearing, thereby achieving a low torque. Further, the labyrinth is constructed of the flange portions provided in the annular body and the groove portion provided in the ring member, so that the formation of the labyrinth can be attained only by changing the shapes of the cage and the ring member, for example. Hence, the number of parts and the number of assembly steps can be suppressed from being increased. Manufacturing cost can be reduced.

In the rolling bearing, the two annular bodies may have the same shape. This leads to reduced manufacturing cost of the part (annular body).

In the rolling bearing, the pocket of the annular body may be provided with a pocket groove portion formed to extend in the radial direction of the annular body. This reduces a contact area between the cage and the rolling element, thereby achieving a low torque.

In the rolling bearing, an inter-pocket groove portion may be formed in the facing surface between adjacent ones of the pockets of the annular body so as to extend through the annular body in the radial direction of the annular body to connect an inner diameter side and an outer diameter side of the annular body to each other. Accordingly, lubricating oil between the cage and the rolling element are discharged due to centrifugal force, thereby achieving a lower torque.

In the rolling bearing, the flange portion may have an axial thickness of not less than 0.15 mm, which is 20% or less of a diameter of the rolling element.

If the axial thickness of the flange portion is less than 0.15 mm, the flange portion is likely to have insufficient strength or is likely to be poorly shaped. On the other hand, if the axial thickness of the flange portion is larger than the diameter of the rolling element by more than 20%, the increase in axial size of the cage leads to increase in axial size of the inner and outer rings, with the result that the bearing is prevented from being compact. By setting the axial thickness of the flange portion to fall within the above-described appropriate range, occurrence of such a problem can be suppressed.

In the rolling bearing, the cage may have a flat end surface. This reduces stirring resistance of lubricating oil coming into the relief portion, thereby achieving a lower torque.

In the rolling bearing, the cage may be made of a polyamide resin, a polyether ether ketone resin, or a polyphenylene sulfide resin. Each of these materials is suitable as a material of the cage of the rolling bearing.

The rolling bearing may further include a cage that retains the plurality of rolling elements at a predetermined pitch on an annular raceway. The ring member may include an inner ring that is provided with an inner ring groove formed at an outer circumference side, and an outer ring that is disposed to surround the inner ring and that is provided with an outer ring groove formed at an inner circumference side. Among four shoulders respectively disposed at sides of the outer ring groove and the inner ring groove, a shoulder at one side of the outer ring groove and a shoulder at the other side of the inner ring groove may respectively have heights higher than heights of a shoulder at the other side of the outer ring groove and a shoulder at the one side of the inner ring groove.

Accordingly, the bearing is disposed and used such that the load-side shoulder receiving the thrust load is higher, thereby suppressing the rolling element from being brought onto the shoulder.

In the rolling bearing, the cage may include a cylindrical first divided cage made of a synthetic resin and a cylindrical second divided cage made of a synthetic resin and fitted in inside of the first divided cage. Each of the first divided cage and the second divided cage may have an annular body and may have a crown shape such that plural pairs of pocket pawls are formed side by side at an equal interval at one side surface of the annular body in an axial direction, each pair of pocket pawls face each other, and a ball retaining pocket obtained by hollowing out the annular body and having a size exceeding ½ circle is provided between each pair of pocket pawls. The first divided cage may be inserted into the bearing from a side of the shoulder, which has a lower shoulder height, of the outer ring, and the second divided cage is inserted into the bearing from a side of the shoulder, which has a lower shoulder height, of the inner ring such that the pocket has a combination of open ends directed in opposite directions. A joining portion may be provided between the first divided cage and the second divided cage so as to engage the cages through fit and prevent the cages from being separated in the axial direction.

With this, the assembly of the bearing is facilitated. Moreover, even under application of a large moment load, the cage can be suppressed from falling due to the ball moving backward or forward, and the cage can be avoided from interfering with the shoulder of the ring groove.

In the rolling bearing, the first divided cage and the second divided cage may have different hues. Accordingly, based on the hues of the divided cages, an operator can distinguish the first divided cage and the second divided cage from each other so as to attain an appropriate arrangement of the divided cages, thereby facilitating assembly and attachment of the bearing.

In the rolling bearing, the pocket may have an inner circumferential surface provided with a relief portion that does not make contact with the rolling element.

As described above, when the cage is constructed of the combination of the first divided cage and the second divided cage and the bearing including such a cage is used in a foreign matter introduction lubrication condition, foreign matters are likely to be accumulated between the first divided cage and the second divided cage. This may become a factor of short life of the bearing. To address this, the relief portion is provided as described above to improve passage of the lubricating oil in the pocket surface, thereby suppressing the accumulation of the foreign matters as described above.

Preferably in the rolling bearing, when the rolling element may be pressed against the ring member at a maximum contact pressure of 4.4 GPa, an indentation formed in the ring member has a depth of not more than 0.5 μm. By improving the indentation resistance to this level, there can be provided a rolling bearing usable in a particularly severe service condition. Further, the indentation depth is more preferably not more than 0.3 μm, and is further preferably not more than 0.2 μm.

The rolling bearing may rotatably support a rotation member, which is rotated in a differential or a transmission, relative to another member disposed adjacent to the rotation member.

In the bearing used in the differential or the transmission, a high contact pressure is applied between the rolling element and the ring member. Hence, the bearing for use therein is required to attain not only a long rolling fatigue life but also improved indentation resistance. Hence, the rolling bearing of the present invention, which is capable of attaining a high level of indentation resistance and a high level of rolling fatigue life, is suitable as a bearing used in the differential or the transmission.

A method of manufacturing a bearing part in the present invention includes the steps of: fabricating a shaped member by shaping a steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of an impurity; carbonitriding the shaped member; quench-hardening the shaped member carbonitrided; tempering the shaped member quench-hardened; and forming a contact surface, which is a surface to make contact with another part, by processing the shaped member tempered. In the step of carbonitriding the shaped member, the shaped member is carbonitrided so as to attain a nitrogen concentration of not less than 0.25 mass % in the contact surface in the step of forming the contact surface. In the step of tempering the shaped member, the shaped member is tempered to attain a remaining austenite amount of not less than 6 volume % and not more than 12 volume % in the contact surface in the step of forming the contact surface.

According to the method of manufacturing the bearing part in the present invention, the bearing part of the present invention can be manufactured.

In the method of manufacturing the bearing part, in the step of tempering the shaped member, the shaped member may be tempered in a temperature range of not less than 240° C. and not more than 300° C. In this way, the remaining austenite amount in the contact surface can be readily adjusted to fall within a range of not less than 6 volume % and not more than 12 volume %. Further, carbon is dissolved in the steel having been through the quenching treatment. The dissolved carbon contributes to solid-solution strengthening of the material (steel) in the vicinity of the contact surface. On the other hand, when the steel having been through the quenching treatment is subjected to the tempering treatment, part of the dissolved carbon is precipitated as a carbide. The precipitated carbide contributes to precipitation strengthening in the material (steel) in the vicinity of the contact surface. When the treatment temperature of the tempering treatment is less than 240° C., the solid-solution strengthening of the material in the vicinity of the contact surface is sufficient but the precipitation strengthening is insufficient. When the treatment temperature of the tempering treatment is more than 300° C., the precipitation strengthening of the material in the vicinity of the contact surface is sufficient but the solid-solution strengthening is insufficient. By setting the treatment temperature of the tempering treatment at not less than 240° C. and not more than 300° C., balance becomes good between the solid-solution strengthening and the precipitation strengthening, thereby improving the indentation resistance.

In the method of manufacturing the bearing part, in the step of quenching the shaped member, the shaped member may be quenched by rapidly cooling the shaped member from a temperature range of not more than 860° C. In this way, adjustment in balance between the carbon dissolved amount and the carbon precipitated amount after the quench-hardening and adjustment in remaining austenite amount during the tempering treatment can be suppressed from being difficult.

In the method of manufacturing the bearing part, in the step of quenching the shaped member, the shaped member may be quenched by rapidly cooling the shaped member from a temperature range of not less than 820° C. In this way, adjustment in balance between the carbon dissolved amount and the carbon precipitated amount after the quench-hardening and adjustment in remaining austenite amount during the tempering treatment can be suppressed from being difficult.

A method of manufacturing a rolling bearing according to the present invention includes the steps of: preparing a ring member; preparing a plurality of rolling elements; and assembling the rolling bearing by combining the plurality of rolling elements in contact with the ring member. At least one of the step of preparing the ring member and the step of preparing the plurality of rolling elements is performed using the method of manufacturing the bearing part of the present invention. In this way, the rolling bearing of the present invention can be manufactured.

A rolling bearing according to the present invention includes a first bearing ring having a first rolling contact surface; a second bearing ring having a second rolling contact surface and disposed such that the second rolling contact surface faces the first rolling contact surface; a plurality of rolling elements that makes contact with a first rolling contact surface and a second rolling contact surface at their rolling contact surfaces and that are arranged side by side on an annular raceway; and a seal member disposed to close a bearing space, which is a space interposed between the first bearing ring and the second bearing ring. At least one of the first bearing ring, the second bearing ring and each of the rolling elements is a high-strength bearing part wherein the high-strength bearing part is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 0.65 mass % of chromium with the rest consisting of an impurity, wherein the high-strength bearing part has a bearing contact surface, which is the first rolling contact surface, the second rolling contact surface or the rolling contact surface and which has a nitrogen concentration of not less than 0.25 mass %, and a remaining austenite amount in the bearing contact surface is not less than 6 volume % and not more than 12 volume %. The seal member has one end fixed to one of the first bearing ring and the second bearing ring, and has the other end that serves as a seal lip portion making contact with the other of the first bearing ring and the second bearing ring. The seal lip portion is made of such a high-wear material that by rotating the second bearing ring relative to the first bearing ring in a circumferential direction, the seal lip portion is worn out to bring into a state in which the other of the first bearing ring and the second bearing ring does not make contact with the seal lip portion or a state in which the other of the first bearing ring and the second bearing ring slightly makes contact with the seal lip portion to such an extent that a contact pressure between the other of the first bearing ring and the second bearing ring and the seal lip portion is able to be regarded as substantially zero.

The present inventors have examined a measure to attain a high level of indentation resistance and a high level of rolling fatigue life when a material equivalent to JIS SUJ2 (JIS SUJ2, ASTM 52100, DIN 100Cr6, GB GCr5 or GCr15, and OCT IIIX15), which is readily available across the globe, is used as a material thereof. As a result, the present inventors have obtained the following knowledge and arrived at the present invention.

By employing the above-described component composition, a standard steel readily available across the globe can be used as a material thereof. A long rolling fatigue life is attained when the steel having the component composition is used, the nitrogen concentration is increased to 0.25 mass % or more in the bearing contact surface, and the quench-hardening is provided. Here, when a remaining austenite amount is not particularly adjusted, the remaining austenite amount in the bearing contact surface will be about 20 volume % to 40 volume % due to a relation with the nitrogen amount. However, when the remaining austenite amount is thus large, indentation resistance will be decreased, disadvantageously. To address this, the remaining austenite amount is reduced to not more than 12 volume %, thereby achieving improved indentation resistance. On the other hand, if the remaining austenite amount is reduced to less than 6 volume %, the rolling fatigue life, particularly, rolling fatigue life in an environment (foreign matter introduction environment) in which a rigid foreign matter is introduced into the bearing will be decreased. Hence, the remaining austenite amount in the bearing contact surface is preferably set at not less than 6 volume %.

In view of these, the high-strength bearing part of the rolling bearing in the present invention employs, as its material, the material equivalent to JIS SUJ2 readily available across the globe, wherein the nitrogen concentration in the bearing contact surface is not less than 0.25 mass % and the remaining austenite amount therein is not less than 6 volume % and not more than 12 volume %.

In order to achieve a long rolling fatigue life, in particular, a long rolling fatigue life in the foreign matter introduction environment, it is effective to dispose a contact type seal member so as to suppress introduction of the foreign matter. However, if a general contact type seal member is employed, rotation torque of the rolling bearing will be increased, disadvantageously. To address this, in the rolling bearing of the present invention, the seal lip portion in contact with the bearing ring is made of a high-wear material that is readily worn out due to the rotation of the bearing ring so as to bring it out of the contact with the bearing ring or bring it into a state in which the contact is slight to such an extent that the contact pressure with the bearing ring can be regarded as substantially zero. As a result, rotation torque is suppressed from being increased while suppressing introduction of a foreign matter. Examples of the material of the seal lip portion include a rubber, a resin, and the like.

Thus, the rolling bearing of the present invention includes, as its component part, the high-strength bearing part attaining a high level of indentation resistance and a high level of rolling fatigue life while the material thereof is readily secured, and includes the seal member allowing for further improvement of the rolling fatigue life while suppressing increase of the rotation torque. As a result, according to the rolling bearing of the present invention, there can be provided a rolling bearing attaining a high level of indentation resistance and a high level of rolling fatigue life.

In order to further improve the indentation resistance, the remaining austenite amount in the bearing contact surface may be set at not more than 10%. Meanwhile, if the nitrogen concentration in the bearing contact surface becomes more than 0.5 mass %, cost is increased in introducing nitrogen into the steel and it becomes difficult to adjust the remaining austenite amount to fall within a desired range. Hence, the nitrogen concentration in the bearing contact surface is preferably set at not more than 0.5 mass % and may be set at not more than 0.4 mass %.

In the rolling bearing, at least each of the first bearing ring and the second bearing ring may be the high-strength bearing part described above. The indentation resistance is mattered particularly in the bearing ring. Hence, when at least one of the bearing rings is constructed of the above-described high-strength bearing part, the indentation resistance of the rolling bearing is improved more securely.

In the rolling bearing, the rolling element may be a ball. By employing the ball for the rolling element, the rotation torque of the rolling bearing is suppressed. Meanwhile, when the ball is used for the rolling element, the static rated load of the bearing is significantly decreased as compared with the roller bearing. Accordingly, the indentation resistance is particularly mattered. To address this, the rolling bearing of the present invention includes the high-strength bearing part excellent in indentation resistance. Hence, by employing the ball for the rolling element in the rolling bearing of the present invention, there can be provided a rolling bearing attaining a high level of indentation resistance and a high level of rolling fatigue life and attaining reduced rotation torque.

In the rolling bearing, the bearing contact surface may have a hardness of not less than 60.0 HRC. Accordingly, the rolling fatigue life and the indentation resistance can be improved further.

In the rolling bearing, the bearing contact surface may have a hardness of not more than 64.0 HRC. If the hardness of the bearing contact surface having the nitrogen concentration increased to 0.25 mass % or more is maintained to be more than 64.0 HRC, it becomes difficult to adjust the remaining austenite at 12 volume % or less. By setting the hardness of the bearing contact surface at not more than 64.0 HRC, the remaining austenite amount can be readily adjusted to fall within the range of not more than 12 volume %.

The rolling bearing may rotatably support a rotation member, which is rotated in a differential or a transmission, relative to another member disposed adjacent to the rotation member.

In the bearing used in the differential or the transmission, a high contact pressure is applied between the rolling element and the ring member. Hence, the bearing for use therein is required to attain not only a long rolling fatigue life but also improved indentation resistance. Hence, the rolling bearing of the present invention, which is capable of attaining a high level of indentation resistance and a high level of rolling fatigue life, is suitable as a bearing used in the differential or the transmission.

In the rolling bearing, when the rolling element is pressed against one of the first bearing ring and the second bearing ring at a maximum contact pressure of 4.4 GPa, an indentation formed in that one of the first bearing ring and the second bearing ring preferably has a depth of not more than 0.5 μm. By improving the indentation resistance to this level, there can be provided a rolling bearing usable in a particularly severe service condition. Further, the indentation depth is more preferably not more than 0.3 μm, and is further preferably not more than 0.2 μm.

A rolling bearing according to the present invention includes: a ring member; a plurality of balls disposed in contact with the ring member; and a cage that retains the plurality of balls at a predetermined pitch on an annular raceway. At least one of the ring member and each of the plurality of balls is a high-strength bearing part wherein the high-strength bearing part is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of iron and an impurity, the bearing part has a contact surface, which is a surface that makes contact with another part and has a nitrogen concentration of not less than 0.25 mass %, a remaining austenite amount in the contact surface is not less than 6 volume % and not more than 12 volume %. The cage is constructed by combining two annular cage plates each having hemispherical projecting portions provided at a predetermined interval in a circumferential direction, and the hemispherical projecting portions facing each other form a pocket retaining the ball. The pocket has a ball facing surface, which is a surface that faces the ball and is provided with a ball non-contact portion provided by a recess extending in the circumferential direction of the pocket. Assuming that a length of the ball non-contact portion in the circumferential direction of the pocket is represented by A, a diameter of the ball is represented by B, and a gap formed between the ball and the ball facing surface is represented by C, a value of A/(B+C) is set at 0.70 to 0.90.

The present inventors have examined a measure to attain a high level of indentation resistance and a high level of rolling fatigue life when a material equivalent to JIS SUJ2 (JIS SUJ2, ASTM 52100, DIN 100Cr6, GB GCr5 or GCr15, and OCT IIIX15), which is readily available across the globe, is used as a material thereof. As a result, it has been found that a high level of indentation resistance and a high level of rolling fatigue life can be attained by employing the above-described component composition, sufficiently securing the nitrogen concentration in the contact surface of the bearing part, and controlling the remaining austenite amount to an appropriate amount.

Specifically, by employing the above-described component composition, a standard steel readily available across the globe can be used as a material thereof. A long rolling fatigue life is attained when the steel having the component composition is used, the nitrogen concentration is increased to 0.25 mass % or more in the contact surface, and the quench-hardening is provided. Here, when a remaining austenite amount is not particularly adjusted, the remaining austenite amount in the contact surface will be about 20 volume % to 40 volume % due to a relation with the nitrogen amount. However, when the remaining austenite amount is thus large, indentation resistance will be decreased, disadvantageously. To address this, the remaining austenite amount is reduced to not more than 12 volume %, thereby achieving improved indentation resistance. On the other hand, if the remaining austenite amount is reduced to less than 6 volume %, the rolling fatigue life, particularly, rolling fatigue life in an environment (foreign matter introduction environment) in which a rigid foreign matter is introduced into the bearing will be decreased. Hence, the remaining austenite amount in the contact surface is preferably set at not less than 6 volume %.

In the rolling bearing of the present invention, the bearing part (at least one of the ring member and each of the plurality of balls) employs, as its material, the material equivalent to JIS SUJ2 readily available across the globe, wherein the nitrogen concentration in the contact surface is not less than 0.25 mass % and the remaining austenite amount therein is not less than 6 volume % and not more than 12 volume %. As a result, the bearing part of the rolling bearing of the present invention becomes a high-strength bearing part attaining a high level of indentation resistance and a high level of rolling fatigue life while the material thereof can be secured readily. In order to further improve the indentation resistance, the remaining austenite amount in the contact surface may be set at not more than 10%. Meanwhile, if the nitrogen concentration in the contact surface becomes more than 0.5 mass %, cost is increased in introducing nitrogen into the steel and it becomes difficult to adjust the remaining austenite amount to fall within a desired range. Hence, the nitrogen concentration in the contact surface is preferably set at not more than 0.5 mass % and may be set at not more than 0.4 mass %.

Further, in the cage of the rolling bearing of the present invention, by providing the ball facing surface of the pocket with the ball non-contact portion provided by the recess, the ball facing surface is provided with the ball contact portion serving as a guide way and the ball non-contact portion not serving as the guide way. It should be noted that the gap described above is intended to indicate a gap between the ball and the pocket guide way when the ball is brought to one side in the pocket.

Here, when the recess is provided in the pocket, for example, at the central portion in the pocket axial direction so as to extend in the pocket circumferential direction, a sliding area where the pocket inner wall and the ball are in contact with each other can be reduced by increasing the length of the recess in the pocket circumferential direction, which leads to reduction of the shearing resistance. However, if the length thereof in the pocket circumferential direction is made too long, the ball is brought into contact with the pocket at a boundary between the guide way (the ball contact portion) and the recess rather than the guide way. If the contact is thus made at the boundary, the oil film formed is significantly reduced to presumably result in damage on the surface. Hence, it is preferable that the "length in the pocket circumferential direction" is as large in size as possible to such an extent that the ball, inclusive of the movement of the ball in the pocket, can be retained in the pocket guide way (ball contact portion).

In the rolling bearing of the invention of the present application, assuming that a length of the ball non-contact portion in the circumferential direction of the pocket is represented by A, a diameter of the ball is represented by B, and a gap formed between the ball and the ball facing surface of the pocket is represented by C, a value of A/(B+C) is set at 0.70 to 0.90. Accordingly, the maximum low torque effect can be exhibited while satisfying the function as the bearing.

As described above, the rolling bearing of the present invention includes the bearing ring, the rolling element, and the cage, so that there can be provided a rolling bearing capable of attaining a high level of indentation resistance and a high level of rolling fatigue life while the material thereof is readily secured and attaining a low torque.

In the rolling bearing, the ring member may be the high-strength bearing part. Because the ring member particularly required to attain improved indentation resistance is constructed of the above-described high-strength bearing part, the ball bearing can be more readily applied to a portion to which a roller bearing has been applied.

In the rolling bearing, the contact surface may have a hardness of not less than 60.0 HRC. Accordingly, the rolling fatigue life and the indentation resistance can be improved further.

In the rolling bearing, the contact surface may have a hardness of not more than 64.0 HRC. If the hardness of the contact surface having the nitrogen concentration increased to 0.25 mass % or more is maintained to be more than 64.0 HRC, it becomes difficult to adjust the remaining austenite at 12 volume % or less. By setting the hardness of the contact surface at not more than 64.0 HRC, the remaining austenite amount can be readily adjusted to fall within the range of not more than 12 volume %.

In the rolling bearing, when the ball is pressed against the ring member at a maximum contact pressure of 4.4 GPa, an indentation formed in the ring member preferably has a depth of not more than 0.5 μm. Accordingly, a sufficient level of indentation resistance can be secured.

In the rolling bearing, assuming that a length of the ball non-contact portion in a pocket axial direction is represented by D and a total length of the pocket in the pocket axial direction is represented by E, a value of D/E may be set at 0.25 to 0.40.

When the length of the ball non-contact portion in the pocket axial direction is increased, the sliding area in contact becomes small, which leads to reduction of the shearing resistance. Meanwhile, the cage may be made of a metal and may be shaped by press working. In this case, there is a concern as to manufacturing, i.e., a difficulty in manufacturing may arise if the length of the ball non-contact portion is made too large in the pocket axial direction. In other words, the length of the ball non-contact portion in the pocket axial direction is preferably as large in size as possible to such an extent that the shape of the pocket is not deformed by the press working. By setting the value of D/E at 0.25 to 0.40, both reduction in shearing resistance and readiness in manufacturing can be attained.

In the rolling bearing, assuming that a depth of the recess providing the ball non-contact portion is represented by F and a thickness of the hemispherical projecting portion of the annular cage plate is represented by G, a value of F/G is set at 0.30 to 0.40.

By forming the recess, a gap larger than the level of surface roughness is provided between the ball and the pocket, thereby achieving a shearing resistance of "0". However, in consideration of precision in press working for the cage, it becomes difficult to secure sufficient precision in size if the depth of the recess is too small. On the other hand, if the depth of the recess is too large, the pocket may be deformed during the press working. By setting the value of F/G at 0.30 to 0.40, the shearing resistance can be reduced while the precision in size of the recess can be secured and the pocket can be avoided from being deformed.

In the rolling bearing, assuming that a total length of the pocket in a pocket axial direction is represented by E and an amount of displacement of a center of the ball non-contact portion relative to a center of the ball in the pocket axial direction is represented by H, a value of H/(E/2) may be set at 0 to 0.2.

When the central location of the recess in the pocket axial direction is displaced relative to the center of the ball in the pocket axial direction, balance becomes bad to result in deformation during the press working. This can be suppressed by setting the value of H/(E/2) at 0 to 0.2.

In the rolling bearing, the recess that provides the ball non-contact portion may have a curved opening edge in a pocket axial direction.

If the ball is brought into contact with the boundary between the recess and the pocket guide way (ball contact portion), the ability of forming the oil film is significantly decreased. Hence, as described above, the recess preferably has a size such that the ball does not make contact with the boundary. However, even when settings are made in design such that such contact does not take place, variation or the like in the manufacturing may cause the contact between the boundary and the ball. By providing the curved opening edge of the recess in the pocket axial direction, i.e., by providing the opening edge with a shape with curvature, damage can be avoided from being immediately caused even if such contact takes place.

Further, the ball non-contact portion may be provided in each pocket of the cage. Further, the cage may be made of a metal and may be shaped by press working, or may be made of a resin and may be shaped by injection molding.

In the rolling bearing, the ring member may include an inner ring, and an outer ring disposed to surround an outer circumference side of the inner ring, and the inner ring may have a groove curvature of not less than 1.02 and not more than 1.06 relative to the ball.

In the rolling bearing, the ring member may include an inner ring, and an outer ring disposed to surround an outer circumference side of the inner ring, and the outer ring may have a groove curvature of not less than 1.02 and not more than 1.08 relative to the ball.

A roller bearing is employed for a location to which a relatively large load is applied. Hence, when the rolling bearing of the present invention, which is the ball bearing, is applied to a portion to which a roller bearing has been applied, a relatively large load is applied to the rolling bearing of the present invention. This results in a large osculating ellipse between the ring member and the ball, which leads to a large sliding component (differential sliding and spin sliding) between the ring member and the ball. Accordingly, the rotation torque of the rolling bearing becomes large. To address this, by increasing the groove curvature of at least one of the inner ring and the outer ring relative to the ball to 1.02 or more, the sliding component can be reduced to achieve a low torque more securely. Specifically, by increasing the groove curvatures of the inner ring and the outer ring to 1.02, differential sliding can be approximately the half of that in the general structure, under conditions of a radial load Fr=500 N, an axial load Fa=0 N, and a rotational speed of 4000 rpm in the ball bearing of JIS 6207.

Meanwhile, when the groove curvatures of the inner ring and the outer ring are increased, a contact pressure between each of the inner ring and outer ring and the ball becomes large to presumably result in a short life of the bearing. Hence, it is preferable to set the groove curvature of each of the inner ring and the outer ring at a predetermined value or less. Specifically, the groove curvature of the inner ring relative to the ball is preferably 1.06 or less, and the groove curvature of the outer ring relative to the ball is preferably 1.08 or less. Here, the upper limit of the groove curvature of the outer ring is larger than that of the inner ring due to the following reason. That is, in a general design, a contact pressure between the outer ring and the ball is smaller than a contact pressure between the inner ring and the ball, so that there is room in increasing the groove curvature of the outer ring as compared with the groove curvature of the inner ring. It should be noted that the term "groove curvature" in the present application refers to a ratio of the curvature radius of the rolling contact surface in a cross section perpendicular to the circumferential direction of the bearing ring to the radius of the ball.

The rolling bearing may be used to support a motive power transmitting shaft of a vehicle. Moreover, the vehicle may be a motorcycle. The rolling bearing of the present invention is suitable for the application in which it is important to achieve a long life, a low torque and a compact size thereof.

A rolling bearing according to the present invention includes: a ring member; a plurality of balls disposed in contact with the ring member; and a cage that retains the plurality of balls at a predetermined pitch on an annular raceway. At least one of the ring member and each of the plurality of balls is a high-strength bearing part wherein the high-strength bearing part is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of iron and an impurity, the high-strength bearing part has a contact surface, which is a surface that makes contact with another part and has a nitrogen concentration of not less than 0.25 mass %, and a remaining austenite amount in the contact surface is not less than 6 volume % and not more than 12 volume %. The cage is constructed by combining two annular cage plates each having hemispherical projecting portions provided at a predetermined interval in a circumferential direction, and the hemispherical projecting portions facing each other form a pocket retaining the ball. In the pocket, a ball facing surface, which is a surface facing the ball, is provided with a ball non-contact portion. The contact area of the pocket with the ball is reduced by 15% to 30% as compared with the contact area thereof with the ball in the case where the ball non-contact portion is not provided.

The present inventors have examined a measure to attain a high level of indentation resistance and a high level of rolling fatigue life when a material equivalent to JIS SUJ2 (JIS SUJ2, ASTM 52100, DIN 100Cr6, GB GCr5 or GCr15, and OCT IIIX15), which is readily available across the globe, is used as a material thereof.

By employing the above-described component composition, a standard steel readily available across the globe can be used as a material thereof. A long rolling fatigue life is attained when the steel having the component composition is used, the nitrogen concentration is increased to 0.25 mass % or more in the contact surface, and the quench-hardening is provided. Here, when the remaining austenite amount is not particularly adjusted, the remaining austenite amount in the contact surface will be about 20 volume % to 40 volume % due to a relation with the nitrogen amount. However, when the remaining austenite amount is thus large, indentation resistance will be decreased, disadvantageously. To address this, the remaining austenite amount is reduced to not more than 12 volume %, thereby achieving improved indentation resistance. On the other hand, if the remaining austenite amount is reduced to less than 6 volume %, the rolling fatigue life, particularly, rolling fatigue life in an environment (foreign matter introduction environment) in which a rigid foreign matter is introduced into the bearing will be decreased. Hence, the remaining austenite amount in the contact surface is preferably set at not less than 6 volume %.

In view of these, in the rolling bearing of the present invention, the bearing part (at least one of the ring member and each of the plurality of balls) employs, as its material, the material equivalent to JIS SUJ2 readily available across the globe, wherein the nitrogen concentration in the contact surface is not less than 0.25 mass % and the remaining austenite amount therein is not less than 6 volume % and not more than 12 volume %. As a result, the bearing part of the rolling bearing of the present invention becomes a high-strength bearing part capable of attaining a high level of indentation resistance and a high level of rolling fatigue life while the material thereof can be secured readily. In order to further improve the indentation resistance, the remaining austenite amount in the contact surface may be set at not more than 10%. Meanwhile, if the nitrogen concentration in the contact surface becomes more than 0.5 mass %, cost is increased in introducing nitrogen into the steel and it becomes difficult to adjust the remaining austenite amount to fall within a desired range. Hence, the nitrogen concentration in the contact surface is preferably set at not more than 0.5 mass % and may be set at not more than 0.4 mass %.

Further, in the cage of the rolling bearing of the present invention, the ball non-contact portion provided in the ball facing surface provides reduced resistance when a lubricant passes through the inside of the pocket. Further, the ball non-contact portion thus provided allows for a reduced amount of oil film formed between the ball and the pocket. Here, if the ball non-contact portion is too small, the amount of reduction of the amount of oil film to be sheared is small, failing to achieve torque reduction. On the other hand, if the ball non-contact portion is too large, the amount of oil film formed between the ball and the pocket becomes too small, compromising smooth rolling of the ball. If the contact area with the ball, which is reduced by providing the ball non-contact portion, is larger than 30%, strength of the cage is decreased. If the contact area with the ball, which is reduced by providing the ball non-contact portion, is smaller than 15%, the torque cannot be sufficiently reduced. Hence, in the cage of the rolling bearing of the present invention, the contact area with the ball is reduced by 15% to 30% by providing the ball non-contact portion.

As described above, according to the rolling bearing of the present invention, there can be provided a rolling bearing capable of attaining a high level of indentation resistance and a high level of rolling fatigue life while the material thereof is readily secured and also attaining a low torque.

In the rolling bearing, the ring member may be a high-strength bearing part. Because the ring member particularly required to attain improved indentation resistance is constructed of the above-described high-strength bearing part, the ball bearing can be more readily applied to a portion to which a roller bearing has been applied.

In the rolling bearing, the contact surface may have a hardness of not less than 60.0 HRC. Accordingly, the rolling fatigue life and the indentation resistance can be improved further.

In the rolling bearing, the contact surface may have a hardness of not more than 64.0 HRC. If the hardness of the contact surface having the nitrogen concentration increased to 0.25 mass % or more is maintained to be more than 64.0 HRC, it becomes difficult to adjust the remaining austenite at 12 volume % or less. By setting the hardness of the contact surface at not more than 64.0 HRC, the remaining austenite amount can be readily adjusted to fall within the range of not more than 12 volume %.

In the rolling bearing, in the hemispherical projecting portion, the ball facing surface may be provided with a recess depressing toward a side opposite to the ball such that the recess constitutes the ball non-contact portion. Further, in the rolling bearing, the hemispherical projecting portion may be provided with a slit such that the slit constitutes the ball non-contact portion. By employing such a structure, the ball non-contact portion can be readily formed.

In the rolling bearing, the ball non-contact portion may be disposed at an outer diameter side relative to a pitch circle of the plurality of balls. Shearing resistance at a location involving a high circumferential speed can be reduced, thereby achieving reduction of torque more stably.

In the rolling bearing, the cage may be made of a metal and may be shaped by means of press working. Alternatively, in the rolling bearing, the cage may be made of a metal and may be shaped by means of casting. Alternatively, in the rolling bearing, the cage may be shaped by means of a cutting process. Alternatively, in the rolling bearing, the cage may be made of a resin and may be shaped by means of injection molding. Accordingly, the cage can be readily shaped to result in low cost.

In the rolling bearing, when the ball is pressed against the ring member at a maximum contact pressure of 4.4 GPa, an indentation formed in the ring member preferably has a depth of not more than 0.5 µm. Accordingly, a sufficient level of indentation resistance can be secured.

In the rolling bearing, the ring member may include an inner ring, and an outer ring disposed to surround an outer circumference side of the inner ring, and the inner ring may have a groove curvature of not less than 1.02 and not more than 1.06 relative to the ball.

In the rolling bearing, the ring member may include an inner ring, and an outer ring disposed to surround an outer circumference side of the inner ring, and the outer ring may have a groove curvature of not less than 1.02 and not more than 1.08 relative to the ball.

A roller bearing is employed for a portion to which a relatively large load is applied. Hence, when the rolling bearing of the present invention, which is the ball bearing, is applied to the portion to which a roller bearing has been applied, a relatively large load is applied to the rolling bearing of the present invention. This results in a large osculating ellipse between the ring member and the ball, which leads to a large sliding component (differential sliding and spin sliding) between the ring member and the ball. Accordingly, the rotation torque of the rolling bearing becomes large. To address this, by increasing the groove curvature of at least one of the inner ring and the outer ring relative to the ball to 1.02 or more, the sliding component can be reduced to achieve a low torque more securely. Specifically, by increasing the groove curvatures of the inner ring and the outer ring to 1.02, differential sliding can be approximately the half of that in the general structure, under conditions of a radial load Fr=500 N, an axial load Fa=0 N, and a rotational speed of 4000 rpm in the ball bearing of JIS 6207.

Meanwhile, when the groove curvatures of the inner ring and the outer ring are increased, a contact pressure between each of the inner ring and outer ring and the ball becomes large to presumably result in a short life of the bearing. Hence, it is preferable to set the groove curvature of each of the inner ring and the outer ring at a predetermined value or less. Specifically, the groove curvature of the inner ring relative to the ball is preferably 1.06 or less, and the groove curvature of the outer ring relative to the ball is preferably 1.08 or less. Here, the upper limit of the groove curvature of the outer ring is larger than that of the inner ring due to the following reason. That is, in a general design, a contact pressure between the outer ring and the ball is smaller than a contact pressure between the inner ring and the ball, so that there is room in increasing the groove curvature of the outer ring as compared with the groove curvature of the inner ring. It should be noted that the term "groove curvature" in the present application refers to a ratio of the curvature radius of the rolling contact surface in a cross section perpendicular to the circumferential direction of the bearing ring to the radius of the ball.

The rolling bearing may be used to support a motive power transmitting shaft of a vehicle. Moreover, the above vehicle may be a motorcycle. The rolling bearing of the present invention is suitable for the application in which it is important to achieve a long life, a low torque and a compact size thereof.

A rolling bearing according to the present invention includes: a ring member; a plurality of balls disposed in contact with the ring member; and a cage that retains the plurality of balls at a predetermined pitch on an annular raceway. At least one of the ring member and each of the plurality of balls is a high-strength bearing part wherein the high-strength bearing part is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of iron and an impurity, and the high-strength bearing part has a contact surface, which is a surface that makes contact with another part and has a nitrogen concentration of not less than 0.25 mass %, and a remaining austenite amount in the contact surface is not less than 6 volume % and not more than 12 volume %. The cage is formed by forming hemispherical pockets at a plurality of locations in the circumferential direction in the facing surfaces of two annular bodies facing in the axial direction so as to contain the balls therein, and bringing the facing surfaces into abutment with each other so as to join the two annular bodies together. The flange portion extending in the radial direction is provided at at least one of the inner diameter side and outer diameter side of the axial end portion of the annular body, the groove portion is provided in the ring member at the portion corresponding to the flange portion, and the labyrinth is formed by the flange portion and the groove portion.

The present inventors have examined a measure to attain a high level of indentation resistance and a high level of rolling fatigue life when a material equivalent to JIS SUJ2 (JIS SUJ2, ASTM 52100, DIN 100Cr6, GB GCr5 or GCr15, and OCT IIIX15), which is readily available across the globe, is used as a material thereof. As a result, it has been found that a high level of indentation resistance and a high level of rolling fatigue life can be attained by employing the above-described component composition, sufficiently securing the nitrogen concentration in the contact surface of the bearing part, and controlling the remaining austenite amount to an appropriate amount.

Specifically, by employing the above-described component composition, a standard steel readily available across the globe can be used as a material thereof. A long rolling fatigue life is attained when the steel having the component composition is used, the nitrogen concentration is increased to 0.25 mass % or more in the contact surface, and the quench-hardening is provided. Here, when the remaining austenite amount is not particularly adjusted, the remaining austenite amount in the contact surface will be about 20 volume % to 40 volume % due to a relation with the nitrogen amount. However, when the remaining austenite amount is thus large, indentation resistance will be decreased, disadvantageously. To address this, the remaining austenite amount is reduced to not more than 12 volume %, thereby achieving improved indentation resistance. On the other hand, if the remaining austenite amount is reduced to less than 6 volume %, the rolling fatigue life, particularly, rolling fatigue life in an environment (foreign matter introduction environment) in which a rigid foreign matter is introduced into the bearing will be decreased. Hence, the remaining austenite amount in the contact surface is preferably set at not less than 6 volume %.

In the rolling bearing of the present invention, the bearing part (at least one of the ring member and each of the plurality of balls) employs, as its material, the material equivalent to JIS SUJ2 readily available across the globe, wherein the nitrogen concentration in the contact surface is not less than 0.25 mass % and the remaining austenite amount therein is not less than 6 volume % and not more than 12 volume %. As a result, the bearing part of the rolling bearing of the present invention becomes a high-strength bearing part capable of attaining a high level of indentation resistance and a high level of rolling fatigue life while the material thereof can be secured readily. In order to further improve the indentation resistance, the remaining austenite amount in the contact surface may be set at not more than 10%. Meanwhile, if the nitrogen concentration in the contact surface becomes more than 0.5 mass %, cost is increased in introducing nitrogen into the steel and it becomes difficult to adjust the remaining austenite amount to fall within a desired range. Hence, the nitrogen concentration in the contact surface is preferably set at not more than 0.5 mass % and may be set at not more than 0.4 mass %.

In the cage of the rolling bearing of the present invention, the flange portion extending in the radial direction is provided at at least one of the inner diameter side and outer diameter side of the axial end portion of the annular body, the groove portion is provided in the ring member at the portion corresponding to the flange portion, and the labyrinth is formed by the flange portion and the groove portion. This labyrinth can suppress the lubricating oil from flowing into the bearing. Further, the labyrinth is constructed of the flange portions provided in the annular body and the groove portion provided in the ring member, so that the formation of the labyrinth can be attained only by changing the shapes of the cage and the ring member, for example. Hence, the number of parts and the number of assembly steps can be suppressed from being increased. Manufacturing cost can be reduced.

As described above, the rolling bearing of the present invention includes the ring member, the rolling element, and the cage, so that there can be provided a rolling bearing capable of attaining a high level of indentation resistance and a high level of rolling fatigue life while the material thereof is readily secured and attaining a low torque.

In the rolling bearing, the two annular bodies may have the same shape. This leads to reduced manufacturing cost of the part (annular body).

In the rolling bearing, the cage may have a shape symmetrical in the axial direction. In this way, when a centrifugal force is applied to the cage during an operation of the bearing, the two annular bodies included in the cage suppress themselves from being deformed. As a result, falling of the ball and interference between the cage and the ring member due to the deformation of the cage can be suppressed.

In the rolling bearing, the ring member may be the high-strength bearing part. Because the ring member particularly required to attain improved indentation resistance is constructed of the above-described high-strength bearing part, the ball bearing can be readily applied to an application in which a large load is applied.

In the rolling bearing, the contact surface may have a hardness of not less than 60.0 HRC. Accordingly, the rolling fatigue life and the indentation resistance can be improved further.

In the rolling bearing, the contact surface may have a hardness of not more than 64.0 HRC. If the hardness of the contact surface having the nitrogen concentration increased to 0.25 mass % or more is maintained to be more than 64.0 HRC, it becomes difficult to adjust the remaining austenite at 12 volume % or less. By setting the hardness of the contact surface at not more than 64.0 HRC, the remaining austenite amount can be readily adjusted to fall within the range of not more than 12 volume %.

In the rolling bearing, the pocket of the annular body may be provided with a pocket groove portion formed to extend in the radial direction of the annular body. This reduces a contact area between the cage and the ball, thereby achieving a low torque.

Further, the pocket groove portion may be formed to extend through the annular body so as to connect the inner diameter side and outer diameter side of the annular body to each other. Accordingly, lubricating oil between the cage and the ball are discharged due to centrifugal force, thereby achieving a lower torque.

In the rolling bearing, an inter-pocket groove portion may be formed in the facing surface between adjacent ones of the pockets of the annular body so as to extend through the annular body in the radial direction of the annular body to connect an inner diameter side and an outer diameter side of the annular body to each other. Accordingly, lubricating oil between the cage and the ball are discharged due to centrifugal force, thereby achieving a lower torque.

In the rolling bearing, the flange portion preferably has an axial thickness of not less than 0.15 mm, which is 20% or less of a diameter of the ball.

If the axial thickness of the flange portion is less than 0.15 mm, the flange portion is likely to have insufficient strength or is likely to be poorly shaped. On the other hand, if the axial thickness of the flange portion is larger than the diameter of the ball by more than 20%, the increase in axial size of the cage leads to increase in axial size of the inner and outer rings, with the result that the bearing is prevented from being compact. By setting the axial thickness of the flange portion to fall within the appropriate range, occurrence of such a problem can be suppressed.

In the rolling bearing, the cage may have a flat end surface. This reduces stirring resistance of lubricating oil coming into the relief portion, thereby achieving a lower torque.

In the rolling bearing, the cage may be made of a polyamide resin, a polyether ether ketone resin, or a polyphenylene sulfide resin. Each of these materials is suitable as a material of the cage of the rolling bearing of the present invention.

In the rolling bearing, when the ball is pressed against the ring member at a maximum contact pressure of 4.4 GPa, an indentation formed in the ring member preferably has a depth of not more than 0.5 μm. Accordingly, a sufficient level of indentation resistance can be secured. Further, the indentation depth is more preferably 0.2 μm or less.

The rolling bearing can be used in a motor or a speed reducer of a vehicle employing an engine or a motor as a motive power source, for example. Further, the flange portion of the cage is preferably positioned to prevent linear flow of the lubricating oil into the bearing and the flange portion preferably provides the labyrinth structure.

A deep groove ball bearing according to the present invention includes: an inner ring having an inner ring groove at its outer circumference side; an outer ring disposed to surround the inner ring and having an outer ring groove at its inner circumference side; a plurality of balls disposed in contact with the inner ring groove and the outer ring groove at their ball rolling contact surfaces; and a cage that retains the plurality of balls at a predetermined pitch on an annular raceway. At least one of the inner ring, the outer ring, and each of the plurality of balls is a high-strength bearing part wherein the high-strength bearing part is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of iron and an impurity, the high-strength bearing part has a contact surface, which is a surface that makes contact with another part and has a nitrogen concentration of not less than 0.25 mass %, and a remaining austenite amount in the contact surface is not less than 6 volume % and not more than 12 volume %. Of the four shoulders positioned at the respective sides of the outer ring groove and the inner ring groove, the shoulder at one side of the outer ring groove is higher than the height of the shoulder at the other side of the outer ring groove and the height of the shoulder at the other side of the inner ring groove is higher than the height of the shoulder at one side of the inner ring groove.

The present inventors have examined a measure to attain a high level of indentation resistance and a high level of rolling fatigue life when a material equivalent to JIS SUJ2 (JIS SUJ2, ASTM 52100, DIN 100Cr6, GB GCr5 or GCr15, and OCT IIIX15), which is readily available across the globe, is used as a material thereof. As a result, it has been found that a high level of indentation resistance and a high level of rolling fatigue life can be attained by employing the above-described component composition, sufficiently securing the nitrogen concentration in the contact surface of the bearing part (the outer ring, the inner ring, and the ball), and controlling the remaining austenite amount to an appropriate amount.

Specifically, by employing the above-described component composition, a standard steel readily available across the globe can be used as a material thereof. A long rolling fatigue life is attained when the steel having the component composition is used, the nitrogen concentration is increased to 0.25 mass % or more in the contact surface, and the quench-hardening is provided. Here, when a remaining austenite amount is not particularly adjusted, the remaining austenite amount in the contact surface will be about 20 volume % to 40 volume % due to a relation with the nitrogen amount. However, when the remaining austenite amount is thus large, indentation resistance will be decreased, disadvantageously. To address this, the remaining austenite amount is reduced to not more than 12 volume %, thereby achieving improved indentation resistance. On the other hand, if the remaining austenite amount is reduced to less than 6 volume %, the rolling fatigue life, particularly, rolling fatigue life in an environment (foreign matter introduction environment) in which a rigid foreign matter is introduced into the bearing will be decreased. Hence, the remaining austenite amount in the contact surface is preferably set at not less than 6 volume %.

In the deep groove ball bearing of the present invention, the bearing part (at least one of the outer ring, the inner ring, and each of the plurality of balls) employs, as its material, the material equivalent to JIS SUJ2 readily available across the globe, wherein the nitrogen concentration in the contact surface is not less than 0.25 mass % and the remaining austenite amount therein is not less than 6 volume % and not more than 12 volume %. As a result, the bearing part of the deep groove ball bearing of the present invention becomes a high-strength bearing part capable of attaining a high level of indentation resistance and a high level of rolling fatigue life while the material thereof can be secured readily. In order to further improve the indentation resistance, the remaining austenite amount in the contact surface may be set at not more than 10%. Meanwhile, if the nitrogen concentration in the contact surface becomes more than 0.5 mass %, cost is increased in introducing nitrogen into the steel and it becomes difficult to adjust the remaining austenite amount to fall within a desired range. Hence, the nitrogen concentration in the contact surface is preferably set at not more than 0.5 mass % and may be set at not more than 0.4 mass %.

In each of the outer ring and the inner ring included in the deep groove ball bearing of the present invention, among four shoulders respectively disposed at sides of the outer ring groove and the inner ring groove, a shoulder at one side of the outer ring groove and a shoulder at the other side of the inner ring groove respectively have heights higher than heights of a shoulder at the other side of the outer ring groove and a shoulder at the one side of the inner ring groove. Accordingly, the bearing is disposed and used such that the load-side shoulder receiving the thrust load is higher, thereby suppressing the ball from being brought onto the shoulder.

As described above, according to the deep groove ball bearing of the present invention, there can be provided a deep groove ball bearing capable of attaining a high level of indentation resistance and a high level of rolling fatigue life while the material thereof is readily secured and also capable of handling a thrust load.

In the deep groove ball bearing, the cage may include a cylindrical first divided cage made of a synthetic resin and a cylindrical second divided cage made of a synthetic resin and fitted in inside of the first divided cage, and each of the first divided cage and the second divided cage has an annular body and has a crown shape such that plural pairs of pocket pawls are formed side by side at an equal interval at one side surface of the annular body in an axial direction, each pair of pocket pawls face each other, and a ball retaining pocket obtained by hollowing out the annular body and having a size exceeding ½ circle is provided between each pair of pocket pawls. The first divided cage may be inserted into the bearing from a side of the shoulder, which has a lower shoulder height, of the outer ring, and the second divided cage may be inserted into the bearing from a side of the shoulder, which has a lower shoulder height, of the inner ring such that the pocket has a combination of open ends directed in opposite directions, and a joining portion is provided between the first divided cage and the second divided cage so as to engage the cages through fit and prevent the cages from being separated in the axial direction.

With this, the assembly of the bearing is facilitated. Moreover, even under application of a large moment load, the cage can be suppressed from falling due to the ball moving backward or forward, and the cage can be avoided from interfering with the shoulder of the ring groove.

In the deep groove ball bearing, an engaging pawl facing inwardly may be provided between pocket pawls of adjacent pockets of the first divided cage, an engaging pawl facing outwardly may be provided between pocket pawls of adjacent pockets of the second divided cage, the engaging pawl of the first divided cage may be engaged with an engagement recess formed in the outer diameter surface of the second divided cage, and the engaging pawl of the second divided cage may be engaged with an engagement recess formed in the inner diameter surface of the first divided cage. In this way, the first divided cage and the second divided cage can be readily coupled to each other.

On this occasion, three or more engagement portions may be provided between the engaging pawl and the engagement recess. In this way, the first divided cage and the second divided cage can be more securely joined to each other.

In the deep groove ball bearing, a circumferential gap formed between the engaging pawl and the engagement recess may be set to be larger than a circumferential pocket gap formed between the ball and the pocket.

In this way, even when a large moment load is applied to cause the ball to move backward or forward and the first divided cage and the second divided cage are rotated relative to each other, the engaging pawl is not brought into abutment with the side surface which the engaging pawl faces in the circumferential direction of the engagement recess, thereby effectively preventing damage on the engaging pawl.

In the deep groove ball bearing, an axial gap formed between the engaging pawl and the engagement recess may be set to be larger than an axial pocket gap formed between the ball and the pocket.

In this way, even when axial force is exerted in a direction of separating the first divided cage and the second divided cage from each other, the inner surfaces of the pair of pocket pawls facing each other are brought into abutment with the outer circumferential surface of the ball, thereby avoiding the engaging pawls from being brought into abutment with the axial end surface of the engagement recess. Accordingly, damage on the engaging pawls is effectively prevented.

In the deep groove ball bearing, the first divided cage and the second divided cage may have different hues. Accordingly, based on the hues of the divided cages, an operator can distinguish the first divided cage and the second divided cage from each other so as to attain an appropriate arrangement of the divided cages, thereby facilitating assembly and attachment of the bearing.

In the deep groove ball bearing, the inner circumferential surface of the pocket may be provided with a relief portion, which does not make contact with the ball.

As described above, when the cage is constructed of the combination of the first divided cage and the second divided cage and the bearing including such a cage is used in a foreign matter introduction lubrication condition, foreign matters are likely to be accumulated between the first divided cage and the second divided cage. This may become a factor of short life of the bearing. To address this, the relief portion is provided as described above to improve passage of the lubricating oil in the pocket surface, thereby suppressing the accumulation of the foreign matters as described above.

In the deep groove ball bearing, a pair of the relief portions may be provided for each pocket so as to include regions equally distant away from the center of the bottom of the pocket. Further, the shape of the relief portion in a plane perpendicular to the thickness direction of the divided cage may be a curved shape (such as a spherical shape or a U-shape). Further, in the plane perpendicular to the thickness direction of the divided cage, the bottom portion of each of the pair of the relief portions and the center of the bottom of the pocket may be on the same straight line. Accordingly, passage of the lubricating oil can be improved more securely.

The deep groove ball bearing may be lubricated using lubricating oil. In this case, the first divided cage and the second divided cage are preferably formed using a synthetic resin excellent in oil resistance. Examples of such a resin include polyamide 46 (PA46), polyamide 66 (PA66), and polyphenylenesulfide (PPS). Of these resins, polyphenylenesulfide (PPS) is more excellent in oil resistance than other resins. Hence, for the oil resistance, it is most preferable to use polyphenylenesulfide (PPS).

On the other hand, for the cost of the resin material, it is preferable to use polyamide 66 (PA66) and the material of the cage may be appropriately determined depending on a type of lubricating oil.

In the deep groove ball bearing, if the height of the high-height shoulder becomes higher than necessary, the ball cannot be incorporated. On the other hand, if the height thereof is too low, the ball will be brought onto the shoulder. Accordingly, assuming that the shoulder height of the high-height shoulder is represented by $H_1$ and the spherical diameter of the ball is represented by d, a ratio $H_1/d$ of shoulder height $H_1$ relative to spherical diameter d of the ball may be in a range of 0.25 to 0.50.

In the deep groove ball bearing, each of the outer ring and the inner ring may be the above-described high-strength bearing part. Because each of the outer ring and inner ring particularly required to attain improved indentation resistance is constructed of the above-described high-strength bearing part, the deep groove ball bearing can be more readily applied to a portion to which a roller bearing has been applied.

In the deep groove ball bearing, the contact surface may have a hardness of not less than 60.0 HRC. Accordingly, the rolling fatigue life and the indentation resistance can be improved further.

In the deep groove ball bearing, the contact surface may have a hardness of not more than 64.0 HRC. If the hardness of the contact surface having the nitrogen concentration increased to 0.25 mass % or more is maintained to be more than 64.0 HRC, it becomes difficult to adjust the remaining austenite at 12 volume % or less. By setting the hardness of the contact surface at not more than 64.0 HRC, the remaining austenite amount can be readily adjusted to fall within the range of not more than 12 volume %.

In the deep groove ball bearing, when the ball is pressed against each of the inner ring and the outer ring at a maximum contact pressure of 4.4 GPa, an indentation formed in each of the inner ring and the outer ring preferably has a depth of not more than 0.5 μm. Accordingly, a sufficient level of indentation resistance can be secured.

In the deep groove ball bearing, the inner ring may have a groove curvature of not less than 1.02 and not more than 1.06 relative to the ball. In the deep groove ball bearing, the outer ring may have a groove curvature of not less than 1.02 and not more than 1.08 relative to the ball.

A roller bearing is employed for a portion to which a relatively large load is applied. Hence, when the deep groove ball bearing of the present invention, which is the ball bearing, is applied to the portion to which a roller bearing has been applied, a relatively large load is applied to the deep groove ball bearing of the present invention. This results in a large osculating ellipse between the ring member and the ball, which leads to a large sliding component (differential sliding and spin sliding) between the ring member and the ball. Accordingly, the rotation torque of the deep groove ball bearing becomes large. To address this, by increasing the groove curvature of at least one of the inner ring and the outer ring relative to the ball to 1.02 or more, the sliding component can be reduced to achieve a low torque more securely. Further, by increasing the groove curvature of the bearing ring, the ball can be suppressed from being brought onto the shoulder.

Meanwhile, when the groove curvatures of the inner ring and the outer ring are increased, a contact pressure between each of the inner ring and outer ring and the ball becomes large to presumably result in a short life of the bearing. Hence, it is preferable to set the groove curvature of each of the inner ring and the outer ring at a predetermined value or less. Specifically, the groove curvature of the inner ring relative to the ball is preferably 1.06 or less, and the groove curvature of the outer ring relative to the ball is preferably 1.08 or less. Here, the upper limit of the groove curvature of the outer ring is larger than that of the inner ring due to the following reason.

That is, in a general design, a contact pressure between the outer ring and the ball is smaller than a contact pressure between the inner ring and the ball, so that there is room in increasing the groove curvature of the outer ring as compared with the groove curvature of the inner ring. It should be noted that the term "groove curvature" in the present application refers to a ratio of the curvature radius of the surface of the ring groove in a cross section perpendicular to the circumferential direction of the bearing ring to the radius of the ball.

The deep groove ball bearing may be used to support a motive power transmitting shaft of a vehicle. Moreover, the vehicle may be a motorcycle. The deep groove ball bearing of the present invention is suitable for an application in which it is important to achieve a long life, a low torque and a compact size thereof.

Advantageous Effects of Invention

As apparent from the description above, according to the bearing part, the rolling bearing, and the methods of manufacturing them in the present invention, there can be provided a bearing part, a rolling bearing, and methods of manufacturing them, by each of which a high level of indentation resistance and a high level of rolling fatigue life can be attained while the material thereof can be secured readily.

DESCRIPTION OF EMBODIMENTS

Figure 1:
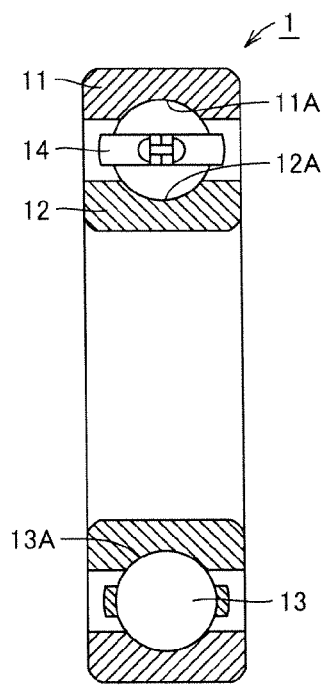
FIG. 1 is a schematic cross sectional view showing a configuration of a deep groove ball bearing.

The following describes embodiments of the present invention with reference to figures. It should be noted that in the below-mentioned figures, the same or corresponding portions are given the same reference characters and are not described repeatedly.

(First Embodiment)

Figure 2:
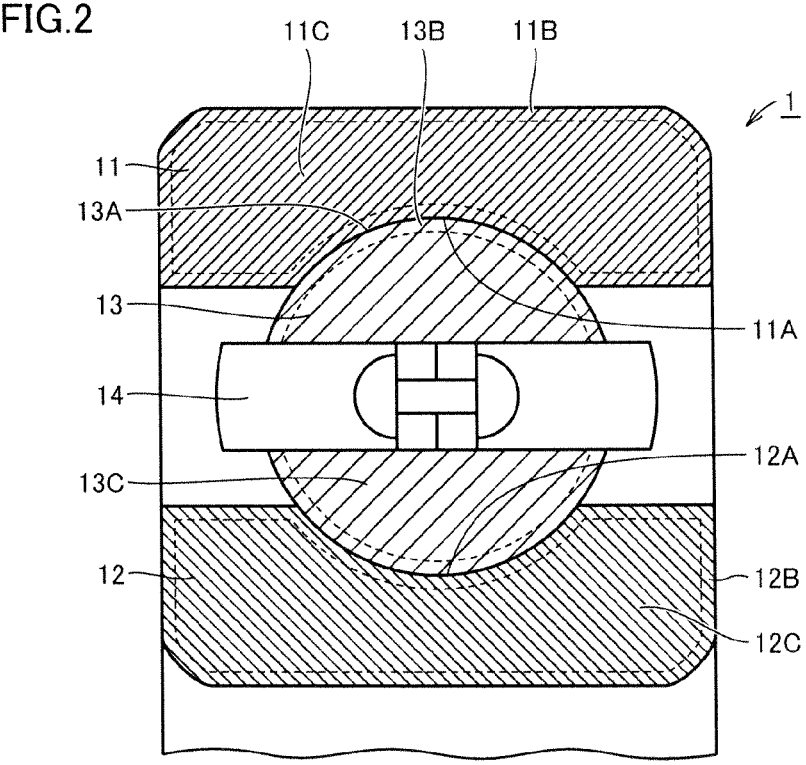
FIG. 2 is a schematic partial cross sectional view showing a main portion of FIG. 1 in an enlarged manner.

Hereinafter, one embodiment of the present invention, i.e., a first embodiment will be described. Referring to FIG. 1 and FIG. 2, a deep groove ball bearing 1, which is a rolling bearing in the first embodiment, includes: an outer ring 11 which is a bearing part and serves as a first ring member; an inner ring 12, which is a bearing part and serves as a second ring member; balls 13, which are bearing parts and serve as a plurality of rolling elements; and a cage 14. Outer ring 11 is provided with an outer ring rolling contact surface 11A serving as a first rolling contact surface of an annular shape. Inner ring 12 is provided with an inner ring rolling contact surface 12A serving as a second rolling contact surface of an annular shape opposite to outer ring rolling contact surface 11A. Further, each of the plurality of balls 13 is provided with a ball rolling contact surface 13A (surface of ball 13) serving as a rolling element contact surface. Outer ring rolling contact surface 11A, inner ring rolling contact surface 12A, and ball rolling contact surface 13A serve as contact surfaces of these bearing parts. Further, balls 13 are in contact with outer ring rolling contact surface 11A and inner ring rolling contact surface 12A at ball rolling contact surfaces 13A and are arranged circumferentially at a predetermined pitch using cage 14 annular in shape. Accordingly, balls 13 can be held to be rollable on the annular raceway. With the above-described configuration, outer ring 11 and inner ring 12 of deep groove ball bearing 1 are rotatable relative to each other.

Referring to FIG. 2, each of outer ring 11, inner ring 12 and balls 13 serving as the bearing parts is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of an impurity. Regions thereof including outer ring rolling contact surface 11A, inner ring rolling contact surface 12A, and ball rolling contact surface 13A serving as the contact surfaces are provided with nitrogen enriched layers 11B, 12B, 13B formed to have nitrogen concentrations higher than those of inner portions 11C, 12C, 13C. The nitrogen concentration is not less than 0.25 mass % in each of the surfaces of nitrogen enriched layers 11B, 12B, 13B, i.e., in outer ring rolling contact surface 11A, inner ring rolling contact surface 12A, and ball rolling contact surface 13A serving as the contact surfaces. Further, a remaining austenite amount in each of outer ring rolling contact surface 11A, inner ring rolling contact surface 12A and ball rolling contact surface 13A is not less than 6 volume % and not more than 12 volume %.

Each of outer ring 11, inner ring 12, and ball 13, which are the bearing parts in the present embodiment, is made of a steel having a component composition equivalent to the JIS SUJ2 steel. Hence, the material thereof is readily available across the globe. A long rolling fatigue life is attained when the steel having the component composition is used, the nitrogen concentration is increased to 0.25 mass % or more in each of outer ring rolling contact surface 11A, inner ring rolling contact surface 12A and ball rolling contact surface 13A, and the quench-hardening is provided. Further, when the remaining austenite amount is reduced to 12 volume % or less, indentation resistance is improved. When the remaining austenite amount is set at 6 volume % or more, the rolling fatigue life, in particular, rolling fatigue life under a foreign matter introduction environment is maintained at an appropriate level. As a result, each of outer ring 11, inner ring 12, and ball 13 becomes a bearing part capable of attaining a high level of indentation resistance and a high level of rolling fatigue life while the material thereof can be secured readily.

It should be noted that each of the contact surfaces of outer ring 11, inner ring 12 and ball 13, i.e., outer ring rolling contact surface 11A, inner ring rolling contact surface 12A and ball rolling contact surface 13A preferably has a hardness of not less than 60.0 HRC. Accordingly, the rolling fatigue life and the indentation resistance can be improved further.

Further, each of outer ring rolling contact surface 11A, inner ring rolling contact surface 12A and ball rolling contact surface 13A of outer ring 11, inner ring 12 and ball 13 preferably has a hardness of not more than 64.0 HRC. In this way, the remaining austenite amount in each of outer ring rolling contact surface 11A, inner ring rolling contact surface 12A and ball rolling contact surface 13A can be readily adjusted to fall within a range of 12 volume % or less.

Figure 3:
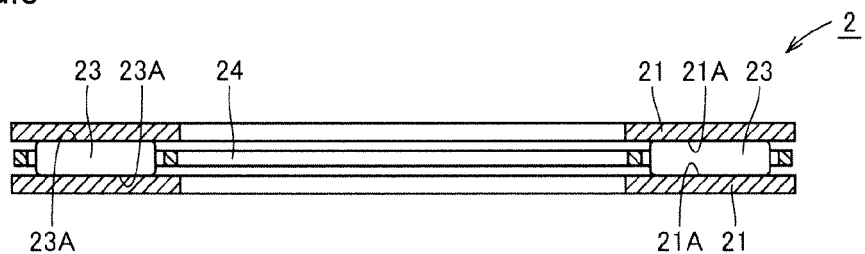
FIG. 3 is a schematic cross sectional view showing a configuration of a thrust roller bearing.
Figure 4:
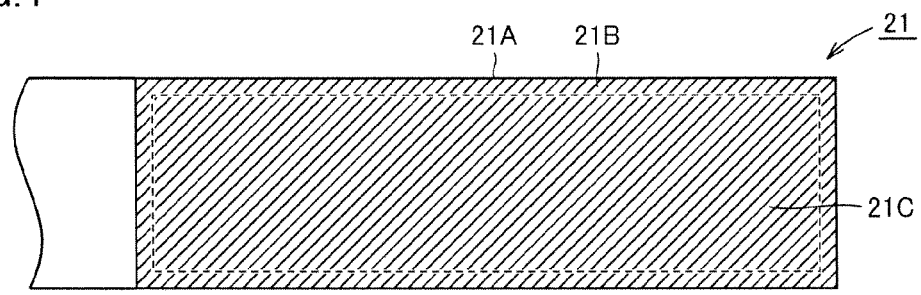
FIG. 4 is a schematic partial cross sectional view of a bearing ring of FIG. 3.
Figure 5:
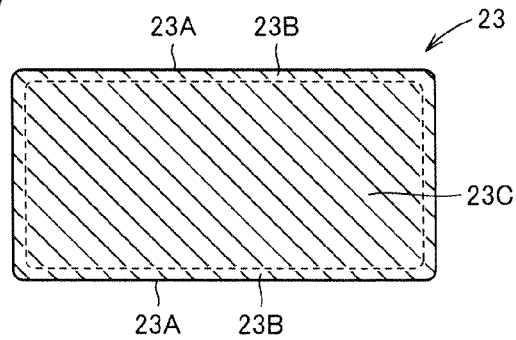
FIG. 5 is a schematic cross sectional view of a roller of FIG. 3.

Referring to FIG. 3 to FIG. 5, a thrust needle roller bearing 2, which is a rolling bearing in a modification of the first embodiment, has basically the same configuration and provides the same effect as those of deep groove ball bearing 1 described above. However, thrust needle roller bearing 2 is different from deep groove ball bearing 1 in terms of configurations of the ring members and rolling elements. Specifically, thrust needle roller bearing 2 includes: a pair of bearing rings 21 having disk-like shapes, arranged such that their main surfaces face each other, and serving as ring members; a plurality of needle rollers 23 serving as rolling elements; and an annular cage 24. The plurality of needle rollers 23 have rolling contact surfaces 23A, which are outer circumferential surfaces of needle rollers 23 and are in contact with bearing ring rolling contact surfaces 21A formed at the main surfaces of the pair of bearing rings 21 facing each other. Moreover, the plurality of needle rollers 23 are arranged using cage 24 at a predetermined pitch in the circumferential direction and are therefore held to be rollable on the annular raceway. With the above-described configuration, the pair of bearing rings 21 of thrust needle roller bearing 2 are rotatable relative to each other.

Bearing rings 21 of thrust needle roller bearing 2 respectively correspond to outer ring 11 and inner ring 12 of the deep groove ball bearing. Needle roller 23 of thrust needle roller bearing 2 corresponds to ball 13 of the deep groove ball bearing. They are made of the same material, and have nitrogen enriched layers 21B, 23B, inner portions 21C, 23C, and bearing ring rolling contact surface 21A and rolling contact surface 23A similar in nitrogen concentration and remaining austenite amount. Accordingly, each of bearing rings 21 and needle roller 23 becomes a bearing part capable of attaining a high level of indentation resistance and a high level of rolling fatigue life while the material thereof can be secured readily.

Figure 6:
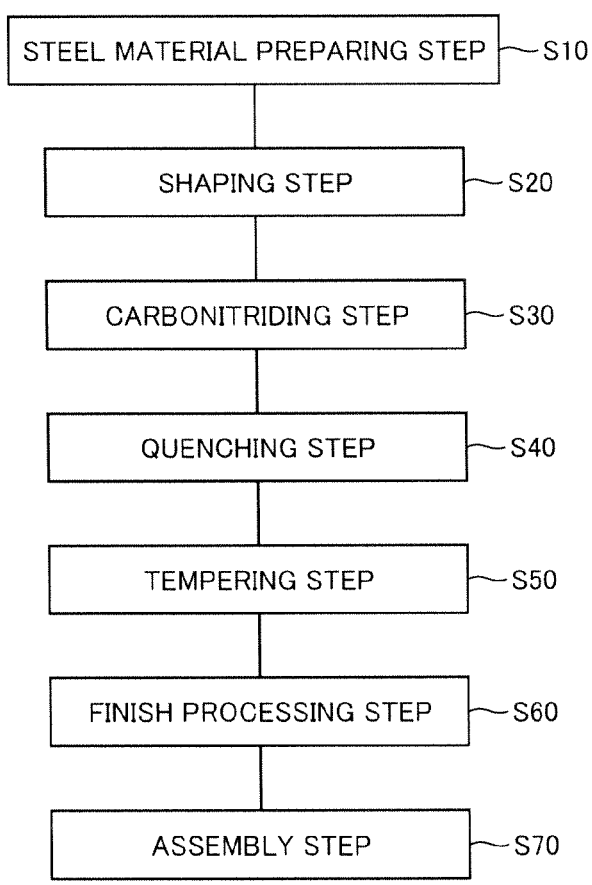
FIG. 6 is a flowchart showing the gist of a method of manufacturing the rolling bearing.

The following describes methods of manufacturing the bearing part and the rolling bearing in the present embodiment. Referring to FIG. 6, a steel material preparing step is first performed as a step (S10). In this step (S10), there is prepared a steel material formed of a steel of JIS SUJ2 or steels equivalent to JIS SUJ2 such as ASTM 52100, DIN 100Cr6, GB GCr5 or GCr15, and OCT IIIX15. Specifically, a bar steel, a steel wire, or the like is prepared which has the above-described component composition, for example.

Next, a shaping step is performed as a step (S20). In this step (S20), for example, the bar steel or steel wire prepared in the step (S10) is subjected to processes such as forging and turning, thereby fabricating a shaped member, which has been formed into the shape of outer ring 11, inner ring 12, ball 13, bearing ring 21, needle roller 23 or the like in FIG. 1 to FIG. 5.

Next, a carbonitriding step is performed as a step (S30). In this step (S30), the shaped member fabricated in the step (S20) is subjected to a carbonitriding treatment. This carbonitriding treatment can be performed as follows, for example. First, the shaped member is preheated for not less than 30 minutes and not more than 90 minutes in a temperature range of not less than about 780° C. and not more than about 820° C. Next, the shaped member thus preheated is carbonitrided by being heated in an atmosphere including an ammonia gas in addition to an endothermic gas, such as RX gas, having a carbon potential adjusted through addition of propane gas or butane gas as an enriching gas. The temperature of the carbonitriding treatment can be set at not less than 820° C. and not more than 880° C., for example. Further, a time for the carbonitriding treatment can be set in accordance with the nitrogen concentration of the nitrogen enriched layer to be formed in the shaped member. For example, the time can be set at not less than 3 hours and not more than 9 hours. Accordingly, the nitrogen enriched layer can be formed while suppressing decarbonization of the shaped member.

Next, a quenching step is performed as a step (S40). In this step (S40), the shaped member having the nitrogen enriched layer formed therein through the carbonitriding treatment in the step (S30) is rapidly cooled from a predetermined quenching temperature for the purpose of a quenching treatment. This quenching temperature is set at not more than 860° C. so as to readily adjust balance between a carbon dissolved amount and a carbon precipitated amount in a subsequent tempering step and the remaining austenite amount. Further, the quenching temperature is set at not less than 820° C. so as to readily adjust balance between the carbon dissolved amount and the carbon precipitated amount in the subsequent tempering step and the remaining austenite amount. The quenching treatment can be performed by, for example, soaking the shaped member into quenching oil that is maintained at a predetermined temperature and that serves as coolant.

Next, the tempering step is performed as a step (S50). In this step (S50), the shaped member having been through the quenching treatment in the step (S40) is subjected to a tempering treatment. Specifically, for example, the tempering treatment is performed by retaining the shaped member for not less than 0.5 hour and not more than 3 hours in an atmosphere heated to fall in a temperature range of not less than 210° C. and not more than 300° C.

Next, a finish processing step is performed as a step (S60). In this step (S60), the shaped member having been through the tempering treatment in the step (S50) is processed to form the contact surface, which is a surface to make contact with other parts, i.e., outer ring rolling contact surface 11A, inner ring rolling contact surface 12A and ball rolling contact surface 13A of deep groove ball bearing 1, and bearing ring rolling contact surface 21A and rolling contact surface 23A of thrust needle roller bearing 2. As the finish process, a grinding process can be performed, for example. With the above steps, outer ring 11, inner ring 12, ball 13, bearing ring 21, needle roller 23 or the like serving as the bearing part in the present embodiment is completed.

Furthermore, an assembly step is performed as a step (S70). In this step (S70), deep groove ball bearing 1 or thrust needle roller bearing 2 in the above-described embodiment is assembled by combining outer ring 11, inner ring 12 and ball 13, or bearing rings 21 and needle roller 23 fabricated through the steps (S10) to (S60) with cage 14, 24 separately prepared. In this way, the method of manufacturing the rolling bearing in the present embodiment is completed.

Here, in the above-described step (S30), the shaped member is carbonitrided such that the finish process in the subsequent step (S60) will provide a nitrogen concentration of not less than 0.25 mass % in the contact surface, i.e., outer ring rolling contact surface 11A, inner ring rolling contact surface 12A and ball rolling contact surface 13A of deep groove ball bearing 1, and bearing ring rolling contact surface 21A and rolling contact surface 23A of thrust needle roller bearing 2. In other words, in consideration of a removal amount in the step (S60), there are formed nitrogen enriched layers 11B, 12B, 13B, 21B, 23B adjusted in nitrogen amount to achieve a nitrogen concentration of not less than 0.25 mass % in the surface after the completion of the contact surface.

Further, in the above-described step (S50), the shaped member is tempered such that the finish process in the subsequent step (S60) will provide a remaining austenite amount of not less than 6 volume % and not more than 12 volume % in the contact surface, i.e., outer ring rolling contact surface 11A, inner ring rolling contact surface 12A and ball rolling contact surface 13A of deep groove ball bearing 1, and bearing ring rolling contact surface 21A and rolling contact surface 23A of thrust needle roller bearing 2. In other words, in consideration of the removal amount in the step (S60), the remaining austenite amount is adjusted by the tempering treatment to achieve a remaining austenite amount of not less than 6 volume % and not more than 12 volume % in the surface after the completion of the contact surface. In this way, the bearing part in the present embodiment can be manufactured.

Further, in the step (S50), the shaped member is preferably tempered in a temperature range of not less than 240° C. and not more than 300° C. Accordingly, the carbon dissolved in the base by the quenching treatment is precipitated at an appropriate ratio as a carbide. As a result, appropriate balance is attained between solid-solution strengthening and precipitation strengthening, thereby improving indentation resistance in outer ring 11, inner ring 12, ball 13, bearing ring 21, and needle roller 23 each serving as the bearing part.

(Second Embodiment)

Figure 7:
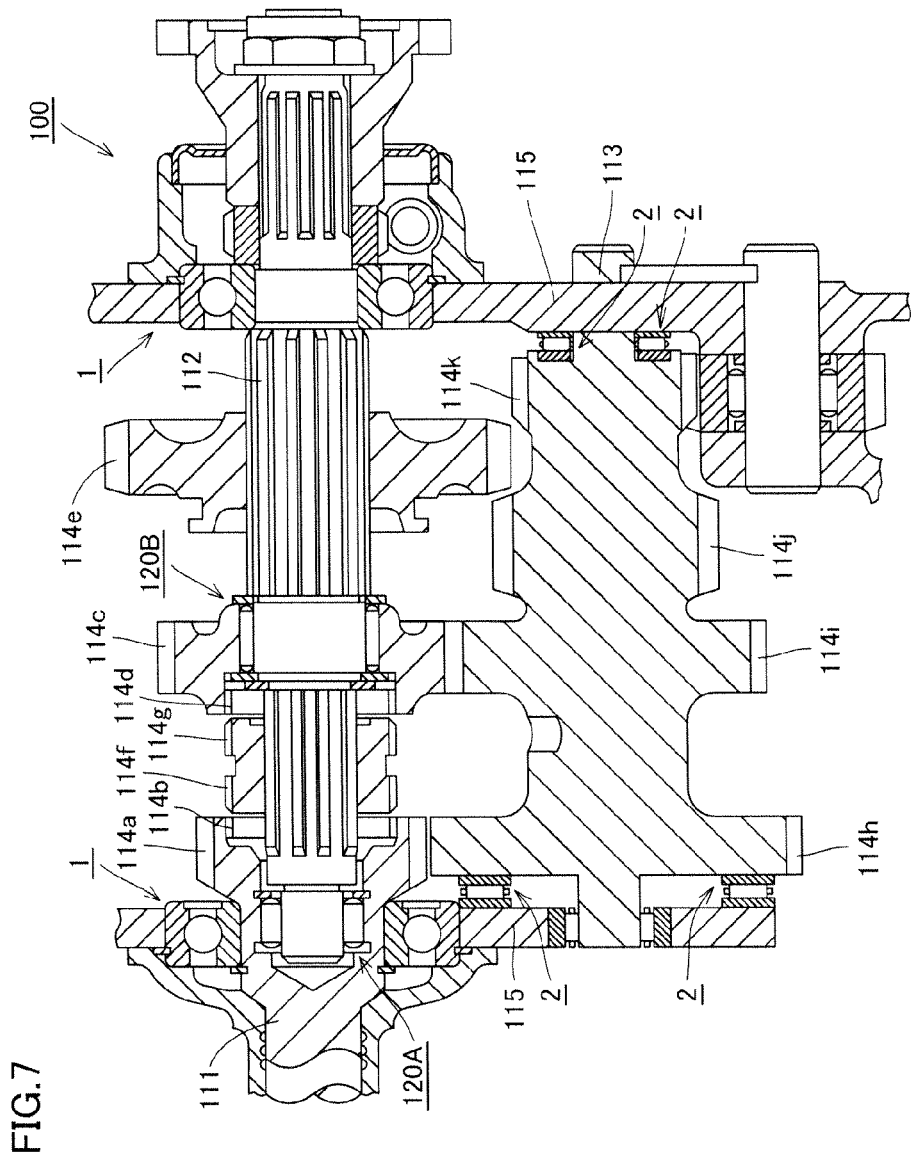
FIG. 7 is a schematic cross sectional view showing a configuration of a manual transmission.

The following describes exemplary application of the rolling bearing of the first embodiment described above. Referring to FIG. 7, a manual transmission 100, which is a constant engagement type manual transmission, includes an input shaft 111, an output shaft 112, a counter shaft 113, gears 114a to 114k, and a housing 115.

Input shaft 111 is supported to be rotatable relative to housing 115 by deep groove ball bearing 1. At the outer circumference of input shaft 111, gear 114a is formed. At the inner circumference thereof, gear 114b is formed.

On the other hand, output shaft 112 is supported to be rotatable relative to housing 115 at one side (right-hand side in the figure) by deep groove ball bearing 1, and is supported to be rotatable relative to input shaft 111 at the other side (left-hand side in the figure) by rolling bearing 120A. Gears 114c to 114g are attached to this output shaft 112.

Gears 114c and 114d are formed respectively at the outer circumference and inner circumference of the same member. The member provided with gears 114c and 114d is supported to be rotatable relative to output shaft 112 by rolling bearing 120B. Gear 114e is attached to output shaft 112 so as to rotate together with output shaft 112 and so as to be slidable in the axial direction of output shaft 112.

Meanwhile, gears 114f and 114g are formed at the outer circumference of the same member. The member provided with gears 114f and 114g is attached to output shaft 112 so as to rotate together with output shaft 112 and so as to be slidable in the axial direction of output shaft 112. When the member provided with gears 114f and 114g slides to the left in the figure, gear 114f can be engaged with gear 114b. When the member provided with gears 114f and 114g slides to the right in the figure, gears 114g and 114d can be engaged with each other.

Gears 114h to 114k are formed at counter shaft 113. Between counter shaft 113 and housing 115, two thrust needle roller bearings 2 are arranged to support an axial load (thrust load) of counter shaft 113. Gear 114h is always engaged with gear 114a and gear 114i is always engaged with gear 114c. Moreover, when gear 114e is slid to the left in the figure, gear 114j can be engaged with gear 114c. Further, when gear 114e is slid to the right in the figure, gear 114k can be engaged with gear 114e.

Next, a shift operation of manual transmission 100 will be described. In manual transmission 100, the engagement between gear 114a formed at input shaft 111 and gear 114h formed at counter shaft 113 permits transmission of the rotation of input shaft 111 to counter shaft 113. Then, the rotation of counter shaft 113 is transmitted to output shaft 112 by means of the engagement and the like between gears 114i to 114k formed at counter shaft 113 and gears 114c, 114e attached to output shaft 112. Accordingly, the rotation of input shaft 111 is transmitted to output shaft 112.

When the rotation of input shaft 111 is transmitted to output shaft 112, the rotational speed of output shaft 112 can be stepwisely changed relative to the rotational speed of input shaft 111 by changing the gears engaged with each other between input shaft 111 and counter shaft 113 and the gears engaged with each other between counter shaft 113 and output shaft 112. Further, by directly engaging gear 114b of input shaft 111 and gear 114f of output shaft 112 with each other not via counter shaft 113, the rotation of input shaft 111 can be directly transmitted to output shaft 112.

The following more specifically describes the shift operation of manual transmission 100. When gear 114f is not engaged with gear 114b, gear 114g is not engaged with gear 114d, and gear 114e is engaged with gear 114j, driving force of input shaft 111 is transmitted to output shaft 112 via gear 114a, gear 114h, gear 114j and gear 114e. This is regarded as "first speed", for example.

When gear 114g is engaged with gear 114d and gear 114e is not engaged with gear 114j, the driving force of input shaft 111 is transmitted to output shaft 112 via gear 114a, gear 114h, gear 114i, gear 114c, gear 114d and gear 114g. This is regarded as "second speed", for example.

When gear 114f is engaged with gear 114b and gear 114e is not engaged with gear 114j, input shaft 111 is directly connected to output shaft 112 by the engagement between gear 114b and gear 114f, with the result that the driving force of input shaft 111 is directly transmitted to output shaft 112. This is regarded as "third speed", for example.

As described above, manual transmission 100 includes deep groove ball bearing 1 in order to support input shaft 111 and output shaft 112, which serve as rotation members, such that they are rotatable relative to housing 115 disposed adjacent thereto. Moreover, manual transmission 100 includes thrust needle roller bearing 2 in order to support counter shaft 113, which is a rotation member, such that it is rotatable relative to housing 115 disposed adjacent thereto. In this manner, deep groove ball bearing 1 and thrust needle roller bearing 2 in the first embodiment can be used in manual transmission 100. Further, deep groove ball bearing 1 and thrust needle roller bearing 2 both capable of attaining a high level of indentation resistance and a high level of rolling fatigue life are suitable for use in manual transmission 100 in which a high contact pressure is applied between the rolling element and the ring member.

(Third Embodiment)

Figure 8:
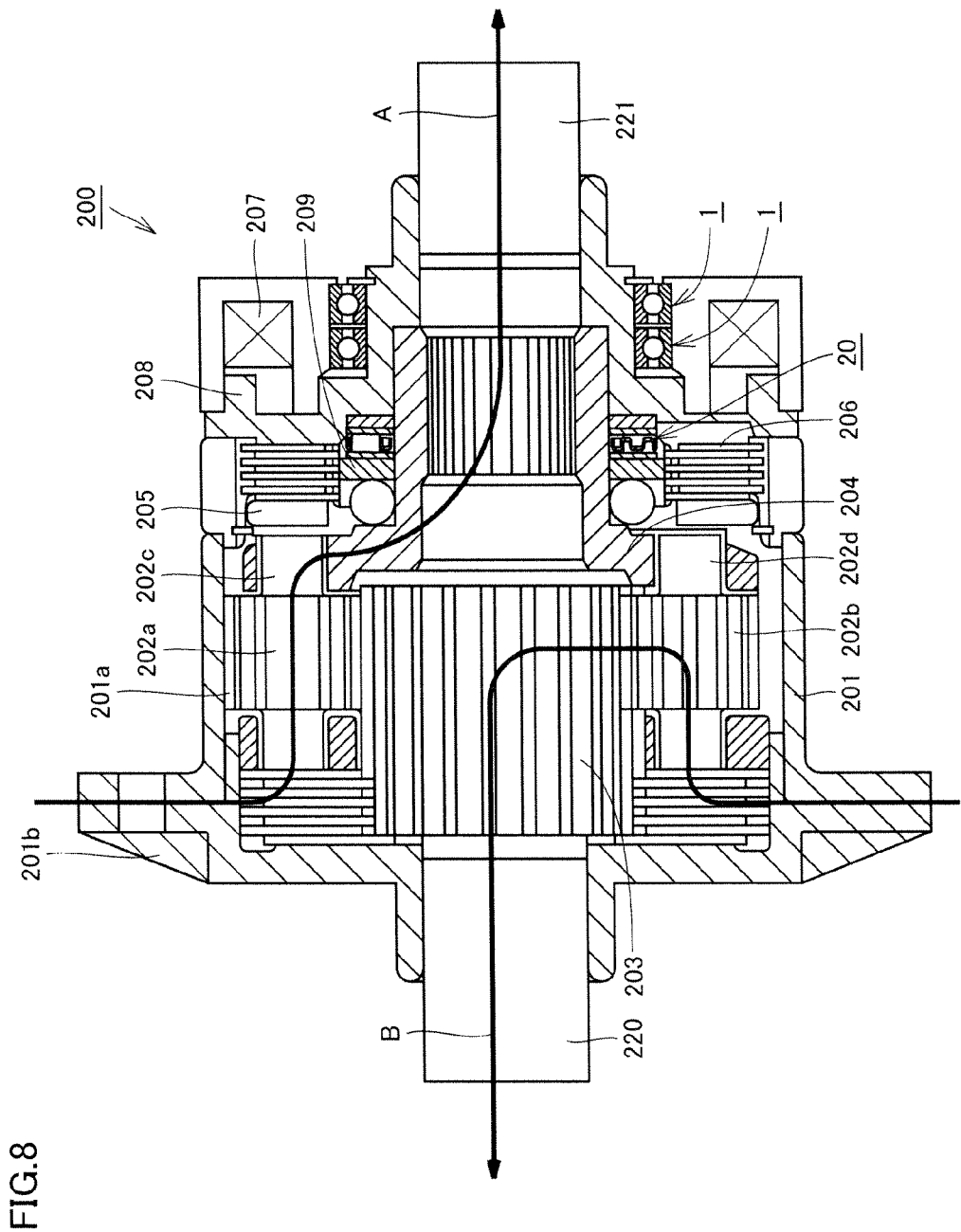
FIG. 8 is a schematic cross sectional view showing a configuration of a differential.
Figure 9:
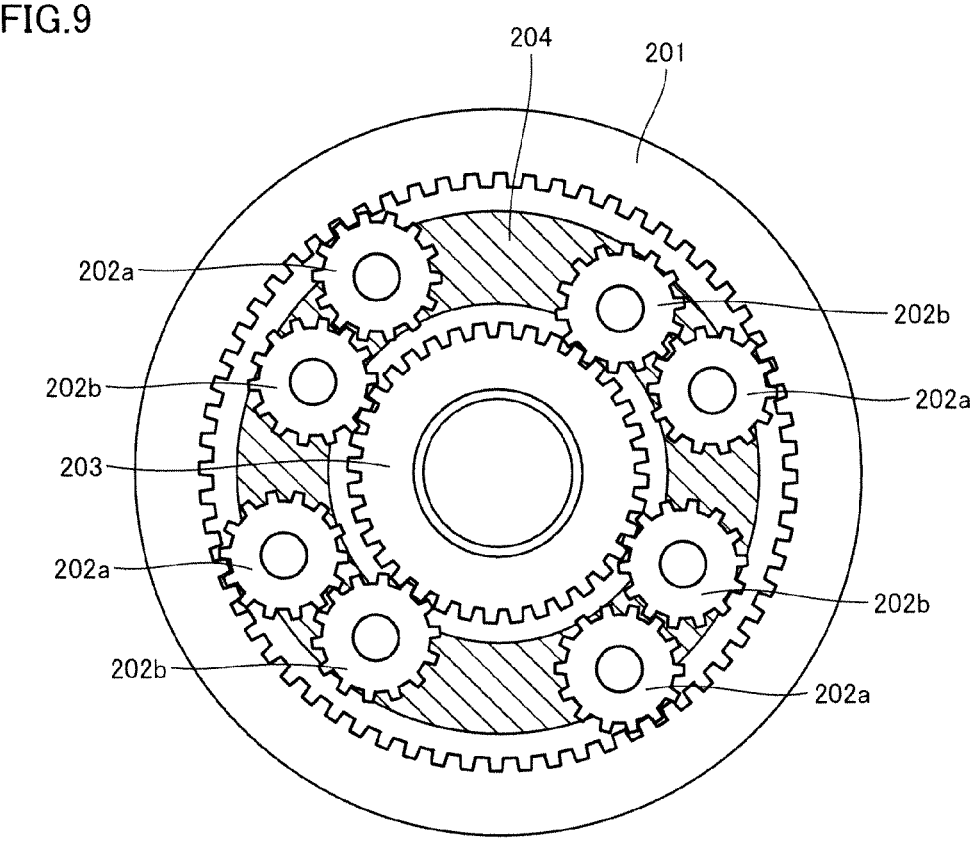
FIG. 9 is a schematic view showing an arrangement of a pinion gear of FIG. 8.

The following describes another exemplary application of the rolling bearing of the first embodiment described above. Referring to FIG. 8 and FIG. 9, a differential 200 includes a differential case 201, pinion gears 202a and 202b, a sun gear 203, a pinion carrier 204, an armature 205, a pilot clutch 206, an electromagnet 207, a rotor clutch (differential case) 208, and a cam 209.

Internal teeth 201a provided at the inner circumference of differential case 201 is engaged with each of four pinion gears 202a. Each of four pinion gears 202a is engaged with each of four pinion gears 202b. Each of four pinion gears 202b is engaged with sun gear 203. Sun gear 203 is connected to an end portion of a left drive shaft 220 serving as a first drive shaft, whereby sun gear 203 and left drive shaft 220 can be rotated together. Further, each of rotation shafts 202c of pinion gear 202a and each of rotation shafts 202d of pinion gear 202b are rotatably retained by pinion carrier 204. Pinion carrier 204 is connected to the end portion of a right drive shaft 221 serving as a second drive shaft, whereby pinion carrier 204 and right drive shaft 221 can be rotated together.

Further, electromagnet 207, pilot clutch 206, rotor clutch (differential case) 208, armature 205, and cam 209 constitute an electromagnetic clutch.

External teeth 201b of differential case 201 are engaged with the teeth of a ring gear not shown in the figure. Differential case 201 receives motive power from the ring gear and is rotated. When there is no differential between left drive shaft 220 and right drive shaft 221, pinion gears 202a and 202b are not rotated, and the three members, i.e., differential case 201, pinion carrier 204, and sun gear 203 are rotated together. In other words, the motive power is transmitted from the ring gear to left drive shaft 220 as indicated by an arrow B and the motive power is transmitted from the ring gear to right drive shaft 221 as indicated by an arrow A.

On the other hand, when a resistance is applied to one of left drive shaft 220 and right drive shaft 221, for example, is applied to left drive shaft 220, the resistance is applied to sun gear 203 connected to left drive shaft 220, thereby rotating each of pinion gears 202a and 202b. The rotation of pinion gears 202a and 202b accelerates the rotation of pinion carrier 204, thereby generating a differential between left drive shaft 220 and right drive shaft 221.

Further, when a certain differential or larger is generated between left drive shaft 220 and right drive shaft 221, the electromagnetic clutch receives electric power, whereby a magnetic field is generated by electromagnet 207. Pilot clutch 206 and armature 205 are attracted to electromagnet 207 by means of a magnetic induction effect to generate friction torque. The friction torque is converted by cam 209 to a toque in the thrust direction. The converted friction torque in the thrust direction causes the main clutch to be pressed against differential case 208 via pinion carrier 204, thereby generating a differential limiting torque. Thrust needle roller bearing 2 receives reaction force generated in cam 209 in the thrust direction, and transmits the reaction force to differential case 208. This results in generation of doubled thrust force by cam 209 in proportion to the friction torque. Thus, electromagnet 207 is capable of controlling only pilot clutch 206 and amplifying the torque using the doubling mechanism, and is also capable of controlling the friction torque appropriately.

Here, between cam 209 and differential case 208, thrust needle roller bearing 2 in the first embodiment is disposed. Further, between differential case 208 and the member disposed at the outer circumference side of differential case 208, deep groove ball bearing 1 in the first embodiment is disposed. In this manner, deep groove ball bearing 1 and thrust needle roller bearing 2 in the first embodiment can be used in differential 200. Further, deep groove ball bearing 1 and thrust needle roller bearing 2 both capable of attaining a high level of indentation resistance and a high level of rolling fatigue life are suitable for use in differential 200 in which a high contact pressure is applied between the rolling element and the ring member.

(Fourth Embodiment)

Figure 10:
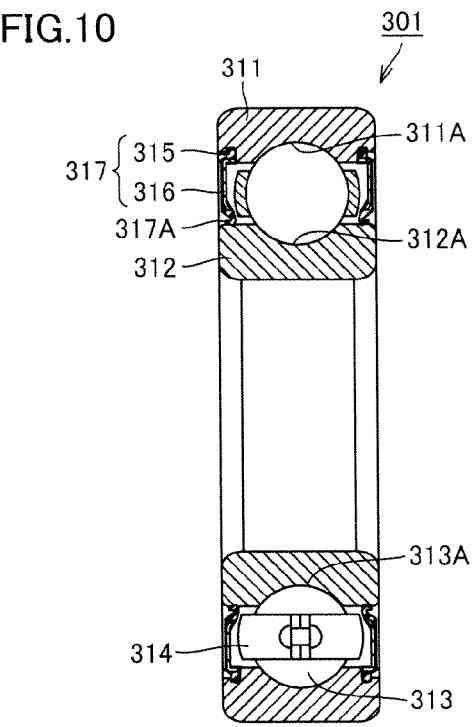
FIG. 10 is a schematic cross sectional view showing a configuration of a deep groove ball bearing.
Figure 11:
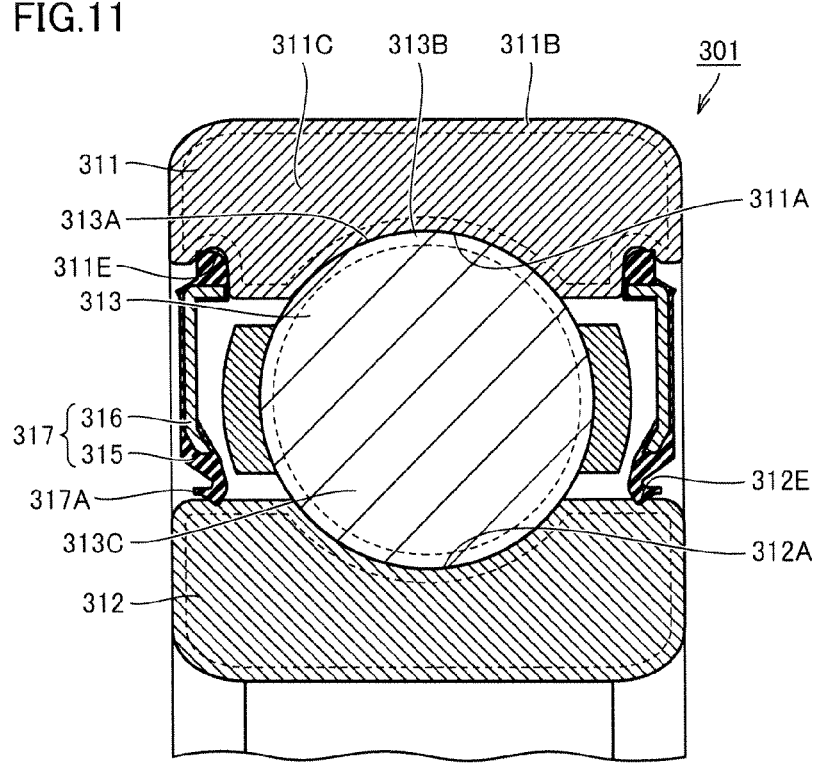
FIG. 11 is a schematic partial cross sectional view showing a main portion of FIG. 10 in an enlarged manner.

Next, a fourth embodiment will be described. Referring to FIG. 10 and FIG. 11, a deep groove ball bearing 301, which is a rolling bearing in the fourth embodiment, includes: an outer ring 311 which is a bearing part and serves as a first ring member; an inner ring 312, which is a bearing part and serves as a second ring member; balls 313, which are bearing parts and serve as a plurality of rolling elements; a cage 314; and a seal member 317. Outer ring 311 is provided with an outer ring rolling contact surface 311A serving as a first rolling contact surface of an annular shape. Inner ring 312 is provided with an inner ring rolling contact surface 312A serving as a second rolling contact surface of an annular shape opposite to outer ring rolling contact surface 311A. Further, each of the plurality of balls 313 is provided with a ball rolling contact surface 313A (surface of ball 313) serving as a rolling element rolling contact surface (rolling contact surface). Outer ring rolling contact surface 311A, inner ring rolling contact surface 312A and ball rolling contact surface 313A are bearing contact surfaces of these bearing parts. Further, balls 313 are in contact with outer ring rolling contact surface 311A and inner ring rolling contact surface 312A at ball rolling contact surfaces 313A and are arranged circumferentially at a predetermined pitch using cage 314 having an annular shape. Accordingly, balls 313 can be held to be rollable on the annular raceway. Seal member 317 is disposed to close a bearing space interposed between outer ring 311 and inner ring 312 so as to suppress introduction of a foreign matter into the bearing space. With the configuration, outer ring 311 and inner ring 312 of deep groove ball bearing 301 are rotatable relative to each other.

Referring to FIG. 11, each of outer ring 311, inner ring 312 and balls 313 serving as the bearing parts is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of an impurity. Regions thereof including outer ring rolling contact surface 311A, inner ring rolling contact surface 312A, and ball rolling contact surface 313A serving as the bearing contact surfaces are provided with nitrogen enriched layers 311B, 312B, 313B formed to have nitrogen concentrations higher than those of inner portions 311C, 312C, 313C. The nitrogen concentration is not less than 0.25 mass % in each of the surfaces of nitrogen enriched layers 311B, 312B, 313B, i.e., in outer ring rolling contact surface 311A, inner ring rolling contact surface 312A, and ball rolling contact surface 313A serving as the bearing contact surfaces. Further, a remaining austenite amount in each of outer ring rolling contact surface 311A, inner ring rolling contact surface 312A and ball rolling contact surface 313A is not less than 6 volume % and not more than 12 volume %.

Each of outer ring 311, inner ring 312, and ball 313, which are the bearing parts in the present embodiment, is made of a steel having a component composition equivalent to the JIS SUJ2 steel. Hence, the material thereof can be readily available across the globe. A long rolling fatigue life is attained when the steel having the component composition is used, the nitrogen concentration is increased to 0.25 mass % or more in each of outer ring rolling contact surface 311A, inner ring rolling contact surface 312A and ball rolling contact surface 313A, and the quench-hardening is provided. Further, when the remaining austenite amount is reduced to 12 volume % or less, indentation resistance is improved. When the remaining austenite amount is set at 6 volume % or more, the rolling fatigue life, in particular, rolling fatigue life under an foreign matter introduction environment is maintained at an appropriate level. As a result, each of outer ring 311, inner ring 312, and ball 313 becomes a high-strength bearing part capable of attaining a high level of indentation resistance and a high level of rolling fatigue life while the material thereof can be secured readily.

Further, referring to FIG. 11, seal member 317 includes: a core metal 316 made of a metal and having an annular shape; and an elastic portion 315 serving as an elastic member disposed to surround core metal 316 and made of a resin or a rubber. With such a structure, seal member 317 is capable of being elastically deformed at elastic portion 315 that makes contact with outer ring 311 and inner ring 312, while maintaining a desired rigidity by core metal 316. Seal member 317 is fixed by fitting the outer circumferential portion thereof into seal attaching groove 311E formed in the inner circumferential surface of outer ring 311. Further, a seal lip portion 317A of seal member 317, which is an end portion thereof at the inner circumference side, is in contact with the outer circumferential surface of inner ring 312.

Figure 12:
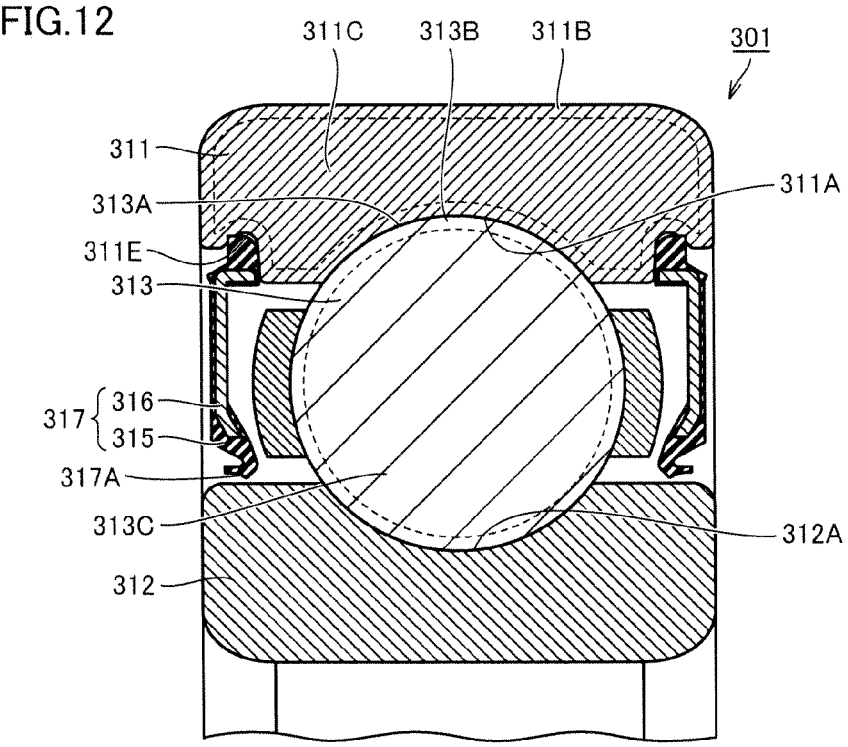
FIG. 12 is a schematic partial cross sectional view for illustrating a state of the deep groove ball bearing after start of rotation.

This seal lip portion 317A is formed of a high-wear material such as a rubber, which is likely to be worn. Accordingly, referring to FIG. 11, when inner ring 312 is rotated relative to outer ring 311, seal lip portion 317A is worn immediately after starting the rotation, with the result that inner ring 312 and seal lip portion 317A do not make contact with each other as shown in FIG. 12. As a result, seal lip portion 317A and the outer circumferential surface of inner ring 312 face each other with a minute gap interposed therebetween. Accordingly, while suppressing increase of rotation torque, introduction of a foreign matter into the bearing is reduced. This results in a long rolling fatigue life, particularly, a long rolling fatigue life in an foreign matter introduction environment while suppressing increase of the rotation torque of deep groove ball bearing 301. It has been illustrated that seal lip portion 317A and the outer circumferential surface of inner ring 312 are brought out of contact with each other, but a slight contact may be made as long as a contact pressure between inner ring 312 and seal lip portion 317A is decreased to such an extent that it can be regarded as substantially zero.

As described above, deep groove ball bearing 301 in the present embodiment includes: outer ring 311, inner ring 312, and ball 313, each of which is a high-strength bearing part capable of attaining a high level of indentation resistance and a high level of rolling fatigue life while the material thereof can be secured readily; and seal member 317 reducing introduction of a foreign matter into the bearing while suppressing increase of rotation torque. As a result, deep groove ball bearing 301 in the present embodiment is a rolling bearing attaining a high level of indentation resistance and a high level of rolling fatigue life.

In the above-described embodiment, it has been illustrated that each of outer ring 311, inner ring 312, and ball 313 is constructed of the high-strength bearing part, but a high level of indentation resistance and a high level of rolling fatigue life can be attained when at least one of outer ring 311, inner ring 312, and ball 313 is the above-described high-strength bearing part.

Further, the indentation resistance is mattered particularly in the bearing ring, so that one of outer ring 311 and inner ring 312, preferably, both outer ring 311 and inner ring 312 are the above-described high-strength bearing part. Further, the rolling element may be a roller, but in order to reduce the rotation torque, it is preferable to employ a ball as in the above-described embodiment instead of the roller in the portion employing the roller. By employing the ball bearing with the rolling element being a ball, a static rated load of the bearing is significantly reduced as compared with that of the roller bearing. Accordingly, the indentation resistance of the bearing ring is particularly mattered, but the bearing rings (outer ring 311 and inner ring 312) are the above-described high-strength bearing parts, so that the rotation torque can be reduced while maintaining the indentation resistance at a sufficient level.

It should be noted that each of the bearing contact surfaces of outer ring 311, inner ring 312 and ball 313, i.e., outer ring rolling contact surface 311A, inner ring rolling contact surface 312A and ball rolling contact surface 313A preferably has a hardness of not less than 60.0 HRC. Accordingly, the rolling fatigue life and the indentation resistance can be improved further.

Further, each of outer ring rolling contact surface 311A, inner ring rolling contact surface 312A and ball rolling contact surface 313A of outer ring 311, inner ring 312 and ball 313 preferably has a hardness of not more than 64.0 HRC. In this way, the remaining austenite amount in each of outer ring rolling contact surface 311A, inner ring rolling contact surface 312A and ball rolling contact surface 313A can be readily adjusted to fall within a range of 12 volume % or less.

Deep groove ball bearing 301 and outer ring 311, inner ring 312 and ball 313 included in deep groove ball bearing 301 in the present embodiment can be manufactured using the same methods of manufacturing the rolling bearing and the bearing part in the first embodiment.

Further, as with deep groove ball bearing 1 in the first embodiment, deep groove ball bearing 301 in the present embodiment can be used in manual transmission 100 and differential 200 described in the second and third embodiments.

(Fifth Embodiment)

Figure 13:
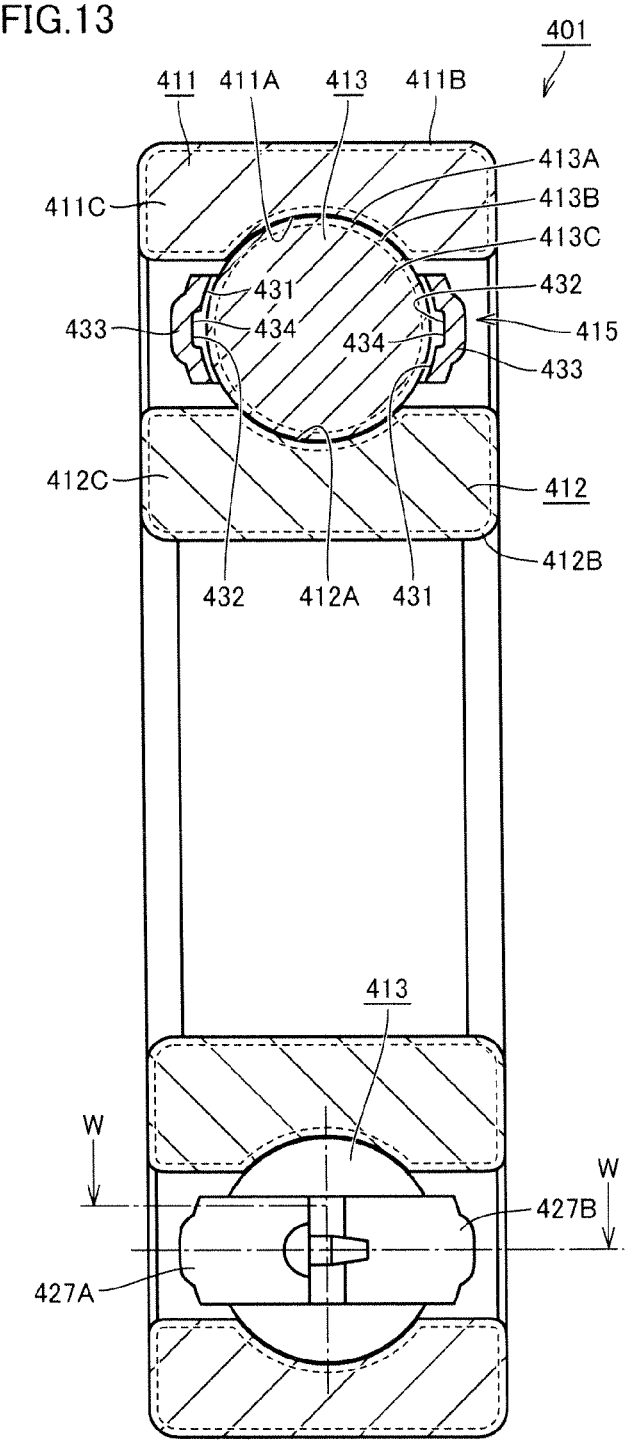
FIG. 13 is a schematic cross sectional view showing the configuration of the deep groove ball bearing in the first embodiment.

Next, a fifth embodiment will be described. Referring to FIG. 13, a deep groove ball bearing 401, which is a rolling bearing in the present embodiment, includes: an outer ring 411 which is a bearing part and serves as a first ring member; an inner ring 412, which is a bearing part and serves as a second ring member; balls 413, which are bearing parts and serve as a plurality of rolling elements; and a cage 415.

Outer ring 411 is provided with an outer ring rolling contact surface 411A serving as a first rolling contact surface of an annular shape. Inner ring 412 is provided with an inner ring rolling contact surface 412A serving as a second rolling contact surface of an annular shape opposite to outer ring rolling contact surface 411A. Further, each of the plurality of balls 413 is provided with a ball rolling contact surface 413A (surface of ball 413) serving as a rolling element rolling contact surface. Outer ring rolling contact surface 411A, inner ring rolling contact surface 412A and ball rolling contact surface 413A are contact surfaces of these bearing parts. Further, balls 413 are in contact with outer ring rolling contact surface 411A and inner ring rolling contact surface 412A at ball rolling contact surfaces 413A and are arranged circumferentially at a predetermined pitch using cage 415 having an annular shape. Accordingly, balls 413 can be held to be rollable on the annular raceway. With the above-described configuration, outer ring 411 and inner ring 412 of deep groove ball bearing 401 are rotatable relative to each other.

Each of outer ring 411, inner ring 412 and balls 413 serving as the bearing parts is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of iron and an impurity. Regions thereof including outer ring rolling contact surface 411A, inner ring rolling contact surface 412A, and ball rolling contact surface 413A serving as the contact surfaces are provided with nitrogen enriched layers 411B, 412B, 413B formed to have nitrogen concentrations higher than those of inner portions 411C, 412C, 413C. The nitrogen concentration is not less than 0.25 mass % in each of the surfaces of nitrogen enriched layers 411B, 412B, 413B, i.e., in outer ring rolling contact surface 411A, inner ring rolling contact surface 412A, and ball rolling contact surface 413A serving as the contact surfaces. Further, a remaining austenite amount in each of outer ring rolling contact surface 411A, inner ring rolling contact surface 412A and ball rolling contact surface 413A is not less than 6 volume % and not more than 12 volume %.

Cage 415 is fabricated through press working of a band steel such as a cold-rolled steel (SPCC in the JIS standard or the like).

Each of outer ring 411, inner ring 412, and ball 413, which are the bearing parts in the present embodiment, is made of a steel having a component composition equivalent to the JIS SUJ2 steel. Hence, the material thereof can be readily available across the globe. A long rolling fatigue life is attained when the steel having the component composition is used, the nitrogen concentration is increased to 0.25 mass % or more in each of outer ring rolling contact surface 411A, inner ring rolling contact surface 412A and ball rolling contact surface 413A, and the quench-hardening is provided. Further, when the remaining austenite amount is reduced to 12 volume % or less, indentation resistance is improved. When the remaining austenite amount is set at 6 volume % or more, the rolling fatigue life, in particular, rolling fatigue life under a foreign matter introduction environment is maintained at an appropriate level. As a result, each of outer ring 411, inner ring 412, and ball 413 becomes a bearing part capable of attaining a high level of indentation resistance and a high level of rolling fatigue life while the material thereof can be secured readily.

Figure 14:
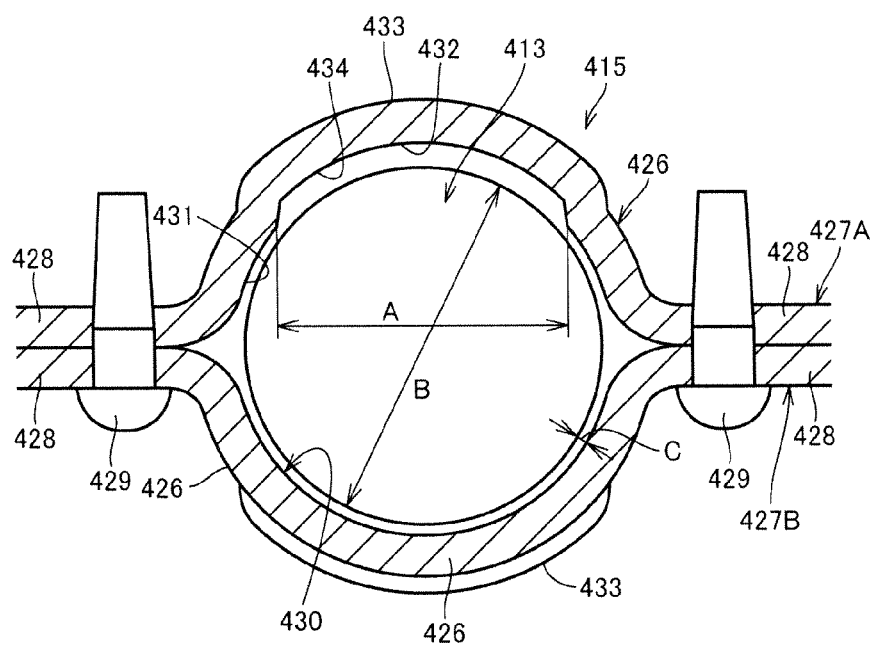
FIG. 14 is a schematic cross sectional view taken along a line W-W in FIG. 13.

Meanwhile, referring to FIG. 14 showing a cross section taken along W-W in FIG. 13, cage 415 is obtained by combining two annular cage plates 427A, 427B having hemispherical projecting portions 426 arranged at a predetermined interval in the circumferential direction. In other words, each of annular cage plates 427A, 427B includes: hemispherical projecting portions 426 arranged in the circumferential direction; and flat portions 428 between adjacent hemispherical projecting portions 426. Flat portions 428, 428 are stacked on each other with annular cage plates 427A, 427B being combined with each other, and flat portions 428, 428 are coupled to each other by fixing tools 429 such as rivets. As a result, hemispherical projecting portions 426 face each other to form a ring-shaped ball fit portion (pocket) 430.

A lubricating method suitable for this bearing can be oil lubrication. Examples of usable lubricating oil include: mineral oils such as a spindle oil, a machine oil and a turbine oil; as well as ATF or an oil for a differential. Further, under an operating condition of a high temperature of not less than 150° C. or of a low temperature of not more than −30° C., a synthetic oil such as a diester oil, a silicon oil, or a fluorocarbon oil can be used as the lubricating oil.

Figure 15:
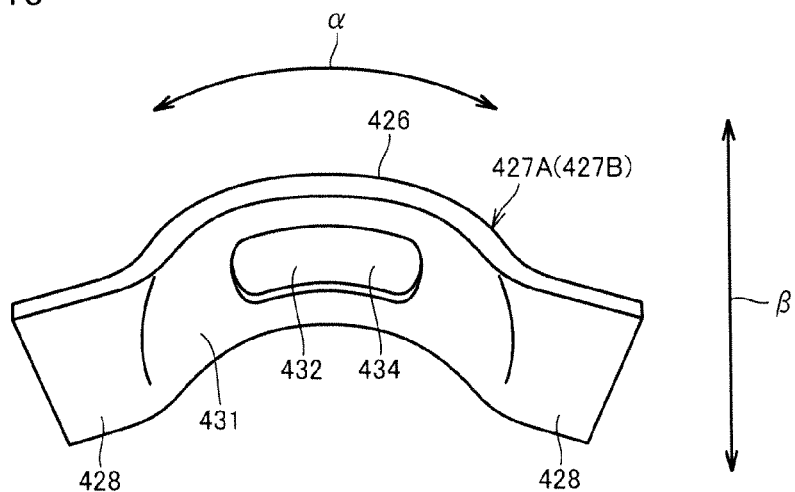
FIG. 15 is a schematic perspective view showing a state of a pocket of the cage when viewed from inside.
Figure 16:
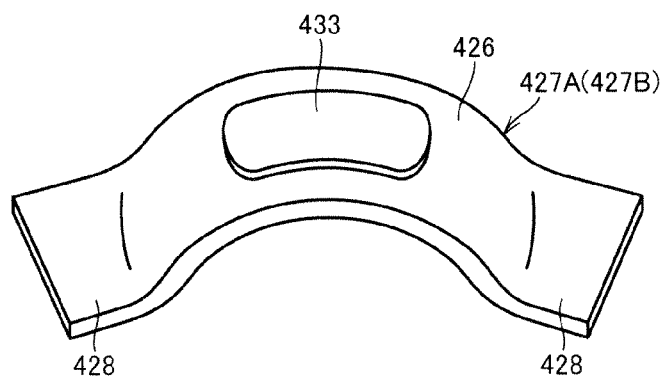
FIG. 16 is a schematic perspective view showing a state of the pocket of the cage when viewed from outside.

In this cage 415, as shown in FIG. 15 and the like, pocket 430 has a ball facing surface provided with a ball contact portion 431 and a ball non-contact portion 432. Specifically, by forming a protrusion 433 (see FIG. 16) of rectangular shape in a ball non-facing surface so as to protrude toward the side opposite to the ball, a recess 434 of rectangular shape depressed toward the side opposite to the ball relative to ball contact portion 431 is provided in the ball facing surface so as to extend in the pocket circumferential direction at the central portion of the ball facing surface of pocket 430 in the pocket axis direction. This recess 434 constitutes ball non-contact portion 432.

Assuming that the pocket circumferential length of ball non-contact portion 432 formed by recess 434 (the length in pocket circumferential direction α shown in FIG. 15) is represented by A, the diameter of ball 413 is represented by B, and the size of a gap formed between ball 413 and the ball facing surface of pocket 430 is represented by C as shown in FIG. 14, the value of A/(B+C) is set at 0.70 to 0.90.

Figure 17:
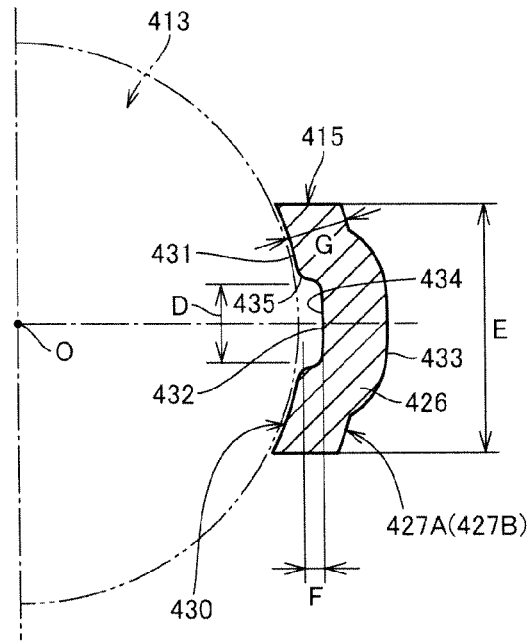
FIG. 17 is a schematic cross sectional view for illustrating the structure of the cage.

Further, assuming that the pocket axial length of ball non-contact portion 432 (the length in a pocket axial direction β (the radial direction of the bearing) shown in FIG. 15) is represented by D and the total axial length of pocket 430 is represented as E as shown in FIG. 17, the value of D/E is preferably set at 0.25 to 0.40. Furthermore, assuming that the depth of recess 434 providing ball non-contact portion 432 is represented by F and the thickness of hemispherical projecting portion 426 of annular cage plate 427A (427B) is represented by G, the value of F/G is preferably set at 0.30 to 0.40.

Figure 18:
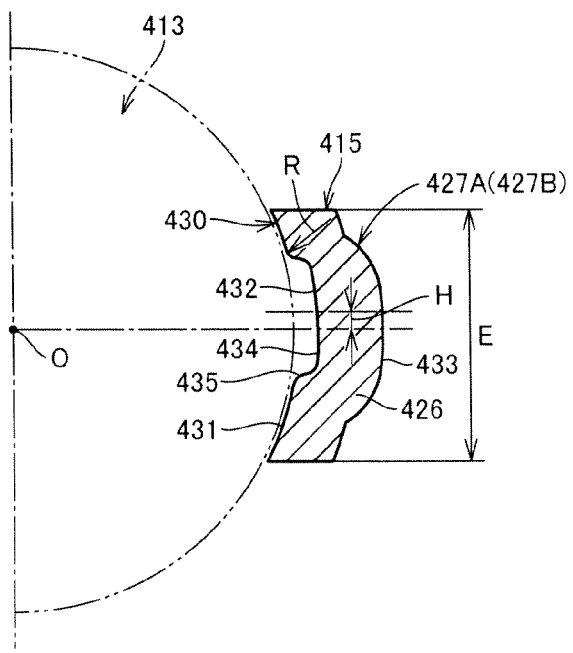
FIG. 18 is a schematic cross sectional view for illustrating the structure of the cage.

Assuming that the total axial length of pocket 430 is represented by E and an amount of displacement of the center of ball non-contact portion 432 relative to ball center O in the axial direction is represented by H as shown in FIG. 18, the value of H/(E/2) is preferably set at 0 to 0.2. Further, recess 434 providing ball non-contact portion 432 has a pocket axial opening edge 435 having a curvature (curved shape). More specifically, the curvature (R) of pocket axial opening edge 435 can be set at 0.05 mm to 0.30 mm, for example.

With this configuration, recess 434 can be referred to as "low torque groove" for attaining a low torque effect. This low torque groove includes the following three elements: the groove width (pocket axial length: D); the groove depth (depth of recess 434: F); and the groove length (pocket circumferential length: A).

Figure 19:
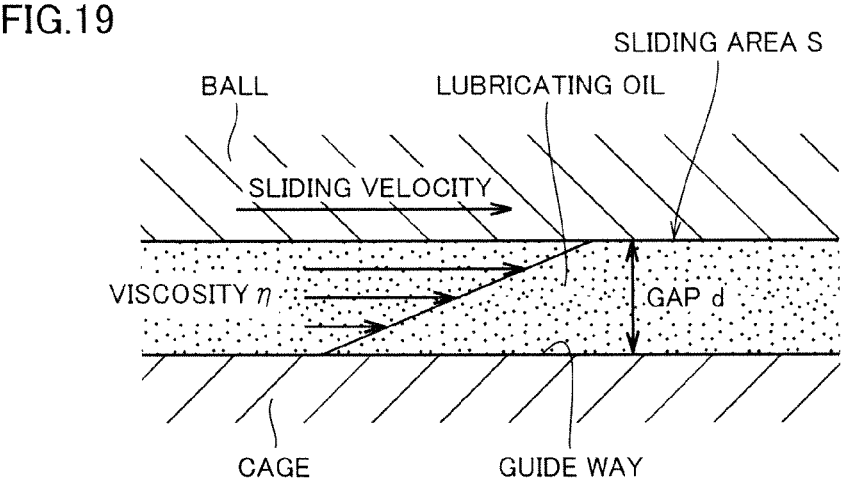
FIG. 19 is a schematic cross sectional view for illustrating shearing resistance between the rolling ball and the cage.

Here, shearing resistance acting between ball 413 and the pocket guide way is determined by the following four elements shown in FIG. 19: a lubricating oil viscosity, a sliding velocity, a sliding area, and a gap. Shearing resistance F according to Newton's law of viscosity in this case is expressed by the following formula:

$$F = \eta u S / d \qquad \text{[Formula 1]}$$

Here, F represents the shearing resistance, η represents the lubricating oil viscosity, u represents the sliding velocity, S represents the sliding area, and d represents the gap. η and u are determined in accordance with an operating condition of the bearing. Hence, the values thereof cannot be changed. When sliding area S is reduced, the shearing resistance is reduced. Hence, by forming the "low torque groove", the sliding area of cage 415 relative to ball 413 is reduced, thereby reducing the shearing resistance. On the other hand, it is understood that the value of gap d is increased, the shearing resistance is reduced. An order of d involving occurrence of general shearing resistance is confirmed to be an order approximately equivalent to surface roughness. Hence, by macroscopically set the size of the groove depth (gap d), the gap can become sufficiently large to achieve a shearing resistance of "0" (the shearing resistance can be sufficiently reduced to such an extent that it can be regarded as "0").

Thus, in order to achieve a shearing resistance of "0" in the "low torque groove", the above-described size of the groove is preferably employed.

When recess 434 is provided at the central portion in the pocket axial direction so as to extend in the pocket circumferential direction as in the present embodiment, the sliding area can be reduced by increasing the length of recess 434 in the pocket circumferential direction, which leads to reduction of the shearing resistance. However, if the length thereof in the pocket circumferential direction is made too long, ball 413 is brought into contact with pocket 430 at a boundary between the guide way (ball contact portion 431) and recess 434 rather than the guide way (ball contact portion 431). If the contact is thus made at the boundary, the oil film formed is significantly reduced to presumably result in damage on the surface. In view of this, it is preferable that the length of recess 434 in the pocket circumferential direction is as large in size as possible to such an extent that ball 413, inclusive of the movement of ball 413 in pocket 430, can be retained in the pocket guide way. Specifically, the value of A/(B+C) is preferably set at 0.70 to 0.90. Accordingly, the maximum effect of attaining a low torque can be obtained while satisfying the function as the bearing.

As described above, deep groove ball bearing 401 in the present embodiment includes outer ring 411, inner ring 412, ball 413, and cage 415, thereby attaining a high level of indentation resistance and a high level of rolling fatigue life while the material thereof is readily secured and thereby attaining a low torque.

When the length of recess 434 in the pocket axial direction is increased, the sliding area becomes small, which leads to reduction of the shearing resistance. Here, cage 415 may be shaped by press working. In such a case, there is a concern as to manufacturing, i.e., a difficulty in manufacturing may arise if the length of recess 434 is made too large in the pocket axial direction. Hence, the length of recess 434 in the pocket axial direction is preferably as large in size as possible to such an extent that the shape of the pocket is not deformed by the press working. Specifically, the value of D/E is preferably set at 0.25 to 0.40.

By setting the depth of recess 434 in a range such that a gap from the ball is formed to be larger than the level of the surface roughness, the shearing resistance can become "0" (can be reduced to such an extent that it can be regarded as "0"). However, in consideration of precision in press working for cage 415, it becomes difficult to secure sufficient precision in size if the depth of recess 434 is too small. On the other hand, if the depth of recess 434 is too large, the pocket may be deformed during the press working.

In view of these, it is preferable to set the value of F/G at 0.30 to 0.40, where F represents the depth of recess 434 providing ball non-contact portion 432 and G represents the thickness of hemispherical projecting portion 426, 426 of annular cage plate 427A (427B).

When the central location of recess 434 in the pocket axial direction is displaced relative to center O of ball 413 in the pocket axial direction, balance becomes bad to result in deformation during the press working. Hence, it is preferable to set the value of H/(E/2) at 0 to 0.2, where E represents the total axial length of pocket 430 and H represents the amount of displacement of the center of ball non-contact portion 432 relative to ball center O in the axial direction.

Meanwhile, if ball 413 is brought into contact with the boundary between recess 434 and the pocket guide way (ball contact portion 431), the ability of forming the oil film is significantly decreased. Hence, recess 434 is preferably in a size relation such that ball 413 does not make contact with the boundary. However, even when settings are made in design such that such contact does not take place, variation or the like in the manufacturing may cause such contact. In view of this, the shape of the boundary is preferably a shape with curvature (curved shape) rather than an edge-like shape (flat shape) such that no damage is caused immediately even if such contact takes place.

Ball non-contact portions 432 may be provided in all the pockets 430 of cage 415 or may be provided in appropriate pockets 430. By providing ball non-contact portions 432 in all the pockets 430, the bearing employing such a cage 415 can attain a low torque more securely.

Thus, the bearing (ball bearing) employing cage 415 can exhibit the maximum low torque effect while satisfying the function as a bearing. When used in a state involving a small amount of lubricating oil as in spray or splash, a torque reduction effect can be attained particularly, thus contributing to fuel saving.

By setting the value of D/E at 0.25 to 0.40 and setting the value of F/G at 0.30 to 0.40, manufacturability becomes excellent and the low torque effect can be effectively exhibited. By providing the pocket axial opening edge of the recess with the shape with curvature, damage is less likely to be caused even if the ball is brought into contact with this opening edge. By setting the value of H/(E/2) at 0 to 0.2, there can be provided a high-quality bearing excellent in balance and capable of effectively preventing deformation and the like during the press working.

By providing ball non-contact portion 432 in each pocket 430, the bearing employing this cage 415 can attain a low torque more securely. Cage 415 satisfying the above-described condition has a relatively simple entire shape, and therefore can be shaped through press working or the like, which leads to low cost. In other words, this type of cage can be manufactured by changing only a part of processes in the conventionally employed press working, thereby achieving low manufacturing cost. Further, the shape of the corner curvature portion (corner portion between the hemispherical projecting portion and the flat portion in the annular cage plate), which has been conventionally the weakest portion in the cage, does not need to be changed from the shape of the conventional one. In this way, the strength can be avoided from being decreased.

Thus, such a ball bearing (deep groove ball bearing) attaining the torque reduction effect without involving changes in bearing size and internal factors can be obtained inexpensively without causing decrease in strength. Accordingly, when the bearing employing this cage 415 is used in a vehicle, fuel consumption is improved, thereby providing a vehicle imposing a small environmental load. Specifically, deep groove ball bearing 401 in the present embodiment is suitable to support a motive power transmitting shaft of a vehicle inclusive of a motorcycle.

In the above-described embodiment, it has been illustrated that cage 415 is made of a metal and is shaped by means of the press working, but the cage of the rolling bearing in the present invention is not limited to this. Specifically, cage 415 may be a shaped product of a synthetic resin. In this case, polyphenylene sulfide resin (hereinafter, referred to as "PPS resin"), polyamide 46 (PA46), polyamide 66 (PA66), or the like can be employed for the material of cage 415, for example.

Such a resin cage can be shaped by means of injection molding, for example. Even when the cage is made of a resin, the cage may be shaped by means of a cutting process. Such a resin cage also exhibit function and effect similar to those of the metal cage shown in FIG. 13. Moreover, the number of the pockets provided in cage 415 can be set appropriately. Furthermore, as the material of ball 413, ceramics (silicon nitride ($Si_3N_4$) and alumina ($Al_2O_3$)) may be employed in addition to the above-described steel equivalent to the SUJ2 steel.

Each of the contact surfaces of outer ring 411, inner ring 412 and ball 413, i.e., outer ring rolling contact surface 411A, inner ring rolling contact surface 412A and ball rolling contact surface 413A preferably has a hardness of not less than 60.0 HRC. Accordingly, the rolling fatigue life and the indentation resistance can be improved further.

Further, each of outer ring rolling contact surface 411A, inner ring rolling contact surface 412A and ball rolling contact surface 413A of outer ring 411, inner ring 412 and ball 413 preferably has a hardness of not more than 64.0 HRC. In this way, the remaining austenite amount in each of outer ring rolling contact surface 411A, inner ring rolling contact surface 412A and ball rolling contact surface 413A can be readily adjusted to fall within a range of 12 volume % or less.

Deep groove ball bearing 401 and outer ring 411, inner ring 412 and ball 413 included in deep groove ball bearing 401 in the present embodiment can be manufactured using the same methods of manufacturing the rolling bearing and the bearing part in the first embodiment.

Further, as with deep groove ball bearing 1 in the first embodiment, deep groove ball bearing 401 in the present embodiment can be used in manual transmission 100 and differential 200 described in the second and third embodiments.

(Sixth Embodiment)

Figure 20:
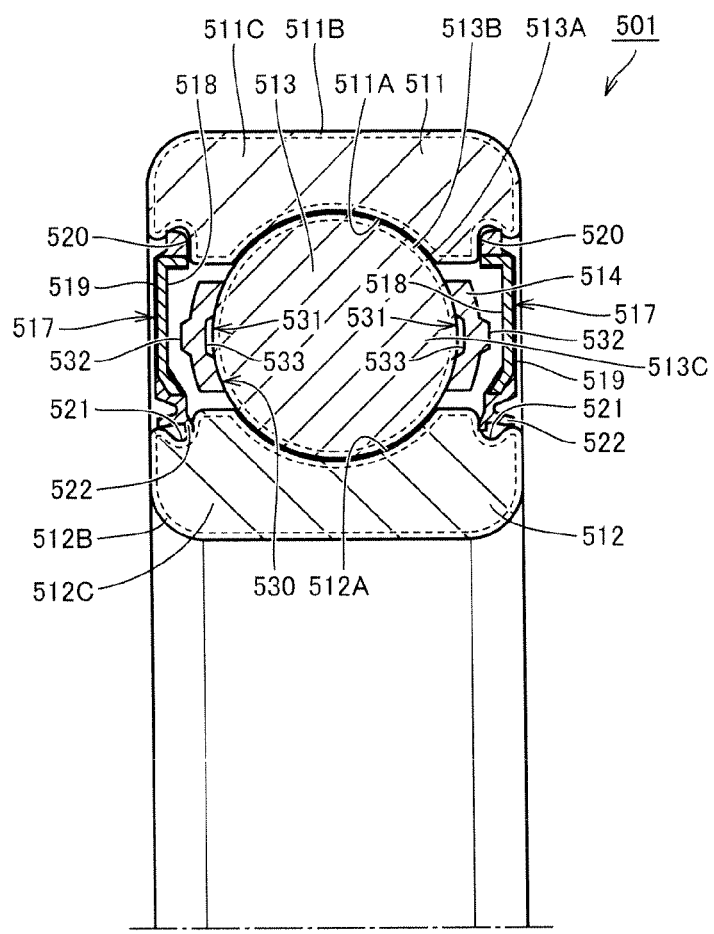
FIG. 20 is a schematic cross sectional view showing a configuration of a deep groove ball bearing in a sixth embodiment.

Next, a sixth embodiment will be described. Referring to FIG. 20, a deep groove ball bearing 501, which is a rolling bearing in the sixth embodiment, includes: an outer ring 511, which is a bearing part and serves as a first ring member; an inner ring 512, which is a bearing part and serves as a second ring member; balls 513, which are bearing parts and serve as a plurality of rolling elements; a cage 514; and an annular seal member 517 disposed between outer ring 511 and inner ring 512 so as to close a bearing space interposed between outer ring 511 and inner ring 512.

Outer ring 511 is provided with an outer ring rolling contact surface 511A serving as a first rolling contact surface of an annular shape. Inner ring 512 is provided with an inner ring rolling contact surface 512A serving as a second rolling contact surface of an annular shape opposite to outer ring rolling contact surface 511A. Further, each of the plurality of balls 513 is provided with a ball contact surface 513A (surface of ball 513) serving as a rolling element rolling contact surface. Outer ring rolling contact surface 511A, inner ring rolling contact surface 512A and ball rolling contact surface 513A are contact surfaces of these bearing parts. Further, balls 513 are in contact with outer ring rolling contact surface 511A and inner ring rolling contact surface 512A at ball contact surfaces 513A and are arranged circumferentially at a predetermined pitch using cage 514 having an annular shape. Accordingly, balls 513 can be held to be rollable on the annular raceway. With the configuration described above, outer ring 511 and inner ring 512 of deep groove ball bearing 501 are rotatable relative to each other. Further, a mounting groove 520 is formed at the axial ends of the inner circumferential surface (inner diameter surface) of outer ring 511. On the other hand, a recessed groove 521 is formed at the ends of the outer circumferential surface (outer diameter surface) of inner ring 512 in the axial direction. Into this mounting groove 520, a radial outer end portion of seal member 517 is fitted. Accordingly, a lip portion 522, which is formed at the radial inner end portion of seal member 517, is in contact with the bottom surface of recessed groove 521.

Each of outer ring 511, inner ring 512 and balls 513 serving as the bearing parts is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of iron and an impurity. Regions thereof including outer ring rolling contact surface 511A, inner ring rolling contact surface 512A, and ball rolling contact surface 513A serving as the contact surfaces are provided with nitrogen enriched layers 511B, 512B, 513B formed to have nitrogen concentrations higher than those of inner portions 511C, 512C, 513C. The nitrogen concentration is not less than 0.25 mass % in each of the surfaces of nitrogen enriched layers 511B, 512B, 513B, i.e., in outer ring rolling contact surface 511A, inner ring rolling contact surface 512A, and ball rolling contact surface 513A serving as the contact surfaces. Further, a remaining austenite amount in each of outer ring rolling contact surface 511A, inner ring rolling contact surface 512A and ball rolling contact surface 513A is not less than 6 volume % and not more than 12 volume %.

Cage 514 is fabricated through press working of a band steel such as a cold-rolled steel (SPCC in the JIS standard or the like). Further, seal member 517 includes: a core metal 518; and a coating portion 519 that coats this core metal 518 and is made of a synthetic resin, a rubber material, or the like.

Each of outer ring 511, inner ring 512, and ball 513, which are the bearing parts in the present embodiment, is made of a steel having a component composition equivalent to the JIS SUJ2 steel. Hence, the material thereof can be readily available across the globe. A long rolling fatigue life is attained when the steel having the component composition is used, the nitrogen concentration is increased to 0.25 mass % or more in each of outer ring rolling contact surface 511A, inner ring rolling contact surface 512A and ball rolling contact surface 513A, and the quench-hardening is provided. Further, when the remaining austenite amount is reduced to 12 volume % or less, indentation resistance is improved. When the remaining austenite amount is set at 6 volume % or more, the rolling fatigue life, in particular, rolling fatigue life under a foreign matter introduction environment is maintained at an appropriate level. As a result, each of outer ring 511, inner ring 512, and ball 513 becomes a bearing part capable of attaining a high level of indentation resistance and a high level of rolling fatigue life while the material thereof can be secured readily.

Figure 21:
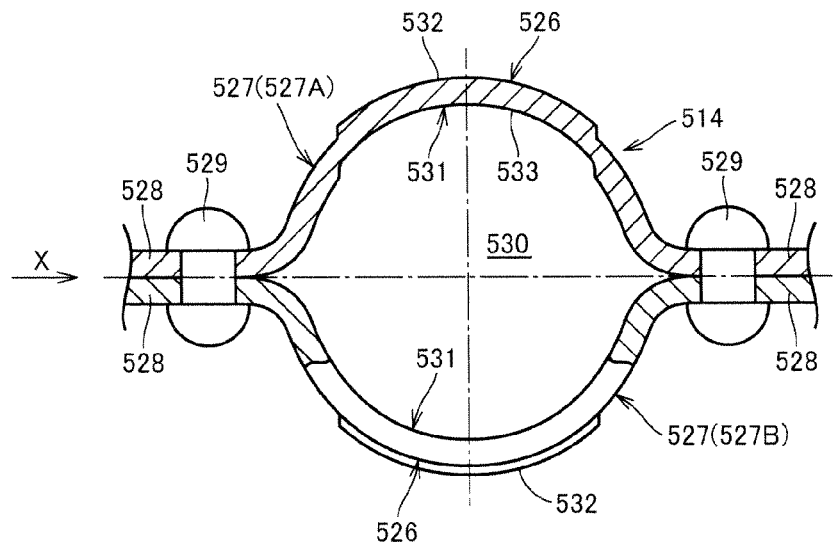
FIG. 21 is a schematic partial cross sectional view showing a structure of a cage.
Figure 22:
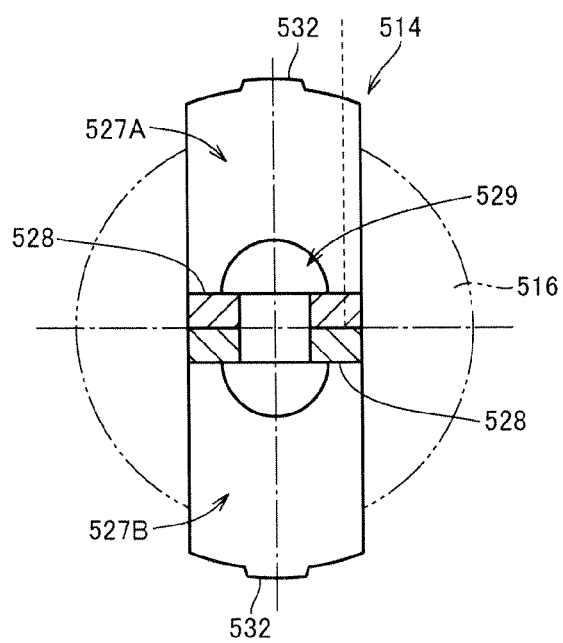
FIG. 22 is a schematic view of the cage when viewed in the direction of an arrow X of FIG. 21.

Further, as shown in FIG. 21 and FIG. 22, cage 514 is formed by combining two annular cage plates 527A, 527B having hemispherical projecting portions 526 arranged at a predetermined interval in the circumferential direction. In other words, each of annular cage plates 527A, 527B includes: hemispherical projecting portions 526 arranged at a predetermined interval in the circumferential direction; and flat portions 528 formed between adjacent hemispherical projecting portions 526. Flat portions 528, 528 are stacked on each other such that these two annular cage plates 527A, 527B are combined with each other, and flat portions 528, 528 are coupled to each other by fixing tools 529 such as rivets. As a result, hemispherical projecting portions 526 face each other to form a ring-shaped ball fit portion (pocket) 530.

In this cage 514, pocket 530 has a ball facing surface provided with a ball non-contact portion 531. The contact area of pocket 530 with ball 513 is reduced by 15% to 30% as compared with the contact area thereof with ball 513 in the case where no ball non-contact portion 531 is provided.

By forming a protrusion 532 of rectangular shape in the ball non-facing surface so as to protrude toward the side opposite to the ball, a recess 533 of rectangular shape is formed in the ball facing surface so as to be depressed toward the side opposite to the ball. This recess 533 is ball non-contact portion 531. Various types of protrusions can be employed as protrusion 532 as shown in FIG. 23 to FIG. 28.

Figure 23:
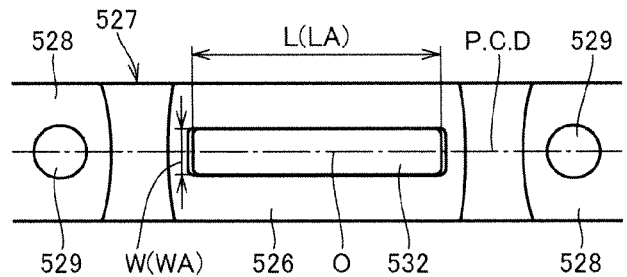
FIG. 23 is a schematic view for illustrating a protrusion of the cage of FIG. 20.

Specifically, a shape A shown in FIG. 23 has a length LA for a length L in the circumferential direction, and a width size WA for a width size W. Likewise, a shape B shown in FIG. 24 has a length LB, which is shorter than length LA, for length L in the circumferential direction, and a width size WB, which is the same as width size WA, for width size W. A shape C shown in FIG. 25 has a length LC, which is the same as length LB, for length L in the circumferential direction, and a width size WC, which is larger than width size WA, for width size W. A shape D shown in FIG. 26 has a length LD, which is the same as length LA, for length L in the circumferential direction, and a width size WD, which is the same as width size WA, for width size W.

Figure 27:
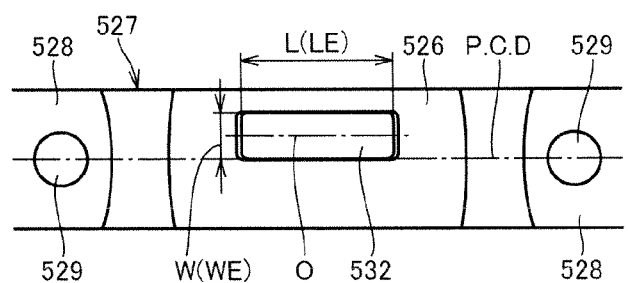
FIG. 27 is a schematic view showing a fourth modification of the protrusion of the cage.

A shape E shown in FIG. 27 has a length LE, which is the same as length LB, for length L in the circumferential direction, and a width size WE, which is the same as width size WA, for width size W. A shape F shown in FIG. 28 has a length LF, which is the same as length LB, for length L in the circumferential direction, and a width size WF, which is the same as width size WA, for width size W.

Figure 24:
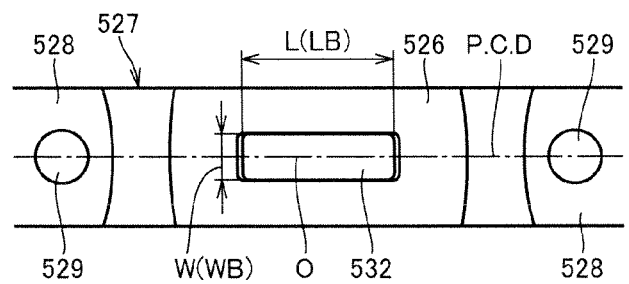
FIG. 24 is a schematic view showing a first modification of the protrusion of the cage.
Figure 25:
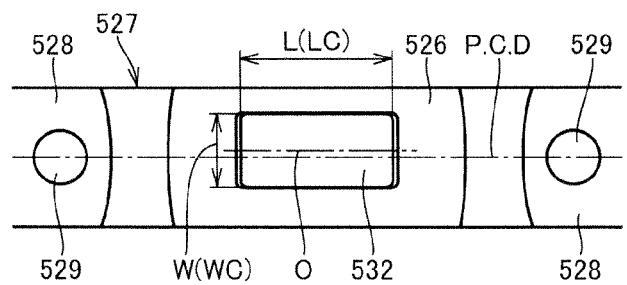
FIG. 25 is a schematic view showing a second modification of the protrusion of the cage.
Figure 26:
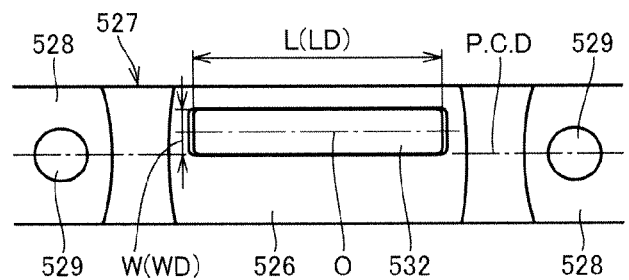
FIG. 26 is a schematic view showing a third modification of the protrusion of the cage.
Figure 28:
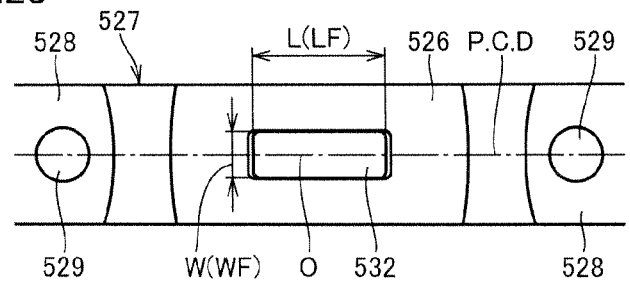
FIG. 28 is a schematic view showing a fifth modification of the protrusion of the cage.

In each of shape A shown in FIG. 23, shape B shown in FIG. 24, and shape F shown in FIG. 28, center line O of protrusion 532 matches with pitch circle PCD of ball 513 and protrusion 532 is disposed on pitch circle PCD. In each of shape C shown in FIG. 25, shape D shown in FIG. 26, and shape E shown in FIG. 27, center line O of protrusion 532 is displaced toward the bearing outer diameter side relative to pitch circle PCD of ball 513. In this case, in shape C shown in FIG. 25, the displacement is slight. In contrast, the displacement is large in each of shape D shown in FIG. 26 and shape E shown in FIG. 27 and one long side thereof matches with pitch circle PCD of ball 513.

Namely, protrusions 532 of various shapes as shown in FIG. 23 to FIG. 28 can be employed. Ball non-contact portion 531 provided by resulting recess 533 allows for reduction of the contact area between cage 514 and ball 513 by 15% to 30% in pocket 530 as compared with a case where no ball non-contact portion 531 is provided.

Protrusion 532 may have the following shape: a rectangular shape (rectangle) in which the size in the circumferential direction is longer than the size in the radial direction; a rectangular shape (rectangle) in which the size in the radial direction is longer than the size in the circumferential direction; or a square in which the size in the rotation direction and the size in the radial direction are the same. Alternatively, the shape may be an ellipse or elliptical shape instead of the rectangle. The elliptical shape may be also such that the size in the circumferential direction is longer than the size in the radial direction, or may be such that the size in the radial direction is longer than the size in the circumferential direction. Alternatively, the shape may be circular.

In cage 514 of the present embodiment, ball non-contact portion 531 provided in the ball facing surface provides reduced resistance when a lubricant passes through the inside of the pocket. Further, ball non-contact portion 531 thus provided allows for a reduced amount of oil film formed between ball 513 and pocket 530.

Here, if the ball non-contact portion is too small, the amount of reduction in the amount of oil film to be sheared is small, resulting in insufficient torque reduction. On the other hand, if ball non-contact portion 531 is too large, the amount of oil film formed between ball 513 and pocket 530 becomes too small, compromising smooth rolling of ball 513. Thus, by setting the range of ball non-contact portion 531 as in the present embodiment, both the reduced resistance upon the lubricant passing through the inside of the pocket and the reduced amount of oil film to be sheared can be attained. Hence, by employing cage 514 of the present embodiment, the rotation torque of deep groove ball bearing 501 can be reduced.

As described above, according to deep groove ball bearing 501 in the present embodiment, there can be attained a high level of indentation resistance and a high level of rolling fatigue life while the material thereof is readily secured and there can be also attained a low torque.

Ball non-contact portion 531 can be securely formed by providing the ball facing surface with recess 533 depressing toward the side opposite to the ball.

By disposing ball non-contact portion 531 at the outer diameter side relative to the pitch circle of ball 513, shearing resistance at a location involving a high circumferential speed can be reduced, thereby achieving reduction of torque more stably.

It should be noted that each of the contact surfaces of outer ring 511, inner ring 512 and ball 513, i.e., outer ring rolling contact surface 511A, inner ring rolling contact surface 512A and ball rolling contact surface 513A preferably has a hardness of not less than 60.0 HRC. Accordingly, the rolling fatigue life and the indentation resistance can be improved further.

Further, each of outer ring rolling contact surface 511A, inner ring rolling contact surface 512A and ball rolling contact surface 513A of outer ring 511, inner ring 512 and ball 513 preferably has a hardness of not more than 64.0 HRC. In this way, the remaining austenite amount in each of outer ring rolling contact surface 511A, inner ring rolling contact surface 512A and ball rolling contact surface 513A can be readily adjusted to fall within a range of 12 volume % or less.

Figure 29:
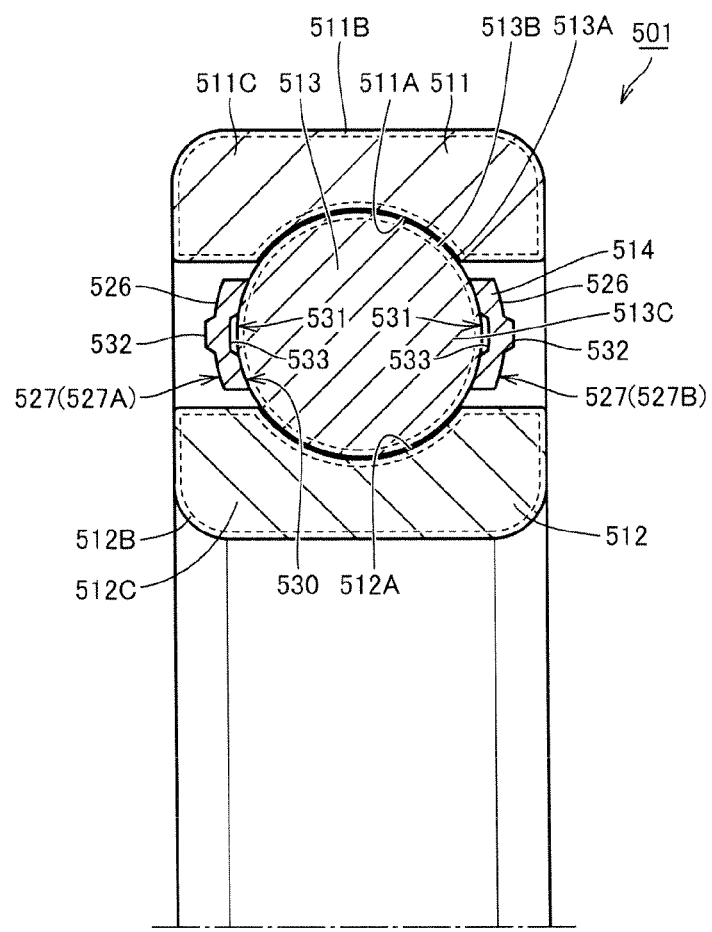
FIG. 29 is a schematic cross sectional view showing a configuration of another deep groove ball bearing.

A deep groove ball bearing 501 shown in FIG. 29 is of type having no seal member 517. In other words, the deep groove ball bearing shown in FIG. 29 has the same structure as that of deep groove ball bearing 501 shown in FIG. 20, except that the deep groove ball bearing shown in FIG. 29 does not have seal member 517, mounting groove 520 to which seal member 517 is mounted, and recessed groove 521 with which lip portion 522 of seal member 517 is brought into contact.

Accordingly, deep groove ball bearing 501 shown in FIG. 29 exhibits the same function and effect as those of deep groove ball bearing 501 shown in FIG. 20.

(Seventh Embodiment)

Figure 30:
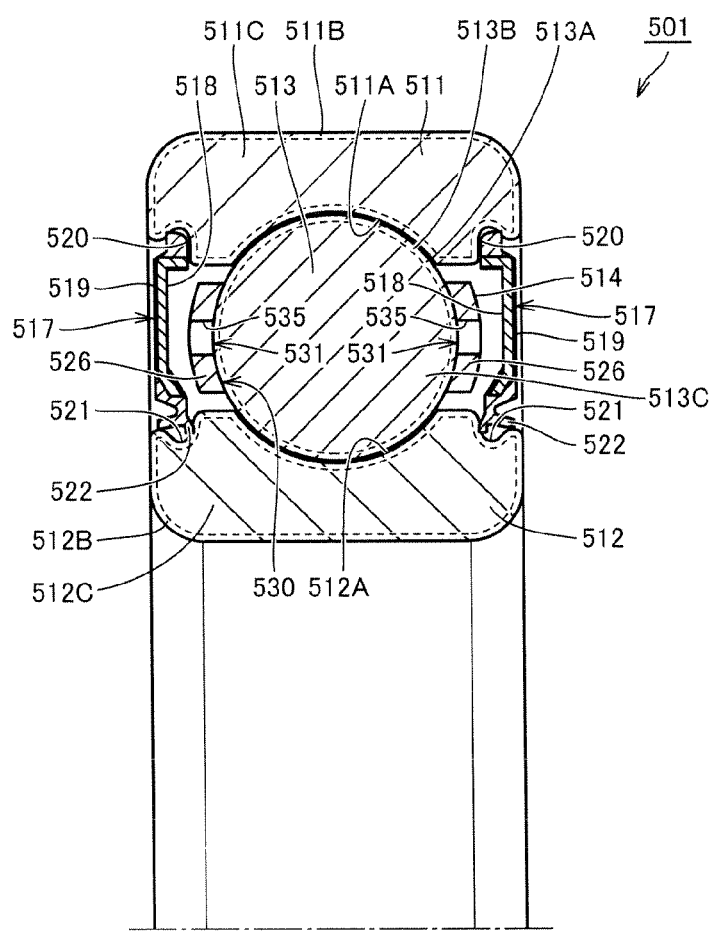
FIG. 30 is a schematic cross sectional view showing a configuration of a deep groove ball bearing in a seventh embodiment.

Next, a seventh embodiment will be described. Referring to FIG. 30 and FIG. 20, a deep groove ball bearing 501 in the seventh embodiment has basically the same structure as that in the sixth embodiment and exhibits the same effect. However, deep groove ball bearing 501 of the seventh embodiment is different from that of the sixth embodiment in terms of a structure of ball non-contact portion 531 of cage 514.

Referring to FIG. 30, in cage 514 of deep groove ball bearing 501 in the seventh embodiment, a slit 535 is formed in hemispherical projecting portion 526. This slit 535 serves as ball non-contact portion 531. Slit 535 has a rectangular shape as shown in FIG. 31, and has a central line O1 matching with pitch circle PCD of ball 513.

Slit 535 may have the following shape: a rectangular shape (rectangle) in which the size in the circumferential direction is longer than the size in the radial direction; a rectangular shape (rectangle) in which the size in the radial direction is longer than the size in the circumferential direction; or a square in which the size in the rotation direction and the size in the radial direction are the same. Alternatively, the shape may be an ellipse or elliptical shape instead of the rectangle. The elliptical shape may be also such that the size in the circumferential direction is longer than the size in the radial direction, or may be such that the size in the radial direction is longer than the size in the circumferential direction. Alternatively, the shape may be circular.

Figure 31:
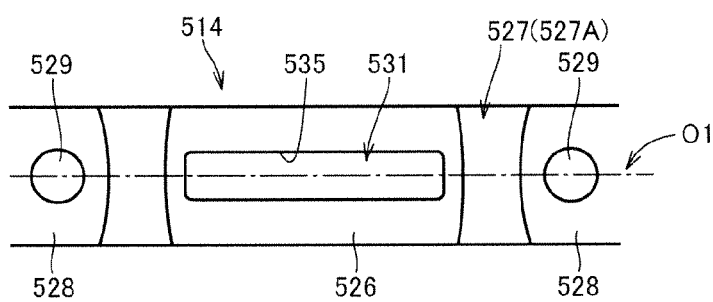
FIG. 31 is a schematic view showing a configuration of a cage in the seventh embodiment.

Slit 535 may be disposed on pitch circle PCD of ball 513 as shown in FIG. 31, or may be disposed at the outer diameter side relative to pitch circle PCD. The amount of displacement in this case can be set appropriately. Specifically, ball non-contact portion 531 provided by slit 535 may be such that the contact area with ball 513 is reduced by 15% to 30% in pocket 530 as compared with a case where no ball non-contact portion 531 is provided. Other configurations of the bearing shown in FIG. 30 are the same as those in the bearing shown in FIG. 20 and are therefore not described repeatedly.

Also in the case where ball non-contact portion 531 is provided by slit 535 as shown in FIG. 30 and FIG. 31, resistance upon the lubricant passing through the inside of the pocket can be reduced. Further, an amount of oil film formed between ball 513 and pocket 530 can be reduced. Thus, the cage shown in FIG. 30 and FIG. 31 exhibits the same function and effect as those of the cage shown in FIG. 20. Further, cage 514 provided with slit 535 is compact because the size of cage 514 in the bearing axial direction is not large unlike cage 514 provided with protrusion 532. In other words, torque can be reduced while maintaining the size as large as the size of a conventional cage having no ball non-contact portion 531.

Figure 32:
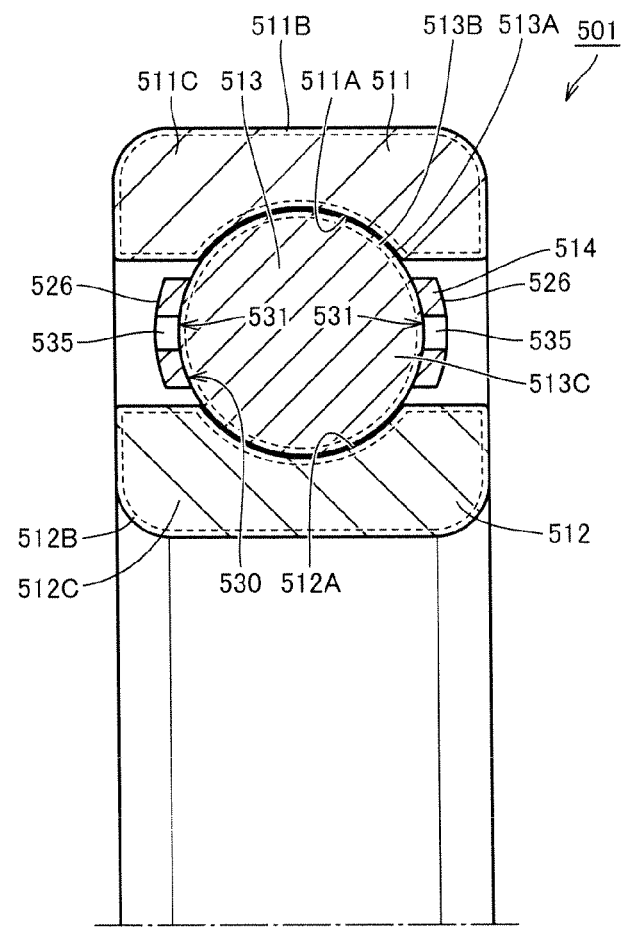
FIG. 32 is a schematic cross sectional view showing a configuration of another deep groove ball bearing.

A deep groove ball bearing 501 shown in FIG. 32 is of type having no seal member 517. In other words, the deep groove ball bearing shown in FIG. 32 is the same as deep groove ball bearing 501 shown in FIG. 30, except that the deep groove ball bearing shown in FIG. 29 does not have seal member 517, mounting groove 520 to which seal member 517 is mounted, and recessed groove 521 with which lip portion 522 of seal member 517 is brought into contact.

Accordingly, deep groove ball bearing 501 shown in FIG. 32 exhibits the same function and effect as those of deep groove ball bearing 501 shown in FIG. 30.

In the above-described embodiment, it has been illustrated that cage 514 is a metal cage formed by means of press working, but the cage included in the rolling bearing of the present invention is not limited to this. In other words, cage 514 may be formed of a metal shaped through casting. Further, cage 514 may be shaped through a cutting process or an electric discharge process (inclusive of wire cutting). Here, the electric discharge process refers to a machining method of removing a portion of a surface of a workpiece by means of arc discharge repeated between an electrode and the workpiece at a short cycle. The wire cutting is one type of the electric discharge process, and is a method of processing a metal material using electric discharge with a wire being provided with tension.

Meanwhile, the material of cage 514 is not limited to a metal and cage 514 may be a shaped product of a synthetic resin. As the resin material for the resin cage, materials conventionally used for this type of cages can be used, such as polyphenylene sulfide resin (hereinafter, referred to as "PPS resin") and polyamide 46 (PA46). For example, in the case where long-term heat resistance is required under a high temperature (for example, about 200° C. or more) in a bearing for an alternator of a vehicle or the like, a material such as polyimide resin (hereinafter, referred to as "PI resin"), polyamide imide resin (hereinafter, referred to as "PAI resin"), or polyether ether ketone resin (hereinafter, referred to as "PEEK resin") can be used as a material of cage 514.

The resin cage can be shaped by means of injection molding, for example. Alternatively, the resin cage may be shaped by a cutting process. The resin cage is also provided with ball non-contact portion 531 and the contact area of pocket 530 with ball 513 is reduced by 15% to 30% as compared with the contact area thereof with ball 513 in the case where no ball non-contact portion 531 is provided.

Ball non-contact portion 531 is provided in the resin cage in the following manner. That is, by forming protrusion 532 of rectangular shape in the ball non-facing surface so as to protrude toward the side opposite to the ball as shown in FIG. 20, recess 533 of rectangular shape is formed in the ball facing surface so as to be depressed toward the side opposite to the ball, thereby providing ball non-contact portion 531 constituted of recess 533. Further, slit 535 may be provided to constitute ball non-contact portion 531.

Hence, the resin cage also exhibits function and effect similar to those of the metal cage shown in FIG. 20.

The configuration of the cage has been illustrated above, but the cage of the rolling bearing of the present invention is not limited to the above-described embodiment and various modifications thereof can be made. For example, in the above-described embodiment, ball non-contact portion 531 is disposed in the rotation direction, but may be inclined relative to the rotation direction. Further, the number of ball non-contact portion 531 to be formed is not limited to one for each hemispherical projecting portion 526, and two or more ball non-contact portions 531 may be provided for each hemispherical projecting portion 526. In this case, a plurality of ball non-contact portions 531 may be disposed in the circumferential direction or the radial direction.

Meanwhile, in order to form ball non-contact portion 531, protrusion 532 of rectangular shape or square shape may be provided or slit 535 of rectangular shape or square shape may be provided. Further, each corner portion may have a shape with curvature or without curvature. In the case where protrusion 532 of rectangular shape or square shape is provided, the protruding amount of protrusion 532 (depth of recess 533) is preferably 40% or less relative to annular cage plates 527A, 527B. If the protruding amount is more than 40%, the protruding amount of protrusion 532 becomes too large, which makes it difficult to attach the seal member or which may result in a large size.

Deep groove ball bearing 501 and outer ring 511, inner ring 512 and ball 513 included in deep groove ball bearing 501 in the sixth and seventh embodiments can be manufactured using the same methods of manufacturing the rolling bearing and the bearing part in the first embodiment.

Further, as with deep groove ball bearing 1 in the first embodiment, deep groove ball bearing 501 in the sixth and seventh embodiments can be used in manual transmission 100 and differential 200 described in the second and third embodiments.

(Eighth Embodiment)

Figure 33:
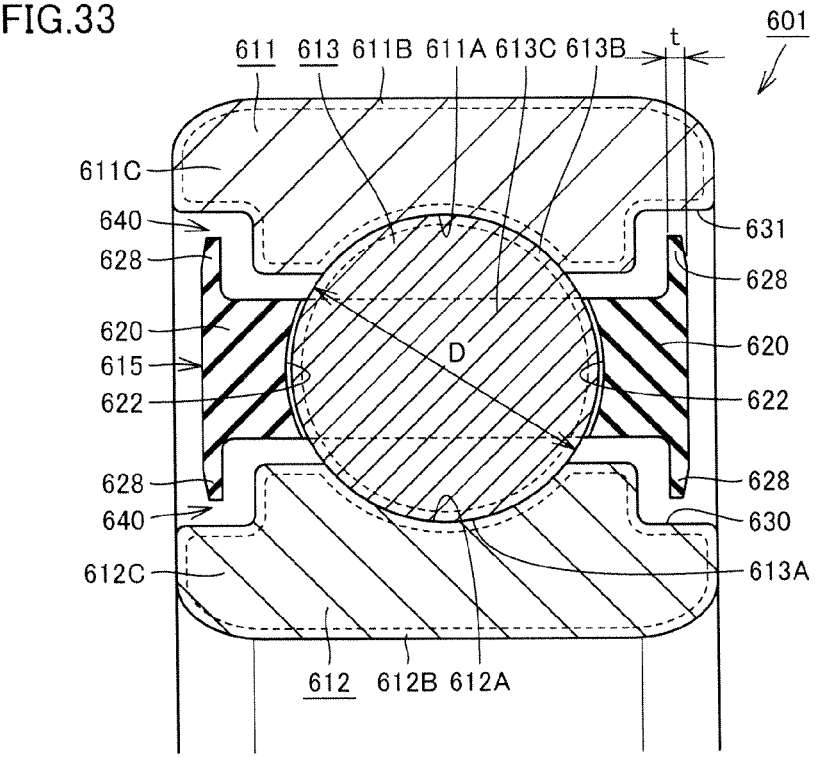
FIG. 33 is a schematic cross sectional view showing a configuration of a deep groove ball bearing.

Next, an eighth embodiment will be described. Referring to FIG. 33, a deep groove ball bearing 601, which is a rolling bearing in the eighth embodiment, includes: an outer ring 611 which is a bearing part and serves as a first ring member; an inner ring 612, which is a bearing part and serves as a second ring member; balls 613, which are bearing parts and serve as a plurality of rolling elements; and a cage 615.

Outer ring 611 is provided with an outer ring rolling contact surface 611A serving as a first rolling contact surface of an annular shape. Inner ring 612 is provided with an inner ring rolling contact surface 612A serving as a second rolling contact surface of an annular shape opposite to outer ring rolling contact surface 611A. Further, each of the plurality of balls 613 is provided with a ball rolling contact surface 613A (surface of ball 613) serving as a rolling element rolling contact surface. Outer ring rolling contact surface 611A, inner ring rolling contact surface 612A and ball rolling contact surface 613A are contact surfaces of these bearing parts. Further, balls 613 are in contact with outer ring rolling contact surface 611A and inner ring rolling contact surface 612A at ball contact surfaces 613A and are arranged circumferentially at a predetermined pitch using cage 615 having an annular shape. Accordingly, balls 613 can be held to be rollable on the annular raceway. With the above-described configuration, outer ring 611 and inner ring 612 of deep groove ball bearing 601 are rotatable relative to each other.

Each of outer ring 611, inner ring 612 and balls 613 serving as the bearing parts is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of iron and an impurity. Regions thereof including outer ring rolling contact surface 611A, inner ring rolling contact surface 612A, and ball rolling contact surface 613A serving as the contact surfaces are provided with nitrogen enriched layers 611B, 612B, 613B formed to have nitrogen concentrations higher than those of inner portions 611C, 612C, 613C. The nitrogen concentration is not less than 0.25 mass % in each of the surfaces of nitrogen enriched layers 611B, 612B, 613B, i.e., in outer ring rolling contact surface 611A, inner ring rolling contact surface 612A, and ball rolling contact surface 613A serving as the contact surfaces. Further, a remaining austenite amount in each of outer ring rolling contact surface 611A, inner ring rolling contact surface 612A and ball rolling contact surface 613A is not less than 6 volume % and not more than 12 volume %.

Cage 615 may be made of a metal or a resin. In the present embodiment, cage 615 is made of a polyamide resin (PA46, PA66, PA9T, or the like), a polyether ether ketone resin (PEEK) or a polyphenylene sulfide resin (PPS).

Each of outer ring 611, inner ring 612, and ball 613, which are the bearing parts in the present embodiment, is made of a steel having a component composition equivalent to the JIS SUJ2 steel. Hence, the material thereof can be readily available across the globe. A long rolling fatigue life is attained when the steel having the component composition, the nitrogen concentration is increased to 0.25 mass % or more in each of outer ring rolling contact surface 611A, inner ring rolling contact surface 612A and ball rolling contact surface 613A, and the quench-hardening is provided. Further, when the remaining austenite amount is reduced to 12 volume % or less, indentation resistance is improved. When the remaining austenite amount is set at 6 volume % or more, the rolling fatigue life, in particular, rolling fatigue life under a foreign matter introduction environment is maintained at an appropriate level. As a result, each of outer ring 611, inner ring 612, and ball 613 becomes a bearing part capable of attaining a high level of indentation resistance and a high level of rolling fatigue life while the material thereof can be secured readily.

Figure 34:
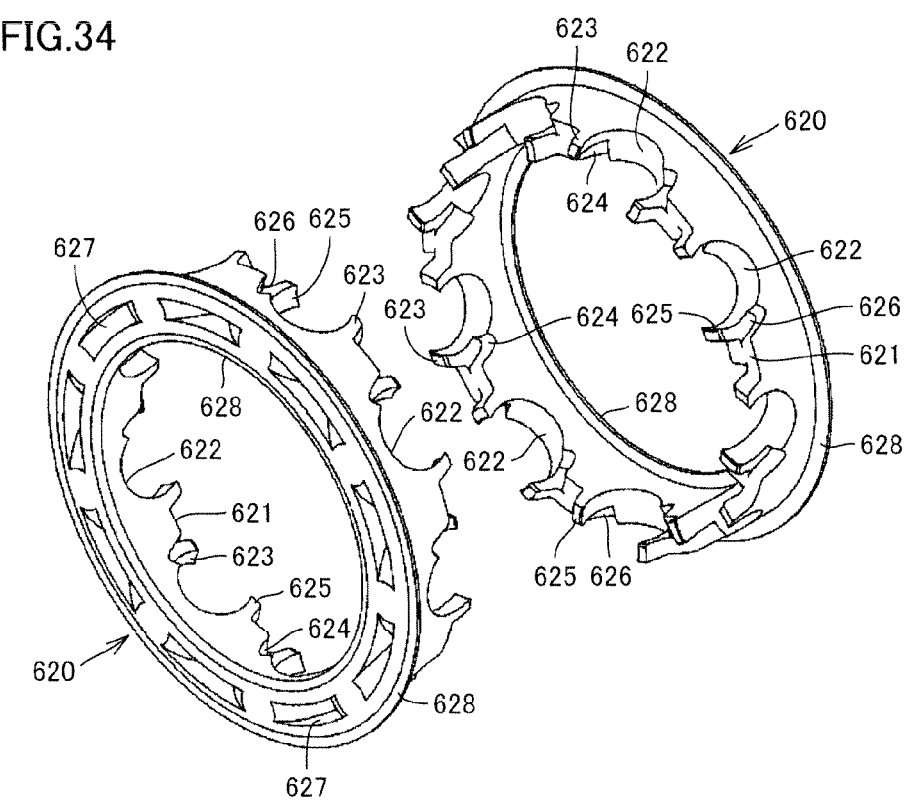
FIG. 34 is a schematic perspective view showing a state of an annular body prior to assembly.
Figure 35:
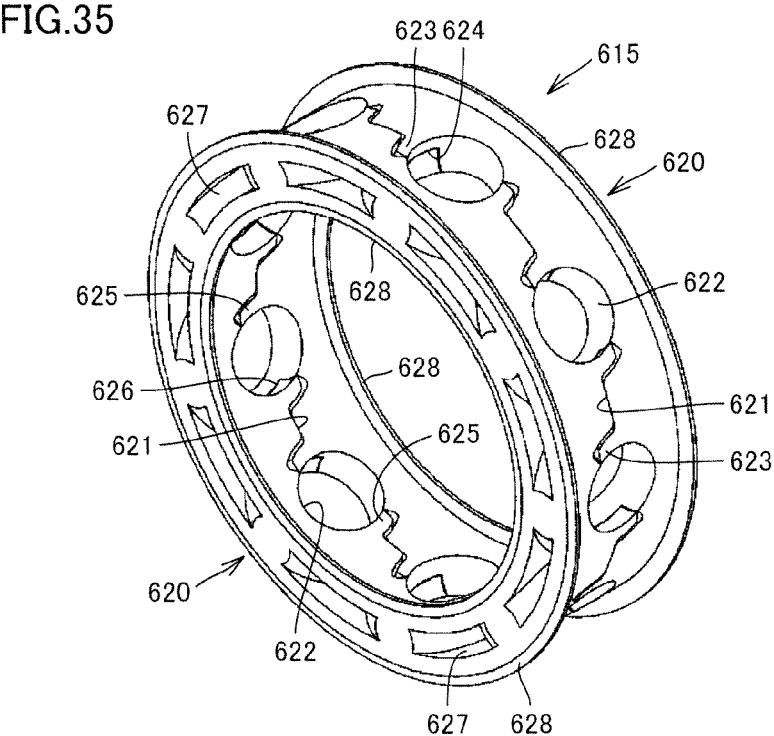
FIG. 35 is a schematic perspective view showing a state of the annular body after the assembly.
Figure 36:
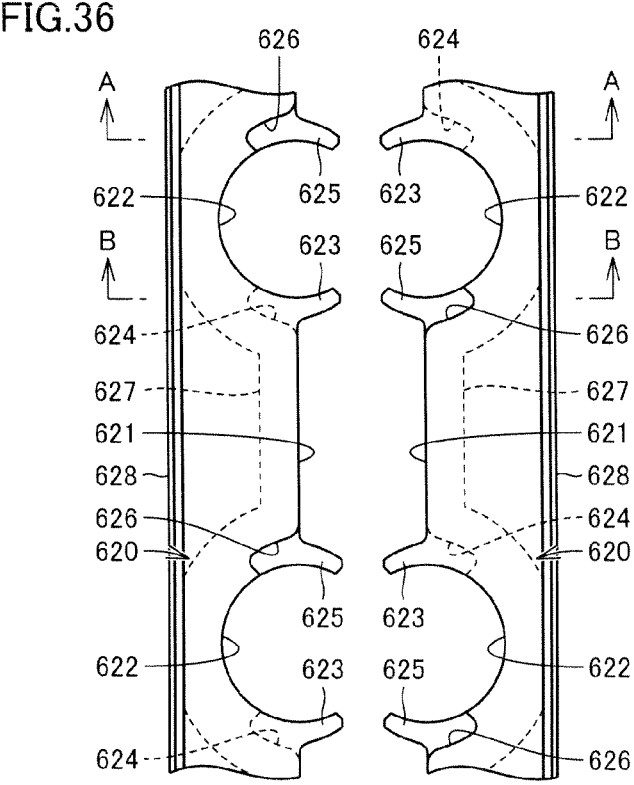
FIG. 36 is a schematic exploded view showing a state of the annular body prior to the assembly.
Figure 37:
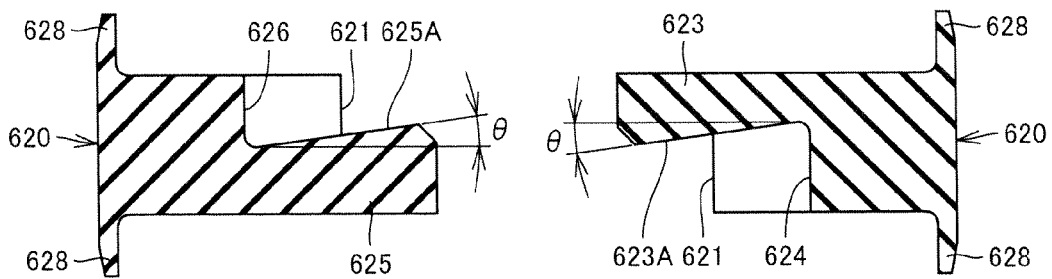
FIG. 37 is a schematic cross sectional view taken along a line A-A in FIG. 36.
Figure 38:
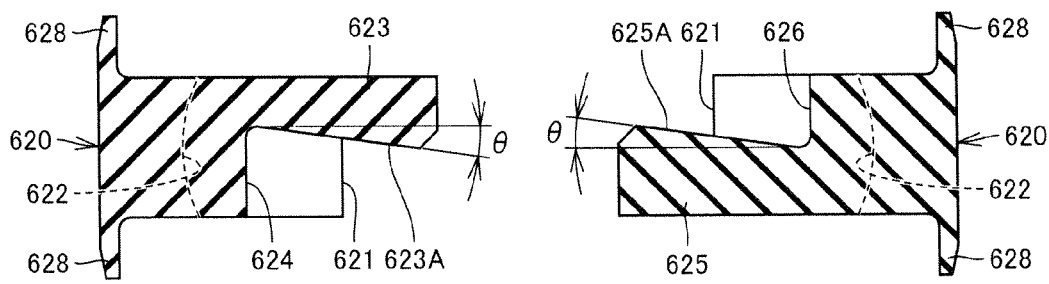
FIG. 38 is a schematic cross sectional view taken along a line B-B in FIG. 36.

Meanwhile, referring to FIG. 33 to FIG. 35, cage 615 is formed by forming hemispherical pockets 622 at a plurality of locations in the circumferential direction in facing surfaces 621 of two annular bodies 620 facing each other in the axial direction so as to contain balls 613 therein, and bringing facing surfaces 621 into abutment with each other so as to join two annular bodies 620 together. In each annular body 620, decreased thickness portions 627 each in the form of a recess are formed between adjacent pockets 622. Accordingly, cage 615 has a light weight. Cage 615 has a shape symmetrical in the axial direction. Moreover, the end surface of cage 615 has a flat shape (see FIG. 33).

Further, referring to FIG. 33, at the inner diameter side and outer diameter side in the axial end portion of annular body 620, flange portions 628 are provided to extend in the radial direction. Meanwhile, inner ring 612 has a region corresponding to flange portion 628 and provided with a groove portion 630. Likewise, outer ring 611 has a region corresponding to flange portion 628 and provided with a groove portion 631. By flange portions 628 and groove portions 630, 631, a labyrinth 640 is formed.

Flange portion 628 is formed to extend in a direction orthogonal to the axial direction. Meanwhile, groove portion 630 provided at the inner ring 612 side is depressed to form a step at the outer diameter axial end of inner ring 612. Groove portion 631 provided at the outer ring 611 side is depressed to form a step at the inner diameter axial end of outer ring 611. It should be noted that flange portions 628 of cage 615 and groove portions 630, 631 are not in such a positional relation that they are always in contact with each other. In other words, flange portions 628 and groove portions 630, 631 are brought into contact with each other only under a particular condition or are not in contact with each other completely.

Thus, labyrinth 640 constructed of flange portions 628 of cage 615 and groove portions 630, 631 of outer ring 611 and inner ring 612 suppresses excessive flow of lubricating oil into the inside of the bearing. Meanwhile, cage 615 has a shape symmetrical in the axial direction with flange portions 628 being provided at the axial end portions of annular bodies 620. Accordingly, under application of centrifugal force during a high-speed rotation, two annular bodies 620 of cage 615 suppress themselves from being deformed, thereby suppressing deformation of cage 615. This avoids ball 613 from falling off from pocket 622 and avoids cage 615 from interfering with other parts such as outer ring 611 and inner ring 612. Further, the formation of labyrinth 640, which is constructed of flange portions 628 provided integrally in annular body 620 and groove portions 630, 631 provided integrally in outer ring 611 and inner ring 612, can be attained only by changing the shapes of cage 615, outer ring 611, and inner ring 612. Hence, labyrinth 640 can be effectively formed while avoiding increase in the number of parts and the number of assembly steps.

As described above, deep groove ball bearing 601 in the present embodiment includes outer ring 611, inner ring 612, ball 613, and cage 615, thereby attaining a high level of indentation resistance and a high level of rolling fatigue life while the material thereof is readily secured and thereby attaining a low torque.

Here, in the present embodiment, flange portion 628 has an axial thickness t of not less than 0.15 mm, which is 20% or less of diameter D of ball 613 as shown in FIG. 33. By setting axial thickness t of flange portion 628 in this way, the strength of flange portion 628 can be secured, flange portion 628 can be shaped readily, and the axial size of the bearing does not become large to exceed its limit. If axial thickness t of flange portion 628 is less than 0.15 mm, flange portion 628 is likely to have insufficient strength or is likely to be poorly shaped. On the other hand, if axial thickness t of flange portion 628 is larger than more than 20% of diameter D of ball 613, the axial sizes (groove widths) of groove portions 630, 631 of outer ring 611 and inner ring 612 need to be larger in order to avoid flange portions 628 of cage 615 from protruding relative to the end surfaces of the bearing. As a result, the axial sizes of outer ring 611 and inner ring 612 becomes large, resulting in a large size of the entire bearing. In other words, deep groove ball bearing 601 is prevented from being compact.

Meanwhile, cage 615 in the present embodiment is constructed by joining two annular bodies 620 together in the following manner. Referring to FIG. 34 to FIG. 38, each of two annular bodies 620 is provided with an outer diameter side protrusion 623 and an inner diameter side recess 624. Outer diameter side protrusion 623 is formed by extending the outer diameter side of one circumferential end portion of pocket 622 in the axial direction. Inner diameter side recess 624 is formed by depressing the inner diameter side thereof. In addition, an inner diameter side protrusion 625 is formed by extending the inner diameter side of the other circumferential end portion of pocket 622 in the axial direction, and an outer diameter side recess 626 is formed by depressing the outer diameter side thereof. As such, two annular bodies 620 can be provided with the same shape by employing the following structure in each of annular bodies 620: outer diameter side protrusion 623 and inner diameter side recess 624 are formed at the one circumferential end portion of pocket 622 and inner diameter side protrusion 625 and outer diameter side recess 626 are formed at the other circumferential end portion thereof. As a result, a pair of annular bodies 620 fabricated using one mold can be used to construct cage 615, for example. This leads to reduced cost.

Then, two annular bodies 620 each having the above-described structure are prepared. Then, outer diameter side protrusion 623 of one annular body 620 is inserted into outer diameter side recess 626 of the other annular body 620 and inner diameter side protrusion 625 of one annular body 620 is inserted into inner diameter side recess 624 of the other annular body 620, thereby engaging outer diameter side protrusion 623 and inner diameter side protrusion 625 with each other in the axial direction. Further, engagement surfaces 623a, 625a of outer diameter side protrusion 623 and inner diameter side protrusion 625 are formed to be inclined relative to the axial direction such that the tip side of each of outer diameter side protrusion 623 and inner diameter side protrusion 625 is thicker than the base end side thereof (see FIG. 37 and FIG. 38).

Figure 39:
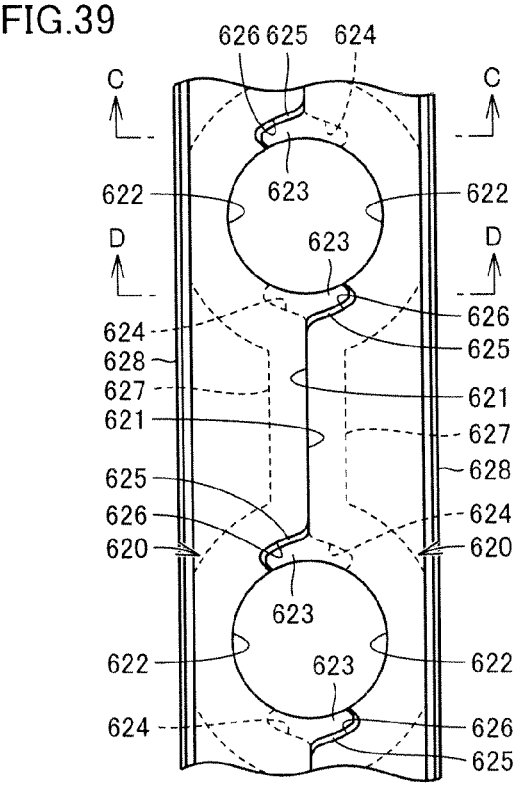
FIG. 39 is a schematic exploded view showing a state of the annular body after the assembly.
Figure 40:
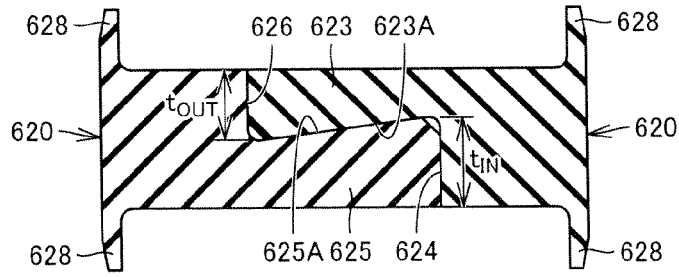
FIG. 40 is a schematic cross sectional view taken along a line C-C in FIG. 39.
Figure 41:
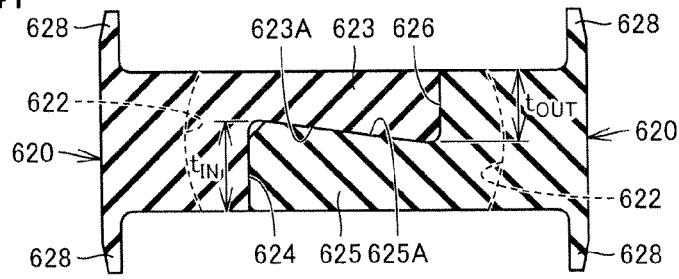
FIG. 41 is a schematic cross sectional view taken along a line D-D in FIG. 39.

As shown in FIG. 39 to FIG. 41, facing surfaces 621 of two annular bodies 620 are brought into abutment with each other to engage outer diameter side protrusion 623 and inner diameter side protrusion 625 by a predetermined tightening amount in the axial direction, thereby generating frictional force along engagement surfaces 623a, 625a of outer diameter side protrusion 623 and inner diameter side protrusion 625. Engagement surfaces 623a, 625a of outer diameter side protrusion 623 and inner diameter side protrusion 625 are inclined relative to the axial direction such that the tip side of each of outer diameter side protrusion 623 and inner diameter side protrusion 625 is thicker than the base end side thereof, thereby causing an axial component in reaction force generated in a direction normal to engagement surfaces 623a, 625a of outer diameter side protrusion 623 and inner diameter side protrusion 625.

The frictional force generated along engagement surfaces 623a, 625a of outer diameter side protrusion 623 and inner diameter side protrusion 625 and the axial component of the reaction force generated in the direction normal to engagement surfaces 623a, 625a work together to securely prevent two annular bodies 620 from being separated from each other in the axial direction even when a large centrifugal force is applied due to high-speed rotation.

As such, in cage 615 of the present embodiment, the joining portion constructed of outer diameter side protrusion 623 and inner diameter side recess 624 and the joining portion constructed of inner diameter side protrusion 625 and outer diameter side recess 626 are provided at the circumferential end portions of pocket 622 of annular body 620. Accordingly, ball 613 can be readily kept in pocket 622 by the joining portions even when a large centrifugal force, which could have separated the one annular body 620 from the other annular body 620 outwardly in the axial direction to open pocket 622, is applied due to high-speed rotation (see FIG. 39).

Further, in the joining structure in the present embodiment, engagement surfaces 623a, 625a of outer diameter side protrusion 623 and inner diameter side protrusion 625 are preferably inclined relative to each other at an inclination angle θ (see FIG. 37 and FIG. 38) of not less than 5°. With inclination angle θ thus set, engagement surfaces 623a, 625a can be readily suppressed from being deformed under application of a large centrifugal force due to high-speed rotation. Further, this makes it possible to securely act the axial component of the reaction force on engagement surfaces 623a, 625a, thereby readily securing joining force for two annular bodies 620. If inclination angle θ between engagement surfaces 623a, 625a is less than 5°, it becomes difficult to suppress engagement surfaces 623a, 625a from being deformed under application of a large centrifugal force due to high-speed rotation. This may make it difficult to securely act the axial component of the reaction force on engagement surfaces 623a, 625a.

Further, in the present embodiment, as shown in FIG. 40 and FIG. 41, inner diameter side protrusion 625 is thicker than outer diameter side protrusion 623 ($t_{IN} > t_{OUT}$). Because inner diameter side protrusion 625 is thus thicker than outer diameter side protrusion 623, inner diameter side protrusion 625 thicker than outer diameter side protrusion 623 has a mass larger than that of outer diameter side protrusion 623. Accordingly, under application of a large centrifugal force due to high-speed rotation, inner diameter side protrusion 625 is deformed more greatly as compared with outer diameter side protrusion 623. Here, the deformation of inner diameter side protrusion 625 acts to increase the joining force for engagement surfaces 623a, 625a of outer diameter side protrusion 623 and inner diameter side protrusion 625 because engagement surfaces 623a, 625a of outer diameter side protrusion 623 and inner diameter side protrusion 625 are inclined relative to each other in the axial direction such that the tip side of each of outer diameter side protrusion 623 and inner diameter side protrusion 625 is thicker than the base end side thereof.

Two (pair of) annular bodies 620 described above are preferably made of a synthetic resin in order to attain a light weight of cage 615. Here, in view of cost and oil resistance, as the material of annular body 620, it is effective to select one synthetic resin from a group consisting of PPS (polyphenylene sulfide), PA66 (polyamide 66) and PA46 (polyamide 46). For example, when the lubricating oil to be used contains a large amount of aggressive component on resin (such as phosphorus or sulfur), it is preferable to use PPS because more excellence oil resistance is attained in the order of PPS, PA46, and PA66. On the other hand, in term of the cost of resin material, a more advantage is attained in the order of PA66, PA46, and PPS. Therefore, it is desirable to select a material of annular body 620 in consideration of the aggression of the lubricating oil to be used on the resin as well as the cost. Examples of other resin materials usable therefor include PA9T (polyamide 9T), PEEK (polyether ether ketone), a phenol resin, and the like. Such a resin cage can be shaped by means of injection molding, for example. Even when the cage is made of a resin, the cage may be shaped by means of a cutting process.

Figure 42:
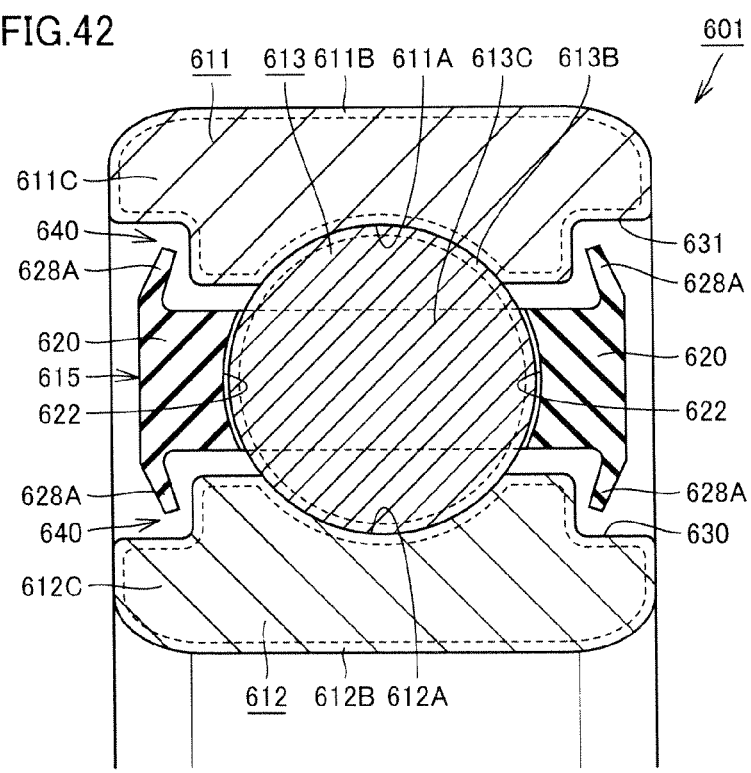
FIG. 42 is a schematic cross sectional view showing a configuration of a modification of the deep groove ball bearing.
Figure 43:
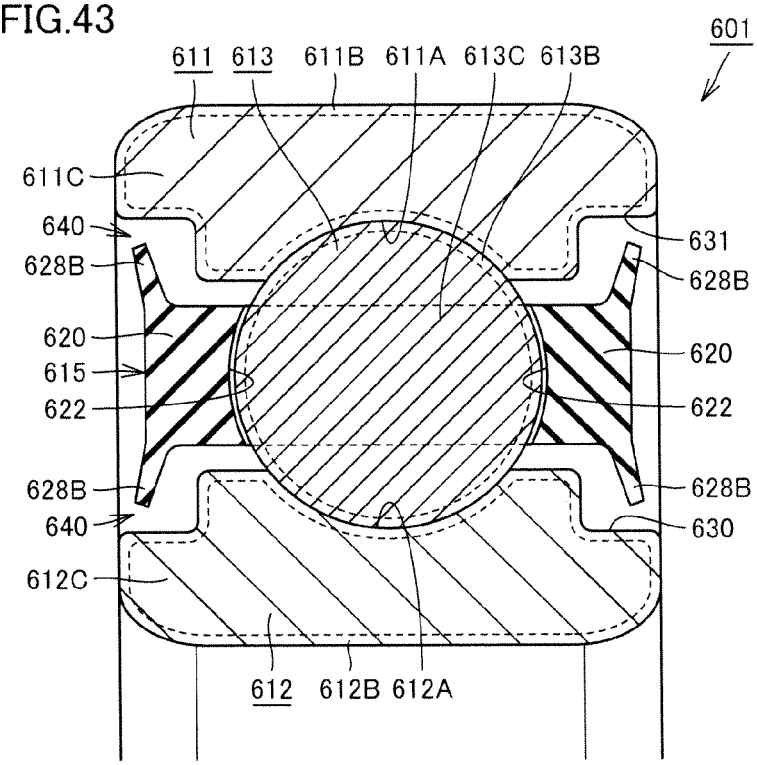
FIG. 43 is a schematic cross sectional view showing a configuration of another modification of the deep groove ball bearing.

In the above-described embodiment, it has been illustrated that flange portion 628 is formed to extend in the direction orthogonal to the axial direction, but the present invention is not limited to this. Flange portion 628 may be formed to extend in a direction inclined relative to the direction orthogonal to the axial direction. Specifically, flange portion 628A may be formed to be bent inwardly in the axial direction as shown in FIG. 42 or flange portion 628B may be formed to be bent outwardly in the axial direction as shown in FIG. 43. Such flange portions 628A, 628B are also capable of forming labyrinth 640 when combined with outer ring 611 and inner ring 612.

Further, in the above-described embodiment, it has been illustrated that flange portions 628 are provided at both the inner diameter side and the outer diameter side of the axial end portion of cage 615, but the present invention is not limited to this. There may be employed a structure in which a flange portion 628 is provided only at one of the inner diameter side and outer diameter side of the axial end portion of cage 615. Flange portion 628 of cage 615 is preferably formed at a location to prevent linear flow of the lubricating oil to the inside of the bearing.

Furthermore, in the above-described embodiment, it has been illustrated that cage 615 has the shape symmetrical in the axial direction such that flange portions 628 are provided at the axial end portions of annular body 620, but the rolling bearing of the present invention is not limited to this. Specifically, for example, in the case where the lubricating oil flows in a constant direction and the bearing is used under a condition that influence of centrifugal force is small, there may be employed a shape asymmetrical in the axial direction such that flange portion 628 is provided only at one side in the axial direction.

Figure 44:
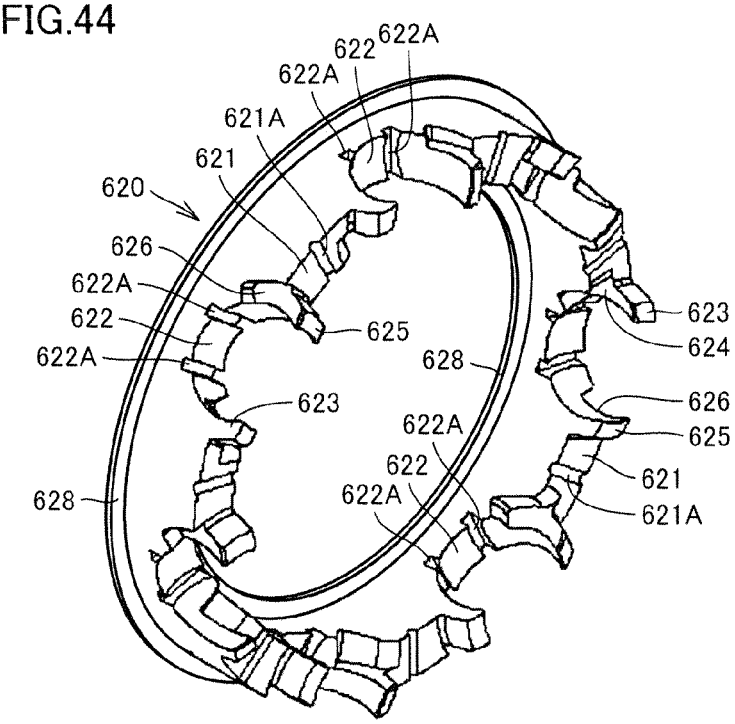
FIG. 44 is a schematic perspective view showing a configuration of a modification of the cage.

Further, referring to FIG. 44, in pocket 622 of annular body 620, a pocket groove portion 622A may be formed to extend in the radial direction of annular body 620. This reduces a contact area between cage 615 and ball 613, thereby achieving a low torque.

Further, pocket groove portions 622A may be formed to extend through annular body 620 so as to connect the inner diameter side and outer diameter side of annular body 620 to each other as shown in FIG. 44. Accordingly, lubricating oil between cage 615 and ball 613 are discharged due to centrifugal force, thereby achieving a lower torque. In the example shown in FIG. 44, the pair of pocket groove portions 622A are formed not to include an axially outermost region in pocket 622 and are disposed with the axially outermost region interposed therebetween. Accordingly, lubricating oil between cage 615 and ball 613 are discharged due to centrifugal force, thereby achieving a lower torque.

Further, as shown in FIG. 44, an inter-pocket groove portion 621A may be formed in facing surface 621 between adjacent pockets 622 of annular body 620 so as to extend through annular body 620 in the radial direction of annular body 620 to connect the inner diameter side and outer diameter side of annular body 620 to each other. Accordingly, lubricating oil between cage 615 and ball 613 are discharged due to a centrifugal force, thereby achieving a lower torque.

It should be noted that each of the contact surfaces of outer ring 611, inner ring 612 and ball 613, i.e., outer ring rolling contact surface 611A, inner ring rolling contact surface 612A and ball rolling contact surface 613A preferably has a hardness of not less than 60.0 HRC. Accordingly, the rolling fatigue life and the indentation resistance can be improved further.

Further, each of outer ring rolling contact surface 611A, inner ring rolling contact surface 612A and ball rolling contact surface 613A of outer ring 611, inner ring 612 and ball 613 preferably has a hardness of not more than 64.0 HRC. In this way, the remaining austenite amount in each of outer ring rolling contact surface 611A, inner ring rolling contact surface 612A and ball rolling contact surface 613A can be readily adjusted to fall within a range of 12 volume % or less.

Deep groove ball bearing 601 in the present embodiment can be used in a motor or a speed reducer of a vehicle employing an engine or a motor as a motive power source.

Deep groove ball bearing 601 and outer ring 611, inner ring 612 and ball 613 included in deep groove ball bearing 601 in the eighth embodiment can be manufactured using the same methods of manufacturing the rolling bearing and the bearing part in the first embodiment.

Further, as with deep groove ball bearing 1 in the first embodiment, deep groove ball bearing 601 in the present embodiment can be used in manual transmission 100 and differential 200 described in the second and third embodiments.

(Ninth Embodiment)

Figure 45:
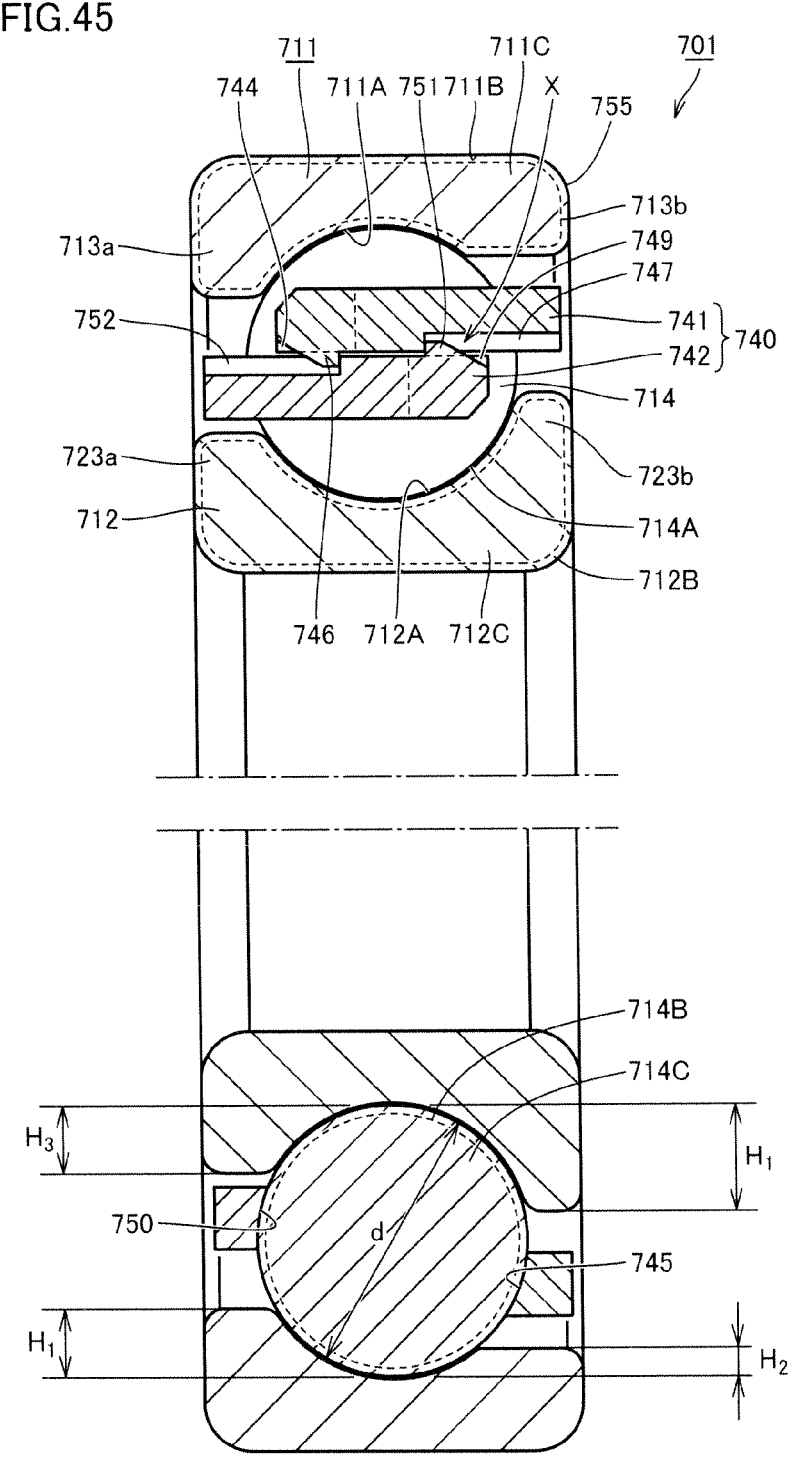
FIG. 45 is a schematic cross sectional view showing a configuration of a deep groove ball bearing in a ninth embodiment.
Figure 46:
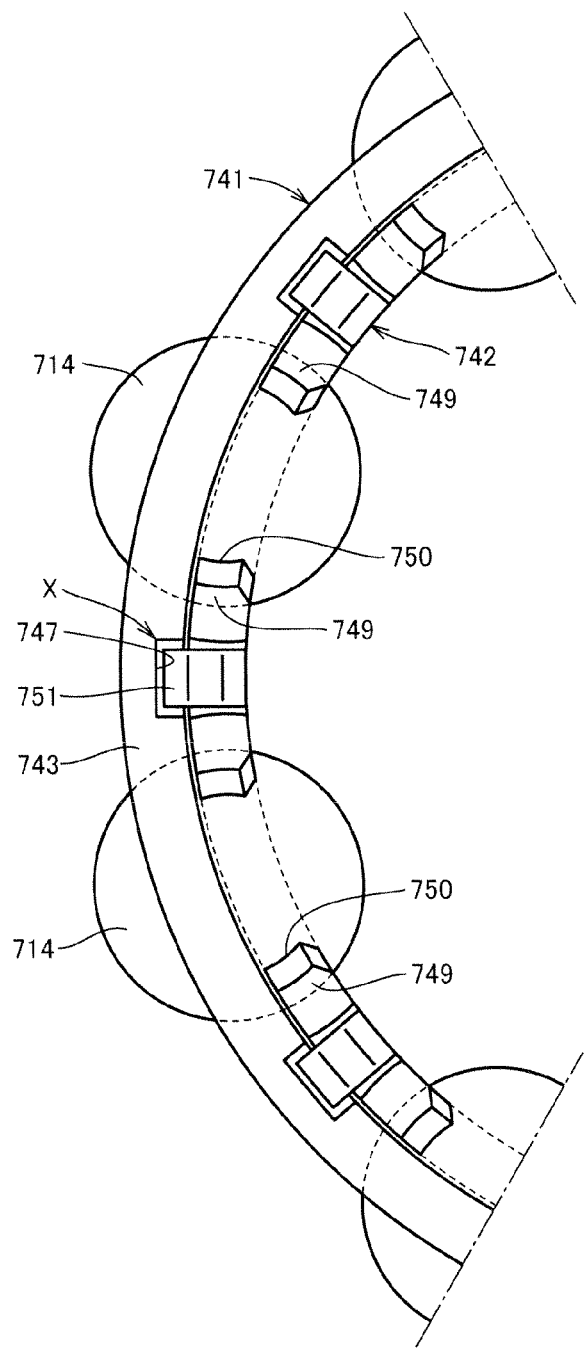
FIG. 46 is a right side view showing a portion of a cage in FIG. 45.
Figure 47:
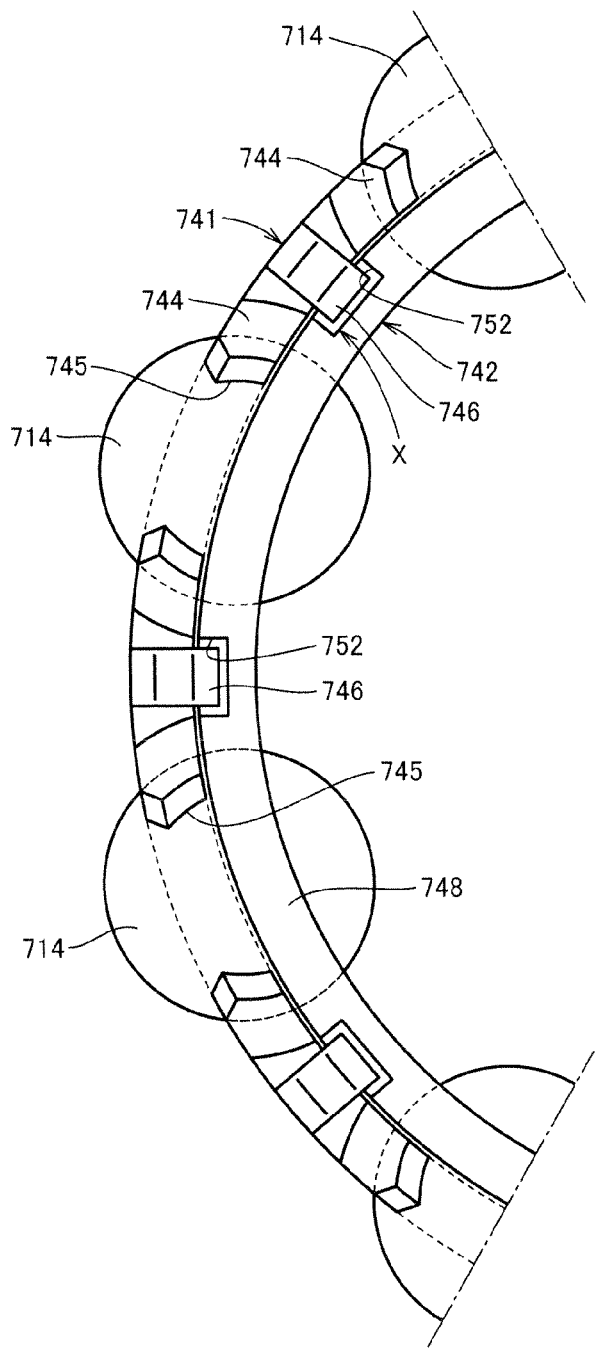
FIG. 47 is a left side view showing a portion of the cage in FIG. 45.

Next, a ninth embodiment will be described. Referring to FIG. 45, a deep groove ball bearing 701 in the present embodiment includes: an outer ring 711 which is a bearing part and serves as a first ring member; an inner ring 712, which is a bearing part and serves as a second ring member; balls 714, which are bearing parts and serve as a plurality of rolling elements; and a cage 740.

A pair of shoulders 713a, 713b are formed at both sides of outer ring groove 711A. Shoulder 713a positioned at one side of outer ring groove 711A has a height higher than that of shoulder 713b positioned at the other side. On the other hand, a pair of shoulders 723a, 723b are formed at both sides of inner ring groove 712A. Shoulder 723b positioned at the other side of inner ring groove 712A has a height higher than that of shoulder 723a positioned at one side.

Here, in the present embodiment, the shoulder height of each of low-height shoulders 713b and 723a is as high as the height of a shoulder of a standard type deep groove ball bearing but may be lower than the height of the shoulder of the standard type deep groove ball bearing.

For ease of description, high-height shoulders 713a, 723b will be referred to as "thrust load side shoulders 713a, 723b" whereas low-height shoulders 713b, 723a will be referred to as "non-thrust load side shoulders 713b, 723a".

Assuming that the shoulder height of each of thrust load side shoulders 713a, 723b is represented by $H_1$ and the spherical diameter of ball 714 is represented by d, a ratio of shoulder height $H_1$ to the spherical diameter of the ball, i.e., $H_1/d$ is set to fall within the following range: $H_1/d=0.25$ to $0.50$. Accordingly, ball 714 is effectively suppressed from being brought onto a shoulder under application of thrust load.

As one example, as a comparison product, a standard type deep groove ball bearing 6208C was prepared in which an inner ring had an outer diameter size of φ53.1 mm and an outer ring had an inner diameter size of φ68.1 mm. Based on this standard type deep groove ball bearing, the outer diameter size of the thrust load side shoulder of the inner ring was changed from φ53.1 mm to φ56.6 mm and the inner diameter size of the thrust load side shoulder of the outer ring was changed from φ68.1 mm to φ65.5 mm. For such a deep groove ball bearing, a permissible thrust load was measured. As a result, this deep groove ball bearing exhibited a higher permissible value for thrust load by 305% than that of the deep groove ball bearing serving as the comparison product. Further, also in the case where the outer diameter size of the shoulder of the inner ring at the side to which the thrust load (axial load) was not applied was changed from φ53.1 mm, which was the standard size, to φ51.9 mm and the inner diameter size of the shoulder of the outer ring at the side to which the axial load was not applied was changed from φ68.1 mm, which was the standard size, to φ70.4 mm, the ball was not brought onto the shoulder even under application of basic static rated load $C_0$ onto the bearing.

Here, if deep groove ball bearing 701 is attached in a wrong direction, the thrust load cannot be received, with the result that ball 714 may be brought onto low-height shoulders 713b, 723a. To address this, referring to FIG. 45, a distinguishing indication portion 755 for indicating the thrust load receiving side is provided in at least one wide surface side of outer ring 711, inner ring 712, first divided cage 741, and second divided cage 742, thereby preventing wrong attachment and improving assemblability. The distinguishing indication portion may be a color indication or an indication obtained through marking.

Cage 740 includes first divided cage 741 and second divided cage 742 fitted into the inside of first divided cage 741.

As shown in FIG. 45 to FIG. 48, in one side surface of annular body 743 of first divided cage 741 in the axial direction, plural pairs of pocket pawls 744 are formed side by side at an equal interval in the circumferential direction. Each pair of pocket pawls 744 faces each other. Between the pair of pocket pawls 744 facing each other, a pocket 745 obtained by hollowing out annular body 743 and having a size exceeding a ½ circle is provided. First divided cage 741 is constructed of a shaped product of a synthetic resin. Annular body 743 has an inner diameter substantially the same as the pitch circle diameter (PCD) of ball 714, and has an outer diameter falling within a range between the inner diameter of high-height shoulder 713a and the inner diameter of low-height shoulder 713b in outer ring 711. As a result, first divided cage 741 can be inserted into the bearing from the low-height shoulder 713b side of outer ring 711.

On the other hand, in the other side surface of annular body 748 of second divided cage 742 in the axial direction, plural pairs of pocket pawls 749 are formed side by side at an equal interval in the circumferential direction. Each pair of pocket pawls 749 faces each other. Between the pair of pocket pawls 749 facing each other, a pocket 750 obtained by hollowing out annular body 748 and having a size exceeding a ½ circle is provided. Second divided cage 742 is constructed of a shaped product of a synthetic resin. Annular body 748 has an outer diameter substantially the same as the pitch circle diameter (PCD) of ball 714, and has an inner diameter falling within a range between the outer diameter of high-height shoulder 723b and the outer diameter of low-height shoulder 723a in inner ring 712. As a result, second divided cage 742 can be inserted into the bearing from the low-height shoulder 723a side and can be fitted into the inside of first divided cage 741.

When first divided cage 741 and second divided cage 742 are fitted in each other, a joining portion X is provided between first divided cage 741 and second divided cage 742 so as not to separate first divided cage 741 and second divided cage 742 from each other in the axial direction. Joining portion X includes: an engaging pawl 746 provided inwardly between pocket pawls 744 of adjacent pockets 745 of first divided cage 741; an engagement recess 747 in the form of a groove formed in the inner diameter surface of annular body 743 on the same axis line as that of engaging pawl 746; an engaging pawl 751 provided outwardly between pocket pawls 749 of adjacent pockets 750 of second divided cage 742; and an engagement recess 752 formed in the outer diameter surface of annular body 748 on the same axis line as that of engaging pawl 751. First divided cage 741 and second divided cage 742 are prevented from being separated from each other in the axial direction, by the engagement between engaging pawl 746 of first divided cage 741 and engagement recess 752 of second divided cage 742 and the engagement between engaging pawl 751 of second divided cage 742 and engagement recess 747 of first divided cage 741.

Here, first divided cage 741 and second divided cage 742 are exposed to lubricating oil for lubricating the deep groove ball bearing, so that a synthetic resin excellent in oil resistance are used therefor. Examples of such a synthetic resin includes polyamide 46 (PA46), polyamide 66 (PA66), and polyphenylenesulfide (PPS). An appropriate one may be selected from these resins and may be used, depending on a type of lubricating oil.

Deep groove ball bearing 701 in the present embodiment has the above-described structure. For assembly of deep groove ball bearing 701, inner ring 712 is inserted into the inside of outer ring 711 and a required number of balls 714 are introduced between inner ring groove 712A and outer ring groove 711A.

In doing so, inner ring 712 is offset in the radial direction relative to outer ring 711 so as to bring a portion of the outer diameter surface of inner ring 712 into abutment with a portion of the inner diameter surface of outer ring 711. At a location displaced by 180° from the abutted portion in the circumferential direction, a space of crescent shape is formed. From one side of the space, ball 714 is introduced to the inside thereof.

During introduction of ball 714, if shoulder height $H_1$ of thrust load side shoulder 713a of outer ring 711 or thrust load side shoulder 723b of inner ring 712 is higher than necessary, ball 714 is hindered from being introduced. In the present embodiment, the height thereof is configured such that the ratio of shoulder height $H_1$ to spherical diameter d of ball 714, i.e., $H_1/d$ is not more than 0.50. Accordingly, ball 714 can be readily introduced between outer ring 711 and inner ring 712.

After the introduction of ball 714, balls 714 are disposed at an equal interval in the circumferential direction with the center of inner ring 712 being matched with the center of outer ring 711. From one side of non-thrust load side shoulder 713b of outer ring 711, first divided cage 741 is inserted between outer ring 711 and inner ring 712 such that balls 714 are fitted into pockets 745 formed in first divided cage 741.

Likewise, from one side of non-thrust load side shoulder 723a of inner ring 712, second divided cage 742 is inserted between outer ring 711 and inner ring 712 such that balls 714 are fitted in pockets 750 formed in second divided cage 742, and second divided cage 742 is fitted in first divided cage 741.

Figure 51:
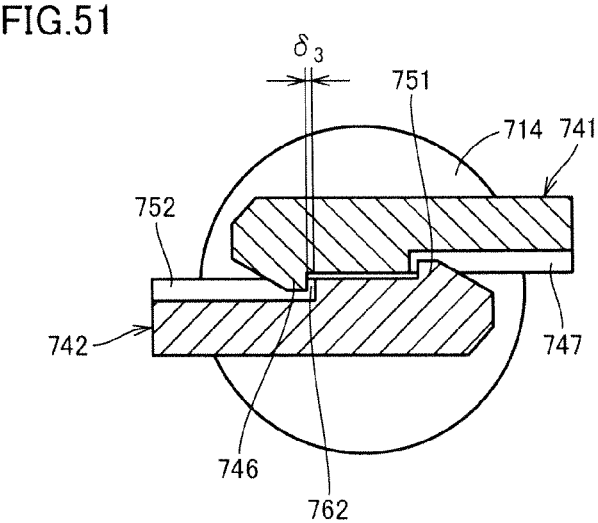
FIG. 51 is a cross sectional view showing a joining portion between the first divided cage and the second divided cage in FIG. 45 in an enlarged manner.

As described above, by fitting second divided cage 742 in the inside of first divided cage 741, as shown in FIG. 45 and FIG. 51, engaging pawls 746, 51 formed in divided cages 741, 742 are correspondingly engaged with engagement recesses 747, 752 formed in their counterpart divided cages, thereby completing assembly of deep groove ball bearing 701.

Thus, deep groove ball bearing 701 can be assembled by such a simple operation as follows: balls 714 are introduced between outer ring groove 711A and inner ring groove 712A, thereafter first divided cage 741 and second divided cage 742 are inserted into inside from the both sides between outer ring 711 and inner ring 712, and then second divided cage 742 is fitted in first divided cage 741.

In FIG. 45, the height of each of non-thrust load side shoulders 713b and 723a each having the low height is as high as the height of the shoulder of the standard type deep groove ball bearing, but may be lower than the height of the shoulder of the standard type deep groove ball bearing.

When the height of each of non-thrust load side shoulders 713b and 723a is made lower than the height of the shoulder of the standard type deep groove ball bearing, the thicknesses of first divided cage 741 and second divided cage 742 in the radial direction can be made thicker by an amount corresponding to the lowered height, thereby increasing the strength of cage 740.

Here, if the height of each of non-thrust load side shoulders 713b and 723a is lower than necessary, ball 714 may be brought onto the shoulder. Hence, for shoulder height $H_2$ of shoulder 713b of outer ring 711, it is preferable to set the ratio of shoulder height $H_2$ to spherical diameter d of ball 714, i.e., $H_2/d$ to fall within a range of 0.09 to 0.50. On the other hand, for shoulder height $H_3$ of shoulder 723a of inner ring 712, it is preferable to set the ratio of shoulder height $H_3$ to the spherical diameter of ball 714, i.e., $H_3/d$ to fall within a range of 0.18 to 0.50.

Figure 52:
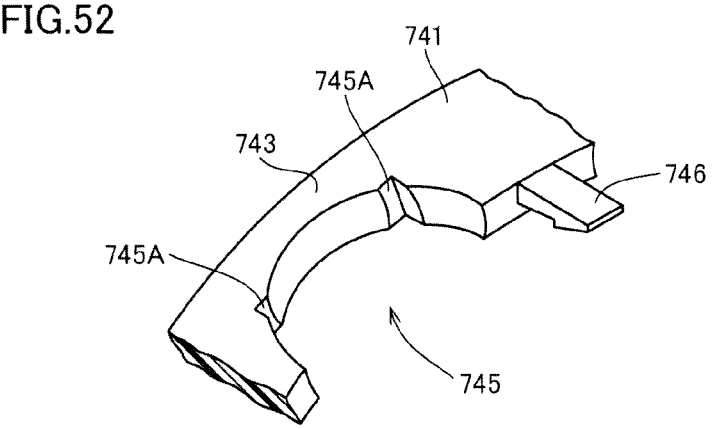
FIG. 52 is a schematic view for illustrating a relief portion formed in the pocket.
Figure 53:
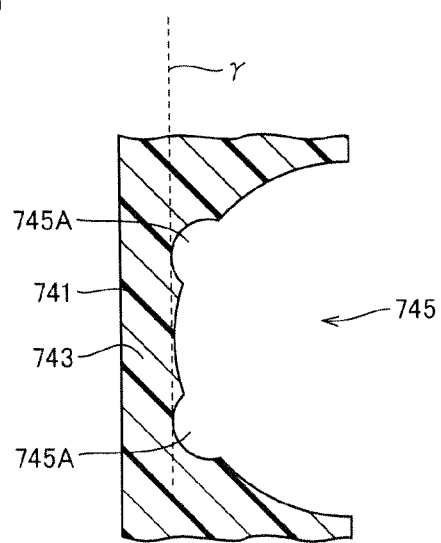
FIG. 53 is a schematic cross sectional view for illustrating the relief portion formed in the pocket.

Further, as shown in FIG. 52 and FIG. 53, in the inner circumferential surface of pocket 745 of first divided cage 741, a relief portion 745A, which is not to be in contact with the ball, may be formed. This improves passage of the lubricating oil within pocket 745, thereby suppressing accumulation of foreign matters in the joining portion between first divided cage 741 and second divided cage 742. Further, as shown in FIG. 53, a pair of relief portions 745A may be provided for each pocket 745 so as to include regions equally distanced away from the center of the bottom of pocket 745. Further, the shape of relief portion 745A in a plane (cross section shown in FIG. 53) perpendicular to the thickness direction of the divided cage may be a curved shape (such as a spherical shape or a U-shape). In FIG. 53, the shape of relief portion 745A is a spherical shape. Further, in the plane perpendicular to the thickness direction of the divided cage, the bottom portion of each of the pair of relief portions 750A and the center of the bottom of the pocket may be on the same straight line γ. Accordingly, passage of the lubricating oil can be improved more securely. It should be noted that such a relief portion may be also formed for pocket 750 of second divided cage 742.

In deep groove ball bearing 701 of the present embodiment, the pair of pocket pawls 744 facing each other are provided at the open ends of pocket 745 of first divided cage 741 and the pair of pocket pawls 749 facing each other are provided at the open ends of pocket 750 of second divided cage 742 such that they hold ball 714 therebetween, a combination of the pair of pocket pawls 744 provided in first divided cage 741 to face each other and the pair of pocket pawls 749 provided in second divided cage 742 to each other are directed in opposite directions, and engaging pawls 746, 51 are engaged with engagement recesses 747, 752 in this combination, thereby preventing first divided cage 741 and second divided cage 742 from being separated from each other in the axial direction. Accordingly, even if ball 714 is moved backward or forward due to application of a large moment load, cage 740 is suppressed from falling.

Figure 48:
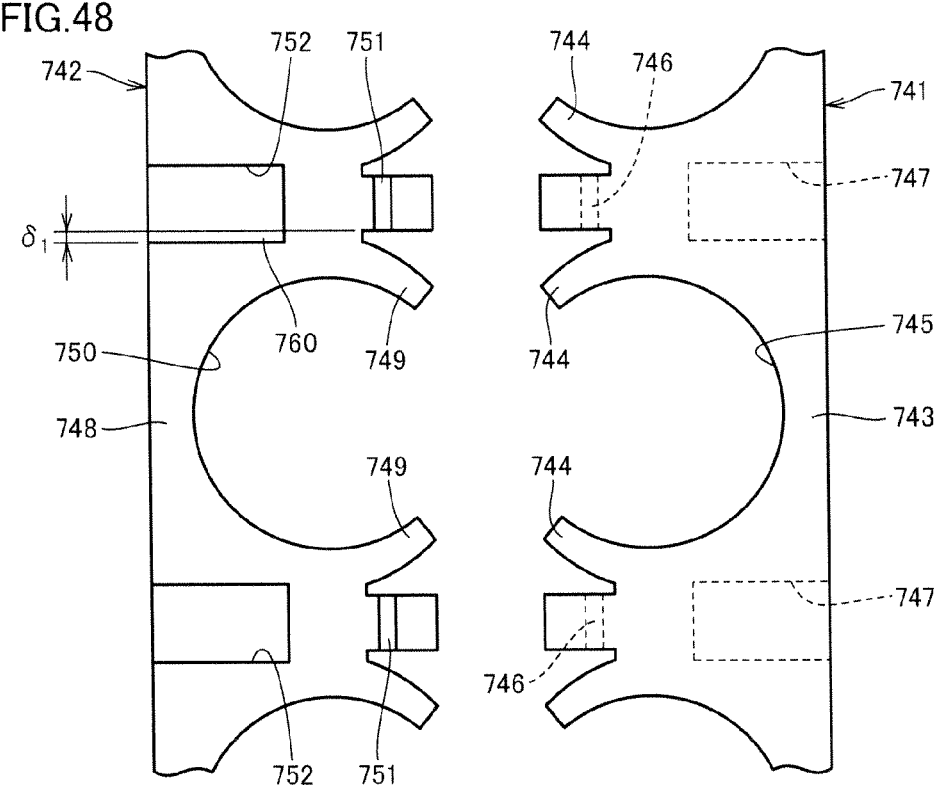
FIG. 48 is a plan view showing a portion of a first divided cage and a second divided cage.
Figure 49:
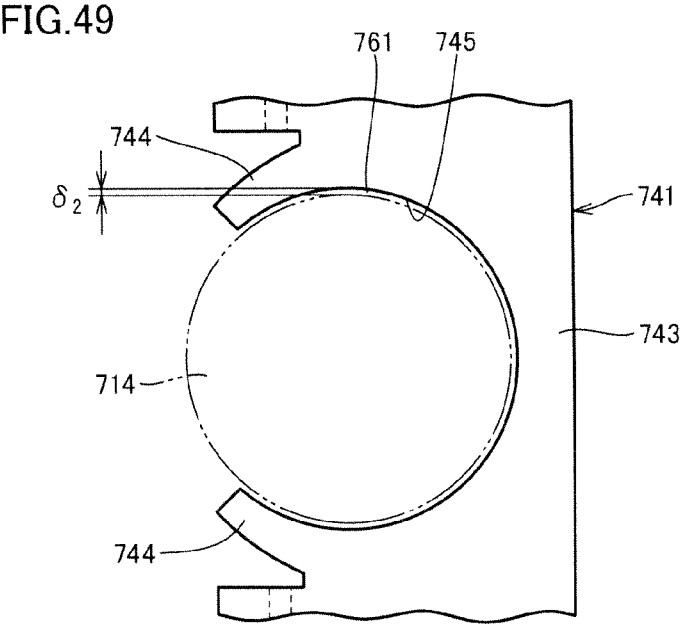
FIG. 49 is a plan view showing a circumferential pocket gap when a ball is introduced into a pocket of the first divided cage shown in FIG. 48.

Here, as shown in FIG. 48 and FIG. 49, a gap amount $\delta_1$ of a circumferential gap 60 between engaging pawls 746, 51 and engagement recesses 747, 752 is made larger than a gap amount $\delta_2$ of a circumferential pocket gap 61 formed between ball 714 and pockets 745, 750. Accordingly, even if ball 714 is moved backward or forward due to application of a large moment load to rotate first divided cage 741 and second divided cage 742 relative to each other, engaging pawls 746, 51 are never brought into abutment with the side surfaces of engagement recesses 747, 752 facing each other in the circumferential direction, thereby effectively preventing damage on engaging pawls 746, 51.

Figure 50:
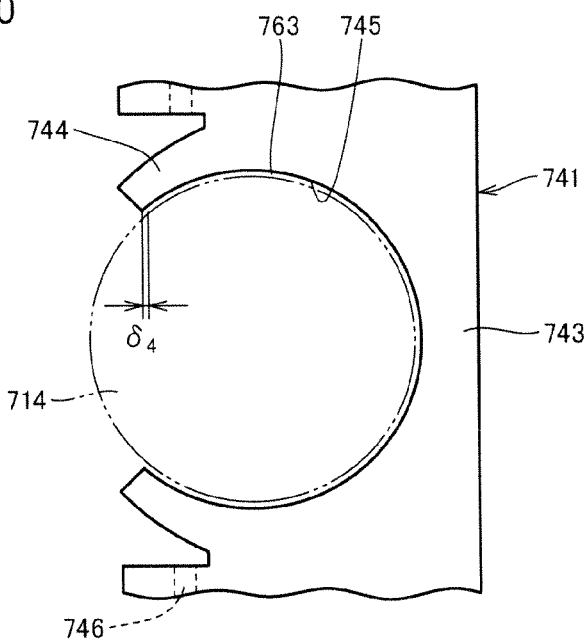
FIG. 50 is a plan view showing an axial pocket gap when the ball is introduced into the pocket of the first divided cage shown in FIG. 48.

Further, as shown in FIG. 50 and FIG. 51, a gap amount $\delta_3$ of an axial gap 62 formed between engaging pawls 746, 51 and engagement recesses 747, 752 is made larger than a gap amount $\delta_4$ of an axial pocket gap 63 formed between ball 714 and pockets 745, 750. Accordingly, when an axial force is exerted in a direction of separating first divided cage 741 and second divided cage 742 from each other, the inner surfaces of the pair of pocket pawls 744, 749 facing each other are brought into abutment with the outer circumferential surface of ball 714 to avoid engaging pawls 746, 51 from being brought into abutment with the axial end surfaces of engagement recesses 747, 752, thereby effectively preventing damage on engaging pawls 746, 51.

Further, each of outer ring 711, inner ring 712 and balls 714 serving as the bearing parts is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of iron and an impurity. Regions thereof including the surface of outer ring groove 711A, the surface of inner ring groove 712A, and ball rolling contact surface 714A serving as the contact surfaces are provided with nitrogen enriched layers 711B, 712B, 713B formed to have nitrogen concentrations higher than those of inner portions 711C, 712C, 713C. The nitrogen concentration is not less than 0.25 mass % in each of the surfaces of nitrogen enriched layers 711B, 712B, 713B, i.e., in the surface of outer ring groove 711A, the surface of inner ring groove 712A, and ball rolling contact surface 714A, each of which serves as the contact surface. Further, a remaining austenite amount in each of the surface of outer ring groove 711A, the surface of inner ring groove 712A and ball rolling contact surface 714A is not less than 6 volume % and not more than 12 volume %.

Each of outer ring 711, inner ring 712, and ball 714, which are the bearing parts in the present embodiment, is made of a steel having a component composition equivalent to the JIS SUJ2 steel. Hence, the material thereof can be readily available across the globe. A long rolling fatigue life is attained when the steel having the component composition is used, the nitrogen concentration is increased to 0.25 mass % or more in each of the surface of outer ring groove 711A, the surface of inner ring groove 712A and ball rolling contact surface 714A and the quench-hardening is provided. Further, when the remaining austenite amount is reduced to 12 volume % or less, indentation resistance is improved. When the remaining austenite amount is set at 6 volume % or more, the rolling fatigue life, in particular, rolling fatigue life under a foreign matter introduction environment is maintained at an appropriate level. As a result, each of outer ring 711, inner ring 712, and ball 714 becomes a bearing part capable of attaining a high level of indentation resistance and a high level of rolling fatigue life while the material thereof can be secured readily.

As described above, deep groove ball bearing 701 in the present embodiment includes outer ring 711, inner ring 712, ball 714, and cage 740, thereby attaining a high level of indentation resistance and a high level of rolling fatigue life while the material thereof is readily secured and thereby addressing a thrust load.

It should be noted that each of the contact surfaces of outer ring 711, inner ring 712 and ball 714, i.e., the surface of outer ring groove 711A, the surface of inner ring groove 712A and ball rolling contact surface 714A preferably has a hardness of not less than 60.0 HRC. Accordingly, the rolling fatigue life and the indentation resistance can be improved further.

Further, each of the surface of outer ring groove 711A, the surface of inner ring groove 712A and ball rolling contact surface 714A of outer ring 711, inner ring 712 and ball 714 preferably has a hardness of not more than 64.0 HRC. In this way, the remaining austenite amount in each of the surface of outer ring groove 711A, the surface of inner ring groove 712A and ball rolling contact surface 714A can be readily adjusted to fall within a range of 12 volume % or less.

Meanwhile, the groove curvature of inner ring 712 relative to ball 714 may be not less than 1.02 and not more than 1.06. On the other hand, the groove curvature of outer ring 711 relative to ball 714 may be not less than 1.02 and not more than 1.08. In this way, ball 714 can be suppressed from being brought onto the shoulder while suppressing a sliding component between the ring member and the ball.

Deep groove ball bearing 701 and outer ring 711, inner ring 712 and ball 713 included in deep groove ball bearing 701 in the ninth embodiment can be manufactured using the same methods of manufacturing the rolling bearing and the bearing part in the first embodiment.

Further, as with deep groove ball bearing 1 in the first embodiment, deep groove ball bearing 701 in the present embodiment can be used in manual transmission 100 and differential 200 described in the second and third embodiments. In doing so, by introducing deep groove ball bearing 701 in manual transmission 100 or differential 200 to appropriately position the shoulder at the thrust load receiving side in deep groove ball bearing 701, damage otherwise caused by ball 714 being brought onto the shoulder can be suppressed.

EXAMPLE 1

Example 1

An experiment was conducted to study an influence of a heat treatment condition or the like over a characteristic of a bearing part. First, a flat plate of JIS SUJ2 was prepared and was carbonitrided by pre-heating it at 800° C. for one hour, then heating it at 850° C. in an atmosphere including RX gas and ammonia gas, and retaining it for 4 hours. Thereafter, the flat plate at the heating temperature of 850° C. in the carbonitriding treatment was directly soaked in quenching oil, thereby quench-hardening the flat plate. Further, the flat plate was subjected to a tempering treatment at various temperatures. A SUJ2 standard rolling bearing steel ball having a diameter of 19.05 mm was pressed against the resulting flat plate at a load of 3.18 kN (at a maximum contact pressure of 4.4 GPa) for 10 seconds before unloading it. Then, the depth of indentation formed in the flat plate by the pressing of the steel ball was measured to study indentation resistance. Further, the surface hardness of the same test piece was measured using a Rockwell hardness tester. The result of study on the indentation resistance is shown in FIG. 54 and the result of measurement of the hardness is shown in FIG. 55.

Figure 54:
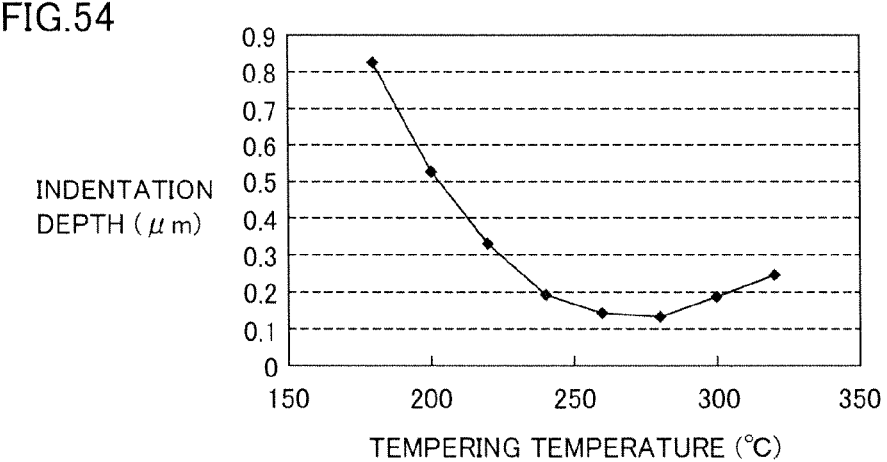
FIG. 54 shows a relation between a tempering temperature and an indentation depth.
Figure 55:
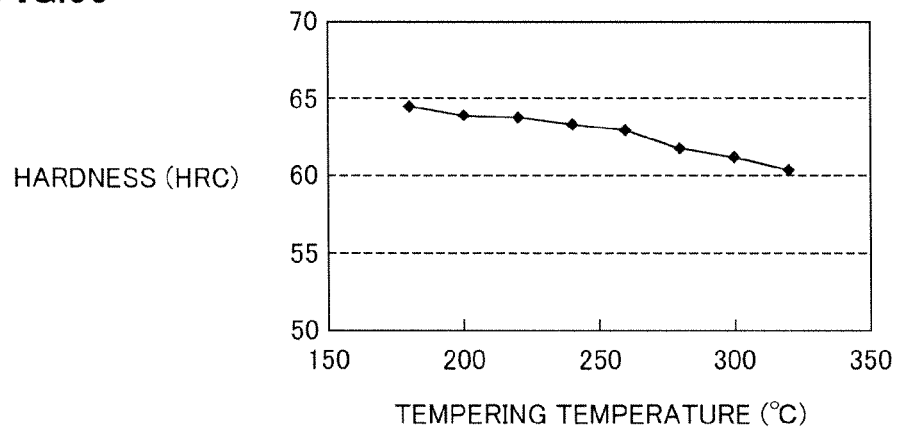
FIG. 55 shows a relation between the tempering temperature and hardness.

Referring to FIG. 54 and FIG. 55, the surface hardness was decreased as the tempering temperature became higher, while the indentation depth has the minimum value. Specifically, the indentation depth becomes 0.2 µm or less by setting the tempering temperature at not less than 240° C. and not more than 300° C. Accordingly, in order to improve the indentation resistance, it can be said that the tempering temperature is preferably not less than 240° C. and not more than 300° C.

Here, it is considered that the optimum value of the above-described tempering temperature is determined as follows. When the quenching treatment is performed, carbon is dissolved in the steel base. Meanwhile, when the tempering treatment is performed, part of the carbon dissolved in the base is precipitated as a carbide (such as $Fe_3C$). As the temperature of the tempering treatment is higher on this occasion, the solid-solution strengthening less contributes to the yield strength of the steel and the precipitation strengthening more contributes thereto. By performing the tempering treatment in the temperature range of not less than 240° C. and not more than 300° C., balance between these strengthening mechanisms becomes optimum and the yield strength has the maximum value, so that the indentation resistance becomes particularly high.

Irrespective of the monotonous decrease of the surface hardness measured based on deformation of the steel caused by the pressing that provides the indentation as with the above-described measurement on the indentation depth, the indentation resistance had the maximum value due to the following reason.

Figure 56:
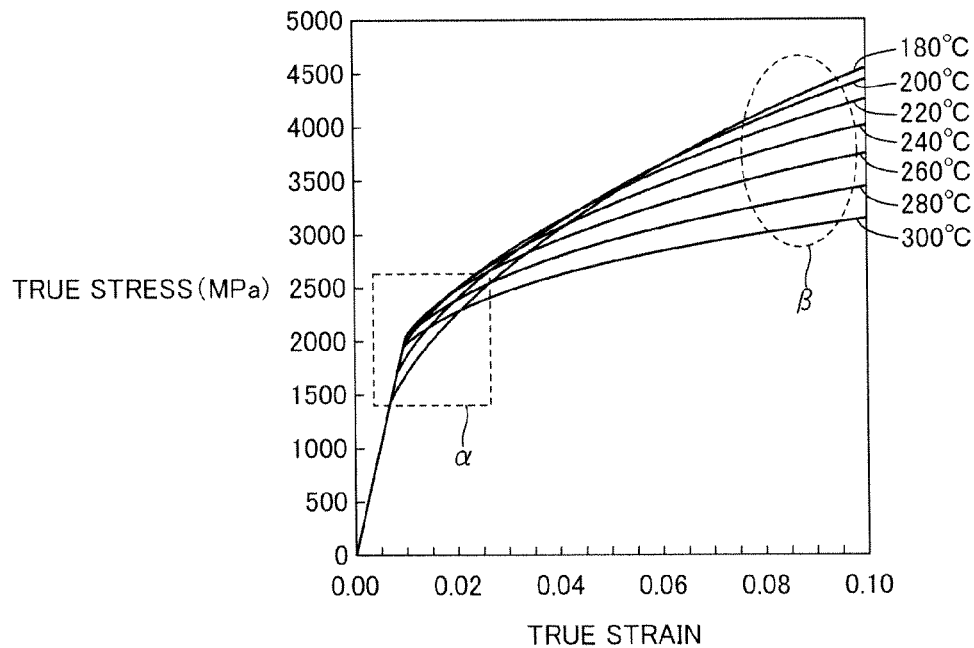
FIG. 56 shows a relation between true strain and true stress.

FIG. 56 shows a relation between true stress and true strain at each tempering temperature in a tensile test piece (JIS Z2201 4 test piece) having been subjected to the above-described heat treatment for the plate except the carbonitriding treatment. FIG. 56 is a diagram of true stress-true strain modeled using an n-power hardened elasto-plastic body. Characteristics differs with $\sigma_Y$ yield stress being a threshold as indicated by the following formulas:

$$\sigma = E\epsilon (\sigma < \sigma_Y)$$

$$\sigma = K\epsilon^n (\sigma \geq \sigma_Y) \quad [\text{Formula 2}]$$

Here, σ represents true stress, E represents Young's modulus, ε represents the true strain, K represents plasticity coefficient, n represents work hardening coefficient, and $\sigma_Y$ represents yield stress. It should be noted that Young's modulus E was actually measured using a resonance method, and work hardening coefficient n and plasticity coefficient K were actually measured using a tension test. These were assigned to the above-described two formulas and the intersection was represented by $\sigma_Y$.

Figure 57:
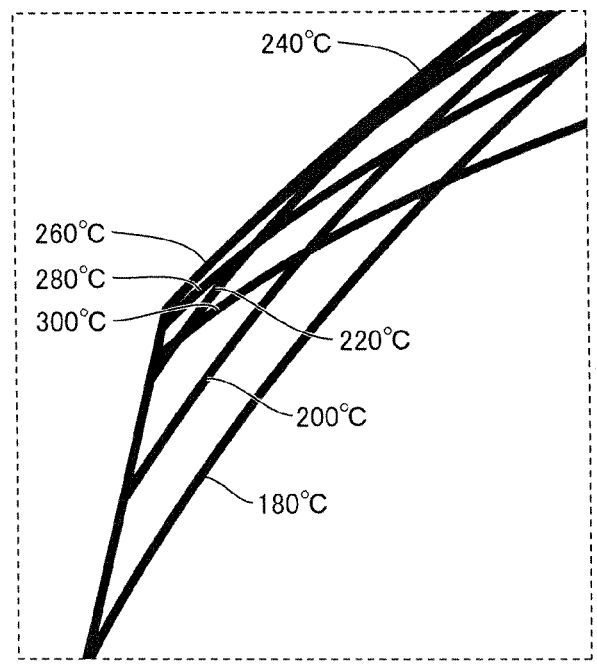
FIG. 57 shows a region α in FIG. 56 in an enlarged manner.

Here, the level of true strain in the measurement of indentation depth corresponds to a region α in FIG. 56, whereas the level of true strain in the measurement of hardness corresponds to a region β or larger in FIG. 56. Referring to FIG. 57, the yield point in region α corresponding to the measurement region of indentation depth is checked to find that the yield point was high when the tempering temperature fell within a range of 240° C. to 300° C. and the yield point was decreased when the tempering temperature was lower than this. On the other hand, referring to FIG. 56, it is understood that in region β corresponding to the measurement region of surface hardness, in order to provide the same amount of strain, a larger stress was required as the tempering temperature was decreased. Such a phenomenon presumably provides improved indentation resistance by setting the tempering temperature at 240° C. to 300° C., even though the hardness was decreased as compared with the case where the tempering temperature was 180° C. to 220° C.

In addition to the tempering temperature, a remaining austenite amount in the surface, an indentation depth, a life, a ring crushing strength, and a ratio of change with passage of time were studied with respect to each of the test pieces having been subjected to heat treatment with the surface nitrogen concentration and quenching temperature being changed.

Here, the indentation depth was measured as with the above-described case. The indentation depth was evaluated in the following manner: an indentation depth of less than 0.2 µm was evaluated as B, an indentation depth of 0.2 µm to 0.4 µm was evaluated as C, and an indentation depth of 0.4 µm or more was evaluated as D. The life was found by forming indentation in the ring surface under the same condition as that in the measurement of indentation depth and then simulating a load condition in a case where the bearing was used in a transmission under a condition that the oil film parameter was 0.5 during lubrication with clean oil. Then, the life of a test piece obtained with the quenching temperature being 850° C., the tempering temperature being 240° C., and the surface nitrogen amount being 0.4 mass % was assumed as a reference (B). A life longer than the reference life was evaluated as A. A life shorter than the reference life was evaluated as C. A life much shorter than the reference life was evaluated as D. The ring crushing strength was evaluated by fabricating a ring having an outer diameter of 60 mm, an inner diameter of 54 mm, and a width of 15, compressing it in the radial direction using a plate, and checking a load at which a crack was generated. When the load upon the generation of crack was not less than 5000 kgf, it was evaluated as A. When the load upon the generation of crack was 3500 kgf to 5000 kgf, it was evaluated as B. When the load upon the generation of crack was less than 3500 kgf, it was evaluated as D. Further, the ratio of change with passage of time was evaluated by retaining the test piece at 230° C. for 2 hours and measuring an amount of change in outer diameter size from the size prior to the heat treatment. When the amount of change was not more than $10.0 \times 10^5$, it was evaluated as A. When the amount of change was $10.0 \times 10^5$ to $30.0 \times 10^5$, it was evaluated as B. When the amount of change was $30.0 \times 10^5$ to $90.0 \times 10^5$, it was evaluated as C. When the amount of change was not more than $90.0 \times 10^5$, it was evaluated as D. The result of test is shown in Table 1.

TABLE 1

| Surface Nitrogen Concentration | Quenching Temperature | Tempering Temperature | Remaining Austenite | Indentation Depth | | Life | Ring Crushing Strength | | Ratio of Change with Passage of Time | |
|---|---|---|---|---|---|---|---|---|---|---|
| (Mass %) | (° C.) | (° C.) | (Volume %) | (μm) | Determination | | (kgf) | Determination | ×10⁵ | Determination |
| 0.4 | 850 | 240 | 8.6 | 0.138 | B | A | 3657 | B | 2.5 | A |
| 0.25 | 820 | 240 | 6.5 | 0.118 | B | B | 5403 | A | −1.9 | A |
| 0.25 | 850 | 240 | 7.7 | 0.128 | B | B | 3923 | B | 0.6 | A |
| 0.1 | 820 | 240 | 6.0 | 0.179 | B | D | 5153 | A | −2.5 | A |
| 0.1 | 850 | 240 | 3.7 | 0.132 | B | D | 4643 | A | 0.8 | A |
| 0.4 | 850 | 180 | 22.9 | 0.485 | D | C | 4083 | B | 98.1 | D |
| 0.4 | 880 | 240 | 10.2 | 0.234 | C | C | 3040 | D | 6.6 | A |
| 0.4 | 880 | 210 | 26.3 | 0.559 | D | C | 3170 | D | 65.3 | C |
| 0.4 | 820 | 210 | 26.0 | 0.318 | C | C | 6407 | A | 49.1 | C |
| 0.25 | 880 | 240 | 10.9 | 0.232 | C | B | 3300 | D | 8.6 | A |
| 0.25 | 880 | 180 | 31.0 | 0.686 | D | D | 3123 | D | 93.8 | D |
| 0.25 | 850 | 210 | 24.2 | 0.384 | C | C | 4147 | B | 63.3 | C |
| 0.25 | 820 | 210 | 20.5 | 0.271 | C | C | 6500 | A | 44.7 | C |
| 0.1 | 880 | 210 | 20.1 | 0.499 | D | D | 4157 | B | 70.0 | C |
| 0.1 | 850 | 210 | 12.9 | 0.304 | C | D | 5057 | A | 63.2 | C |
| 0.1 | 820 | 210 | 14.4 | 0.261 | B | D | 5913 | A | 48.6 | C |
| 0.1 | 880 | 180 | 30.8 | 0.567 | D | D | 4233 | B | 93.7 | D |

Referring to Table 1, excellent evaluations in all the above-described items were attained in test pieces satisfying all of the following conditions: the surface nitrogen concentration was 0.25 mass % to 0.5 mass %, the quenching temperature was 820° C. to 860° C., and the tempering temperature was 240° C. to 300° C.

EXAMPLE 2

Torques were measured in the bearing (deep groove ball bearing; inventive product) employing the cage having ball non-contact portion 432 at pocket 430 in the above-described fifth embodiment and the bearing (deep groove ball bearing; conventional product) employing the conventional cage having no ball non-contact portion at pocket 430. Each of the bearings employed had a size with an inner diameter of ϕ35 mm, an outer diameter of ϕ72 mm, and a width of 17 mm (bearing number 6207 provided by NTN Corporation). The radial load was set at 500 N, the rotational speed was set at 1000 r/min and 2000 r/min, the type of lubricating oil was set to be ATF, the lubricating oil temperature was set at 30° C., the kinematic viscosity was set at 29.6 mm²/s (40° C.) and 7.07 mm²/s (100° C.), and the density was set at 0.87 g/cm³. The oil height level was set at the center of the lowermost ball. Meanwhile, the size of the cage in the inventive product was set as follows: the value of A/(B+C) was 0.77, the value of D/E was 0.33, the value of F/G was 0.33, and the value of curvature R was 0.2 mm.

The above-described torque measurement condition was regarded as a "first condition". Table 2 below shows the result of measurement of torque under this torque measurement condition (torque reduction ratio of the bearing employing the cage having the ball non-contact portion to the conventional product). Regarded as a second condition was a condition in which the oil height level was set at the height to which the lowermost ball was soaked in the oil and the other conditions were the same as those in the first condition. Table 3 below shows the result of measurement of torque under this torque measurement condition (torque reduction ratio of the bearing employing the cage having the ball non-contact portion to the conventional product).

TABLE 2

| 1000 r/min | 2000 r/min |
|---|---|
| 9% | 9% |

TABLE 3

| 1000 r/min | 2000 r/min |
|---|---|
| 0% | 0% |

In the second condition, stirring resistance provided by the lubricating oil accounts for most of bearing torque in the ratio. The torque reduction effect provided by the cage having the ball non-contact portion was not detected. In other words, it is considered that in a state in which there is a large amount of lubricating oil, the torque reduction effect provided by the ball non-contact portion is small even when the cage of the rolling bearing in the present invention was employed. In contrast, the cage of the rolling bearing in the present invention exhibits a noticeable low torque effect when used in a state in which there is a small amount of lubricating oil as in the first condition, specifically, in the case of "spraying or splashing" of the lubricating oil or the like. In actual application, an amount of lubricating oil tends to be reduced for the purpose of fuel saving in lubrication environment for a bearing supporting a transmission shaft of a vehicle, such as one for supporting a differential or one for supporting a transmission. Hence, the rolling bearing of the present invention is suitable for these bearings for use in supporting. In addition, an amount of lubricating oil is small in a crank, a cam, a transmission, or the like in a motorcycle as in the first condition. Hence, the rolling bearing of the present invention is suitable for a bearing supporting a shaft included in each of these.

EXAMPLE 3

Example A

Cages (metal cages: press-worked product) having shapes A, B, C, D, E, and F shown in FIG. 23 to FIG. 28 were manufactured. They were used to assemble ball bearings shown in FIG. 20. Torques to be generated were measured.

The result thereof is shown in Table 4 below. The term "standard product" in Table 4 refers to the conventional product having no ball non-contact portion 531.

TABLE 4

|  | Protrusion Shape | Steel Ball-Cage Contact Area (%) | Torque Reduction Ratio (%) |
| --- | --- | --- | --- |
| Standard Product | None | 100 | 0 |
| Shape A (Fig. 23) | W 1.6 mm, L 9.0 mm | 70 | 59 |
| Shape B (Fig. 24) | W 1.6 mm, L 5.5 mm | 83 | 52 |
| Shape C (Fig. 25) | W 2.6 mm, L 5.5 mm | 70 | 59 |
| Shape D (Fig. 26) | W 1.6 mm, L 9.0 mm | 70 | 62 |
| Shape E (Fig. 27) | W 1.6 mm, L 5.5 mm | 83 | 54 |
| Shape F (Fig. 28) | W 1.6 mm, L 4.8 mm | 85 | 50 |

In Table 4, shape D is formed such that protrusion 532 is shifted from PCD to the outer diameter side by 0.8 mm in shape A. Shape E is formed such that protrusion 532 is shifted from PCD to the outer diameter side by 0.8 mm in shape B. In Table 4, the column "steel ball-cage contact area" indicates a ratio (%) thereof assuming that the area in the standard product is 100%. Further, the bearing employed was such that the outer diameter size of outer ring 511 was 72.0 mm, the inner diameter size of outer ring 511 was 60.2 mm, the outer diameter size of inner ring 512 was 47.0 mm, the inner diameter size of inner ring 512 was 35.0 mm, and the outer diameter size of ball (steel ball) 513 was 11.1 mm.

The experiment was conducted in the following condition. Under application of a radial load of 500 N to the bearing, a rotational speed of 4000 r/min was given. A portion of the bearing was soaked in a lubricating oil (ATF T-4, a genuine product of Toyota) of 30° C. More specifically, with the central axis line of the bearing being kept to be horizontal, only a lowermost ball in the direction vertical thereto was soaked completely.

Figure 58:
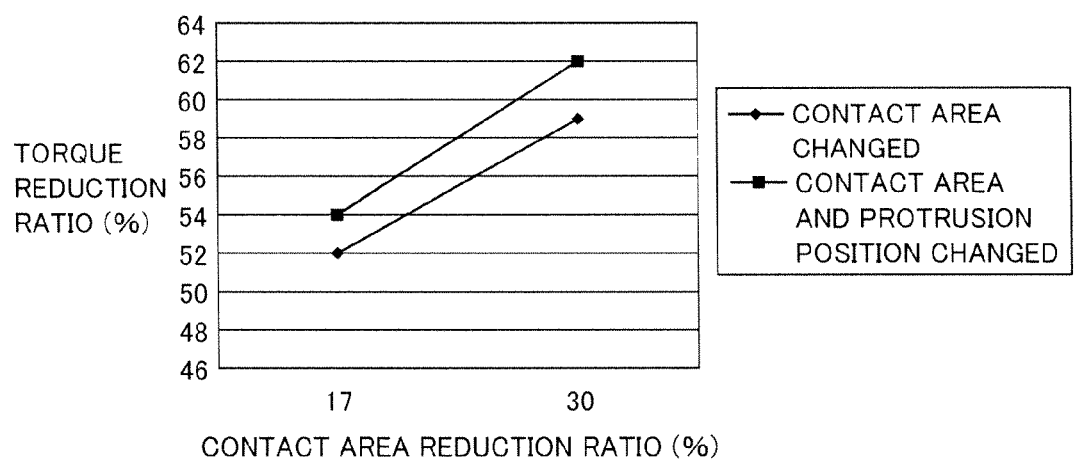
FIG. 58 shows a relation between a contact area reduction ratio and a torque reduction ratio.

FIG. 58 shows a graph showing a change in torque between a case where the contact area between ball 513 and cage 514 was changed and a case where protrusion 532 was shifted from PCD to the outer diameter side. As apparent from Table 4 and FIG. 58, by reducing the contact area by about 15%, the torque could be reduced by about 50%. Moreover, the torque could be reduced by about 60% by reducing the contact area by 30% and shifting protrusion 532 from PCD to the outer diameter side by 0.8 mm.

Example B

Cages (metal cages: press-worked products) having slit 535 as shown in FIG. 31 were manufactured. They were used to assemble ball bearings shown in FIG. 30. Torques to be generated were measured. By forming slit 535 in cage 514, the contact area between cage 514 and ball 513 was reduced by 30% as compared with the standard product (cage having no slit 535). As with Example 1 described above, under application of a radial load of 500 N to the bearing, a rotational speed of 4000 r/min was given. As with Example A described above, a portion of the bearing was soaked in a lubricating oil (ATF T-4, a genuine product of Toyota) of 30° C. Accordingly, the torque was reduced by about 40%. Specifically, the torque of the standard product was 0.152 Nm whereas the torque in the case where the cage having slit 535 was employed was 0.093 Nm. Further, the bearing employed was such that the outer diameter size of outer ring 511 was 72.0 mm, the inner diameter size of outer ring 511 was 60.2 mm, the outer diameter size of inner ring 512 was 47.0 mm, the inner diameter size of inner ring 512 was 35.0 mm, and the outer diameter size of ball (steel ball) 513 was 11.1 mm. It should be noted that bearings with the same size were used in Examples C and D described below.

Comparative Example C

Metal cages were manufactured, in each of which the bearing inner diameter side and bearing outer diameter side of hemispherical projecting portion 526 were cut instead of protrusion 532 and slit 535. They were used to assemble ball bearings shown in FIG. 30. Torques to be generated were measured. The contact area between cage 514 and ball 513 was reduced by 25% as compared with the standard product (cage having no slit 535). The measurement condition was the same as that of the examples described above. In this case, the torque was reduced by about 11%. Specifically, the torque of the standard product was 0.152 Nm, whereas the torque in the case of the cage with the bearing inner diameter side and bearing outer diameter side being cut was 0.135 Nm.

Example D

Resin cages were manufactured, in each of which the bearing outer diameter side of hemispherical projecting portion 526 were cut. They were used to assemble ball bearings shown in FIG. 30. Torques to be generated were measured. The material of each cage was a resin material (PA66). The contact area between cage 514 and ball 513 was reduced by 30% as compared with the standard product. The measurement condition was the same as that of the examples described above. In this case, the torque was reduced by about 18%. Specifically, the torque of the standard product was 0.152 Nm, whereas the torque in the case of the cage with the bearing outer diameter side being cut was 0.124 Nm.

EXAMPLE 4

An experiment was conducted to confirm the torque reduction effect provided by the present invention. The experiment was conducted in the following procedure.

First, a deep groove ball bearing was fabricated (sample A) in which a common resin cage was employed, an inner ring, an outer ring, and a ball (each made of JIS SUJ2) were subjected to a common immersion quenching treatment, the inner ring had a ring surface curvature of 1.02, and the outer ring had a ring surface curvature of 1.04. Also fabricated was a deep groove ball bearing (sample B) in which the structure of the cage in sample A was changed to the structure illustrated in the above-described embodiment based on FIG. 33 to FIG. 41. Also fabricated was a deep groove ball bearing (sample C) in which the heat treatment for the inner ring, the outer ring and the ball was changed from the heat treatment in sample B to obtain the high-strength bearing part described in the above-described embodiment, the inner ring was changed to have a ring surface groove curvature of 1.048, and the outer ring was changed to have a ring surface groove curvature of 1.12.

Then, with regard to each of samples A to C, a rotation torque was measured during an operation performed under a condition that the radial load was 3 kN, the rotational speed was 6000 min$^{-1}$, the lubricating oil was ATF (Automatic Transmission Fluid), and the lubrication was oil bath lubrication with the oil height corresponding to the position of the PCD (Pitch Circle Diameter) of the lowermost rolling element. The result of experiment is shown in FIG. 59.

Figure 59:
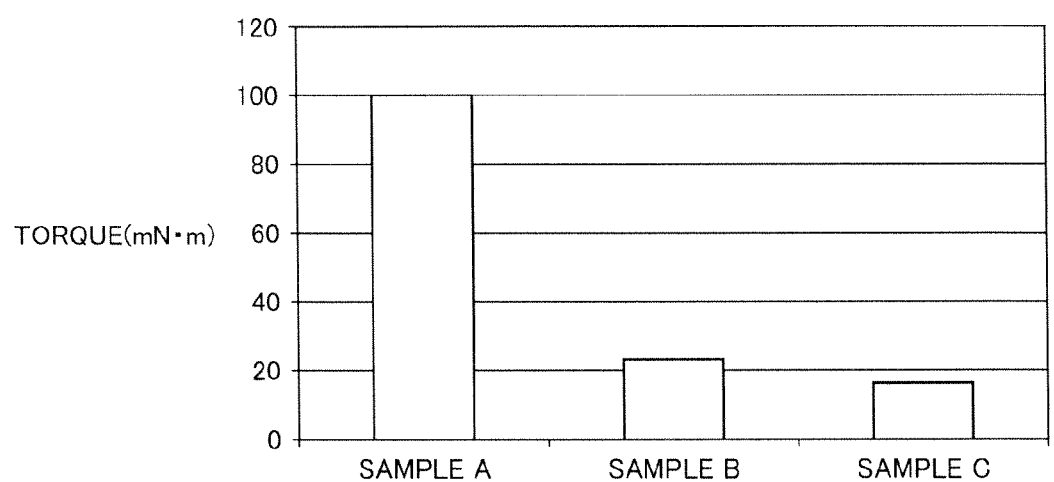
FIG. 59 shows a result of measurement for a bearing torque.

Referring to FIG. 59, sample B employing the cage of the present invention achieved almost 80% torque reduction as compared with sample A. Further, sample C, which is an example of the present invention, achieved about 30% torque reduction as compared with sample B. Thus, in the rolling bearing of the present invention, it is confirmed that torque reduction can be attained by adjusting the ring surface groove curvature to an appropriate size, more specifically, by increasing the ring surface groove curvature.

In sample C, each of the inner ring and the outer ring is a high-strength bearing part, so that indentation resistance is improved. While taking an advantage of this, the ring surface groove curvature is increased in sample C, thereby attaining torque reduction. This is attained due to the following reason. That is, one factor of increase in bearing torque is a sliding component (differential sliding, spin sliding, or the like) between the ring surface and the ball. The sliding component can be reduced by increasing the groove curvature. It should be noted that the term "groove curvature" in the present application refers to a ratio of the curvature radius of the rolling contact surface in a cross section perpendicular to the circumferential direction of the bearing ring to the radius of the ball.

It should be noted that in the embodiments and examples described above, the deep groove ball bearing or the like has been illustrated as an exemplary rolling bearing including the bearing part of the present invention, but the bearing part and rolling bearing in the present invention are not limited to these. The present invention can be applied to various types of rolling bearings and bearing parts for such rolling bearings. Further, it has been illustrated that the rolling bearing of the present invention is applied to a transmission, a differential, and the like, but the application of the rolling bearing of the present invention is not limited to these. The present invention can be applied to various types of machines, and is particularly suitable for an application which require indentation resistance under application of a high load.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The bearing part, the rolling bearing, and the methods of manufacturing them in the present invention can be particularly applied to a bearing part, a rolling bearing, and methods of manufacturing them, each of which is required to attain a high level of indentation resistance and a high level of rolling fatigue life.

REFERENCE SIGNS LIST

1: deep groove ball bearing; 2: thrust needle roller bearing; 11: outer ring; 11A: outer ring rolling contact surface; 11B, 12B, 13B, 21B, 23B: nitrogen enriched layer; 11C, 12C, 13C, 21C, 23C: inner portion; 12: inner ring; 12A: inner ring rolling contact surface; 13: ball; 13A: ball rolling contact surface; 14, 24: cage; 21: bearing ring; 21A: bearing ring rolling contact surface; 23: needle roller; 23A: roller rolling contact surface; 100: manual transmission; 111: input shaft; 112: output shaft; 113: counter shaft; 114a-k: gear; 115: housing; 120A, 120B: rolling bearing; 200: differential; 201: differential case; 201a: internal teeth; 201b: external teeth; 202a-b: pinion gear; 202c-d: rotation shaft; 203: sun gear; 204: pinion carrier; 205: armature; 206: pilot clutch; 207: electromagnet; 208: differential case; 209: cam; 220: left drive shaft; 221: right drive shaft; 301: deep groove ball bearing; 311: outer ring; 311A: outer ring rolling contact surface; 311B, 312B, 313B: nitrogen enriched layer; 311C, 312C, 313C: inner portion; 312: inner ring; 312A: inner ring rolling contact surface; 313: ball; 313A: ball rolling contact surface; 314: cage; 315: elastic portion; 316: core metal; 317: seal member; 317A: seal lip portion; 401: deep groove ball bearing; 411: outer ring; 411A: outer ring rolling contact surface; 411B, 412B, 413B: nitrogen enriched layer; 411C, 412C, 413C: inner portion; 412: inner ring; 412A: inner ring rolling contact surface; 413: ball; 413A: ball rolling contact surface; 415: cage; 426: hemispherical projecting portion; 427A, 427B: annular cage plate; 428: flat portion; 429: fixing tool; 430: pocket; 431: ball contact portion; 432: non-contact portion; 433: protrusion; 434: recess; 435: pocket axial opening edge; 501: deep groove ball bearing; 511: outer ring; 511A: outer ring rolling contact surface; 511B, 512B, 513B: nitrogen enriched layer; 511C, 512C, 513C: inner portion; 512: inner ring; 512A: inner ring rolling contact surface; 513: ball; 513A: ball rolling contact surface; 514: cage; 517: seal member; 518: core metal; 519: coating portion; 520: mounting groove; 521: recessed groove; 522: lip portion; 526: hemispherical projecting portion; 527A, 527B: annular cage plate; 528: flat portion; 529: fixing tool; 530: pocket; 531: non-contact portion; 532: protrusion; 533: recess; 535: slit; 601: deep groove ball bearing; 611: outer ring; 611A: outer ring rolling contact surface; 611B, 612B, 613B: nitrogen enriched layer; 611C, 612C, 613C: inner portion; 612: inner ring; 612A: inner ring rolling contact surface; 613: ball; 613A: ball rolling contact surface; 615: cage; 620: annular body; 621: facing surface; 621A: inter-pocket groove portion; 622: pocket; 622A: pocket groove portion; 623: outer diameter side protrusion; 623a: engagement surface; 624: inner diameter side recess; 625: inner diameter side protrusion; 626: outer diameter side recess; 627: decreased thickness portion; 628, 628A, 628B: flange portion; 630, 631: groove portion; 640: labyrinth; 701: deep groove ball bearing; 711: outer ring; 711A: outer ring groove; 711B, 712B, 713B: nitrogen enriched layer; 711C, 712C, 713C: inner portion; 712: inner ring; 712A: inner ring groove; 713a, 713b, 723a, 723b: shoulder; 714: ball; 714A: ball rolling contact surface; 740: cage; 741: first divided cage; 742: second divided cage; 743, 748: annular body; 744, 749: pocket pawl; 745, 750: pocket; 746, 751: engaging pawl; 747, 752: engagement recess; 745A, 750A: relief portion; 755: distinguishing indication portion.

The invention claimed is:
1. A bearing part, wherein
the bearing part is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of an impurity,
the bearing part has a contact surface, which is a surface that makes contact with another part and has a nitrogen concentration of not less than 0.25 mass %, and
a remaining austenite amount in said contact surface is not less than 6 volume % and not more than 12 volume %.
2. The bearing part according to claim 1, wherein said contact surface has a hardness of not less than 60.0 HRC.

3. The bearing part according to claim 1, wherein said contact surface has a hardness of not more than 64.0 HRC.

4. A rolling bearing comprising:
a ring member; and
a plurality of rolling elements disposed in contact with said ring member,
at least one of said ring member and each of said rolling elements being the bearing part recited in claim 1.

5. The rolling bearing according to claim 4, wherein said ring member includes a first bearing ring having a first rolling contact surface and a second bearing ring having a second rolling contact surface and disposed such that said second rolling contact surface faces said first rolling contact surface,
the rolling bearing further comprising a seal member disposed to close a bearing space, which is a space interposed between said first bearing ring and said second bearing ring, wherein
said seal member has one end fixed to one of said first bearing ring and said second bearing ring, and has the other end that serves as a seal lip portion making contact with the other of said first bearing ring and said second bearing ring, and
said seal lip portion is made of such a high-wear material that by rotating said second bearing ring relative to said first bearing ring in a circumferential direction, said seal lip portion is worn out to bring into a state in which the other of said first bearing ring and said second bearing ring does not make contact with said seal lip portion or a state in which the other of said first bearing ring and said second bearing ring slightly makes contact with said seal lip portion to such an extent that a contact pressure between the other of said first bearing ring and said second bearing ring and said seal lip portion is able to be regarded as substantially zero.

6. The rolling bearing according to claim 4, wherein at least said ring member is the bearing part, wherein
the bearing part is made of a quench-hardened steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of an impurity,
the bearing part has a contact surface, which is a surface that makes contact with another part and has a nitrogen concentration of not less than 0.25 mass %, and
a remaining austenite amount in said contact surface is not less than 6 volume % and not more than 12 volume %.

7. The rolling bearing according to claim 4, wherein said rolling element is a ball.

8. The rolling bearing according to claim 7, further comprising a cage that retains said plurality of rolling elements at a predetermined pitch on an annular raceway, wherein
said cage is constructed by combining two annular cage plates each having hemispherical projecting portions provided at a predetermined interval in a circumferential direction,
said hemispherical projecting portions facing each other form a pocket retaining said rolling element,
said pocket has a ball facing surface, which is a surface that faces said rolling element and is provided with a ball non-contact portion provided by a recess extending in the circumferential direction of said pocket, and
assuming that a length of said ball non-contact portion in the circumferential direction of said pocket is represented by A, a diameter of said rolling element is represented by B, and a gap formed between said rolling element and said ball facing surface is represented by C, a value of A/(B+C) is set at 0.70 to 0.90.

9. The rolling bearing according to claim 8, wherein assuming that a length of said ball non-contact portion in a pocket axial direction is represented by D and a total length of said pocket in the pocket axial direction is represented by E, a value of D/E is set at 0.25 to 0.40.

10. The rolling bearing according to claim 8, wherein assuming that a depth of said recess providing said ball non-contact portion is represented by F and a thickness of said hemispherical projecting portion of said annular cage plate is represented by G, a value of F/G is set at 0.30 to 0.40.

11. The rolling bearing according to claim 8, wherein assuming that a total length of said pocket in a pocket axial direction is represented by E and an amount of displacement of a center of said ball non-contact portion relative to a center of said rolling element in the pocket axial direction is represented by H, a value of H/(E/2) is set at 0 to 0.2.

12. The rolling bearing according to claim 8, wherein said recess that provides said ball non-contact portion has a curved opening edge in a pocket axial direction.

13. The rolling bearing according to claim 7, further comprising a cage that retains said plurality of rolling elements at a predetermined pitch on an annular raceway, wherein
said cage is constructed by combining two annular cage plates each having hemispherical projecting portions provided at a predetermined interval in a circumferential direction,
said hemispherical projecting portions facing each other form a pocket retaining said rolling element,
said pocket has a ball facing surface, which is a surface that faces said rolling element and is provided with a ball non-contact portion, and
a contact area of said pocket with said rolling element is reduced by 15% to 30% as compared with a contact area thereof with said rolling element in a case where said ball non-contact portion is not provided.

14. The rolling bearing according to claim 7, wherein
said ring member includes an inner ring, and an outer ring disposed to surround an outer circumference side of said inner ring, and
said inner ring has a groove curvature of not less than 1.02 and not more than 1.06 relative to said rolling element.

15. The rolling bearing according to claim 7, wherein
said ring member includes an inner ring, and an outer ring disposed to surround an outer circumference side of said inner ring, and
said outer ring has a groove curvature of not less than 1.02 and not more than 1.08 relative to said rolling element.

16. The rolling bearing according to claim 7, further comprising a cage that retains said plurality of rolling elements at a predetermined pitch on an annular raceway, wherein
said cage is formed by forming hemispherical pockets in facing surfaces of two annular bodies, which face each other in an axial direction, at a plurality of locations in a circumferential direction so as to contain said rolling elements, and bringing said facing surfaces into abutment with each other so as to join said two annular bodies together,
a flange portion extending in a radial direction is provided in at least one of an inner diameter side and an outer diameter side of an axial end portion of each of said annular bodies,
a groove portion is formed at a portion of said ring member corresponding to said flange portion, and a labyrinth is formed by said flange portion and said groove portion.

17. The rolling bearing according to claim 16, wherein said two annular bodies have the same shape.

18. The rolling bearing according to claim 16, wherein said pocket of said annular body is provided with a pocket groove portion formed to extend in the radial direction of said annular body.

19. The rolling bearing according to claim 16, wherein an inter-pocket groove portion is formed in said facing surface between adjacent ones of said pockets of said annular body so as to extend through said annular body in the radial direction of said annular body to connect an inner diameter side and an outer diameter side of said annular body to each other.

20. The rolling bearing according to claim 16, wherein said flange portion has an axial thickness of not less than 0.15 mm, which is 20% or less of a diameter of said rolling element.

21. The rolling bearing according to claim 16, wherein said cage has a flat end surface.

22. The rolling bearing according to claim 16, wherein said cage is made of a polyamide resin, a polyether ether ketone resin, or a polyphenylene sulfide resin.

23. The rolling bearing according to claim 7, further comprising a cage that retains said plurality of rolling elements at a predetermined pitch on an annular raceway, wherein
said ring member includes an inner ring that is provided with an inner ring groove formed at an outer circumference side, and an outer ring that is disposed to surround said inner ring and that is provided with an outer ring groove formed at an inner circumference side, and
among four shoulders respectively disposed at sides of said outer ring groove and said inner ring groove, a shoulder at one side of said outer ring groove and a shoulder at the other side of said inner ring groove respectively have heights higher than heights of a shoulder at the other side of said outer ring groove and a shoulder at the one side of said inner ring groove.

24. The rolling bearing according to claim 23, wherein
said cage includes a cylindrical first divided cage made of a synthetic resin and a cylindrical second divided cage made of a synthetic resin and fitted in inside of said first divided cage, and each of said first divided cage and said second divided cage has an annular body and has a crown shape such that plural pairs of pocket pawls are formed side by side at an equal interval at one side surface of said annular body in an axial direction, each pair of pocket pawls face each other, and a ball retaining pocket obtained by hollowing out said annular body and having a size exceeding ½ circle is provided between said each pair of pocket pawls, and
said first divided cage is inserted into the bearing from a side of the shoulder, which has a lower shoulder height, of said outer ring, and said second divided cage is inserted into the bearing from a side of the shoulder, which has a lower shoulder height, of said inner ring such that said pocket has a combination of open ends directed in opposite directions, and a joining portion is provided between said first divided cage and said second divided cage so as to engage the cages through fit and prevent the cages from being separated in the axial direction.

25. The rolling bearing according to claim 24, wherein said first divided cage and said second divided cage have different hues.

26. The rolling bearing according to claim 24, wherein said pocket has an inner circumferential surface provided with a relief portion that does not make contact with said rolling element.

27. The rolling bearing according to claim 4, wherein when said rolling element is pressed against said ring member at a maximum contact pressure of 4.4 GPa, an indentation formed in said ring member has a depth of not more than 0.5 µm.

28. The rolling bearing according to claim 4, wherein the rolling bearing rotatably supports a rotation member, which is rotated in a differential or a transmission, relative to another member disposed adjacent to said rotation member.

29. A method of manufacturing a bearing part comprising the steps of:
fabricating a shaped member by shaping a steel containing not less than 0.90 mass % and not more than 1.05 mass % of carbon, not less than 0.15 mass % and not more than 0.35 mass % of silicon, not less than 0.01 mass % and not more than 0.50 mass % of manganese, and not less than 1.30 mass % and not more than 1.65 mass % of chromium with the rest consisting of an impurity;
carbonitriding said shaped member;
quench-hardening said shaped member carbonitrided;
tempering said shaped member quench-hardened; and
forming a contact surface, which is a surface to make contact with another part, by processing said shaped member tempered,
in the step of carbonitriding said shaped member, said shaped member being carbonitrided so as to attain a nitrogen concentration of not less than 0.25 mass % in said contact surface in the step of forming said contact surface,
in the step of tempering said shaped member, said shaped member being tempered to attain a remaining austenite amount of not less than 6 volume % and not more than 12 volume % in said contact surface in the step of forming said contact surface.

30. The method of manufacturing the bearing part according to claim 29, wherein in the step of tempering said shaped member, said shaped member is tempered in a temperature range of not less than 240° C. and not more than 300° C.

31. The method of manufacturing the bearing part according to claim 29, wherein in the step of quenching said shaped member, said shaped member is quenched by rapidly cooling said shaped member from a temperature range of not more than 860° C.

32. The method of manufacturing the bearing part according to claim 29, wherein in the step of quenching said shaped member, said shaped member is quenched by rapidly cooling said shaped member from a temperature range of not less than 820° C.

33. A method of manufacturing a rolling bearing, comprising the steps of:
preparing a ring member;
preparing a plurality of rolling elements; and
assembling said rolling bearing by combining said plurality of rolling elements in contact with said ring member,
at least one of the step of preparing said ring member and the step of preparing said plurality of rolling elements being performed using the method of manufacturing the bearing part as recited in claim 29.

* * * * *